(12) United States Patent
Gilbert et al.

(10) Patent No.: US 12,400,531 B1
(45) Date of Patent: Aug. 26, 2025

(54) SECURITY CAMERA DEVICE WITH PASSIVE INFRARED (PIR) SENSORS

(71) Applicant: Amazon Technologies, Inc., Seattle, WA (US)

(72) Inventors: Marcus-Alan Gilbert, Plano, TX (US); Matthew J. England, Santa Monica, CA (US); Anandh Chellamuthu, Fremont, CA (US); Eric S. Micko, San Jose, CA (US); Sonny Windstrup Rasmussen, Singapore (SG); Andrii Borisovich Pavliukov, Kyiv (UA)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 17/953,796

(22) Filed: Sep. 27, 2022

(51) Int. Cl.
| | |
|---|---|
| *G08B 13/196* | (2006.01) |
| *G08B 13/16* | (2006.01) |
| *G08B 13/19* | (2006.01) |
| *H04N 23/65* | (2023.01) |
| *H04N 23/74* | (2023.01) |

(52) U.S. Cl.
CPC ... *G08B 13/19619* (2013.01); *G08B 13/1672* (2013.01); *G08B 13/19* (2013.01); *G08B 13/19626* (2013.01); *H04N 23/65* (2023.01); *H04N 23/74* (2023.01)

(58) Field of Classification Search
CPC .............. G08B 13/19619; G08B 13/19; G08B 13/1672; G08B 13/19626
See application file for complete search history.

(56) References Cited

U.S. PATENT DOCUMENTS

| | | | |
|---|---|---|---|
| 11,393,309 B1* | 7/2022 | Wang | G08B 13/19 |
| 2003/0219134 A1 | 11/2003 | Su et al. | |
| 2010/0128123 A1 | 5/2010 | DiPoala | |
| 2016/0364009 A1 | 12/2016 | Lemberger | |
| 2017/0280109 A1* | 9/2017 | Scalisi | H04N 23/667 |
| 2018/0322751 A1 | 11/2018 | Sacre et al. | |
| 2018/0357871 A1* | 12/2018 | Siminoff | G08B 13/189 |
| 2020/0173617 A1 | 6/2020 | Bancken et al. | |
| 2022/0271422 A1 | 8/2022 | Grillo | |

FOREIGN PATENT DOCUMENTS

| | | | | |
|---|---|---|---|---|
| DE | 19821302 A1 * | 11/1999 | | G01P 13/00 |

OTHER PUBLICATIONS

Office Action for U.S. Appl. No. 17/953,780, mailed on Jun. 14, 2024, Gilbert, "Security Camera Device", 16 pages.

* cited by examiner

*Primary Examiner* — Minh Q Phan
(74) *Attorney, Agent, or Firm* — Eversheds Sutherland (US) LLP

(57) ABSTRACT

An audio/video (A/V) device includes a first housing and a second housing that rotationally couples and uncouples to the first housing. The first housing includes a frame having a first cavity, a second cavity, and a wall disposed between the first cavity and the second cavity. The first housing further includes a mirror that extends between the first cavity and the second cavity, a first passive infrared (PIR) sensor at least partially disposed within the first cavity, and a second PIR sensor at least partially disposed within the second cavity. The second housing includes a loudspeaker.

22 Claims, 44 Drawing Sheets

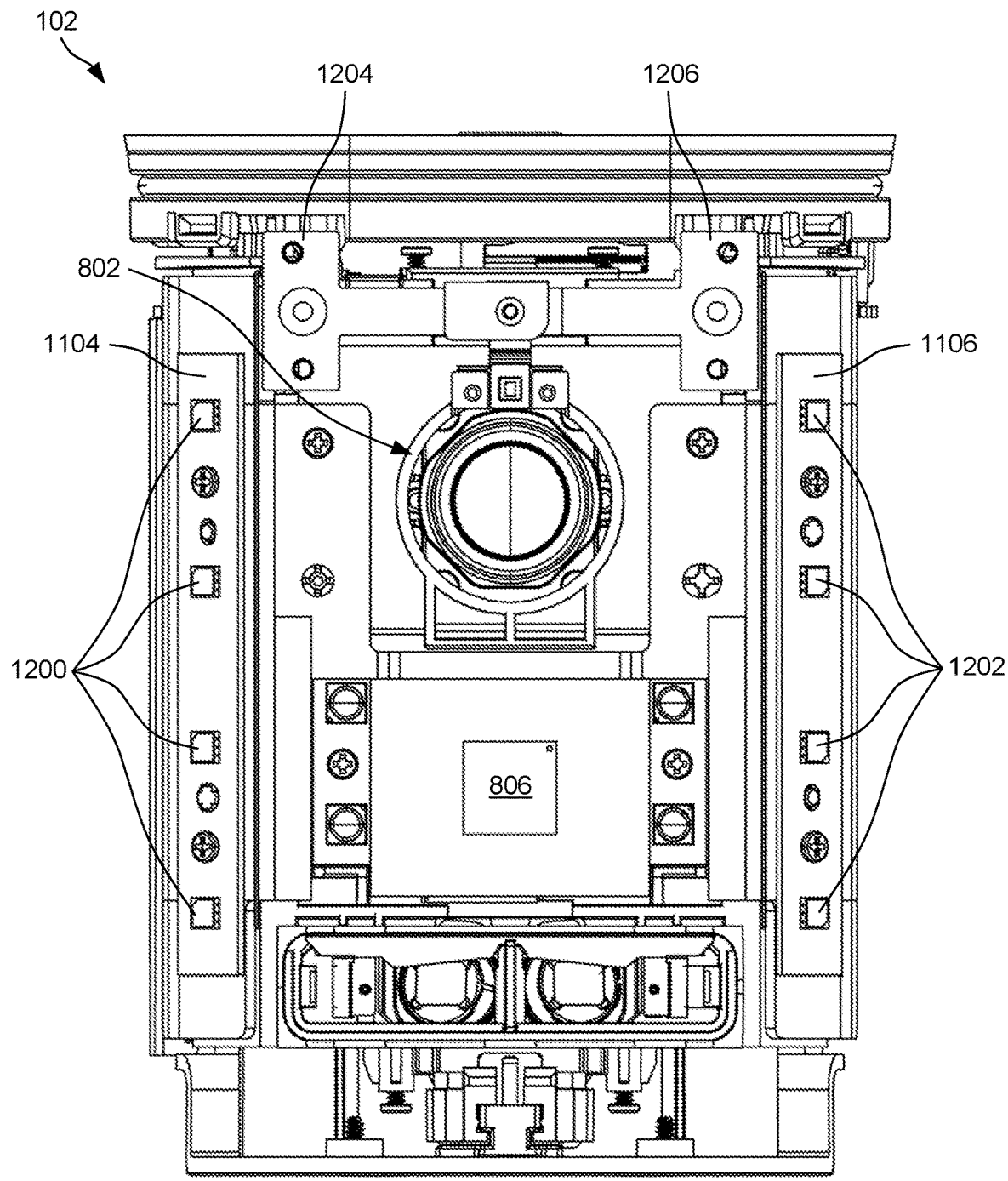
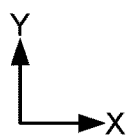
FIG. 12

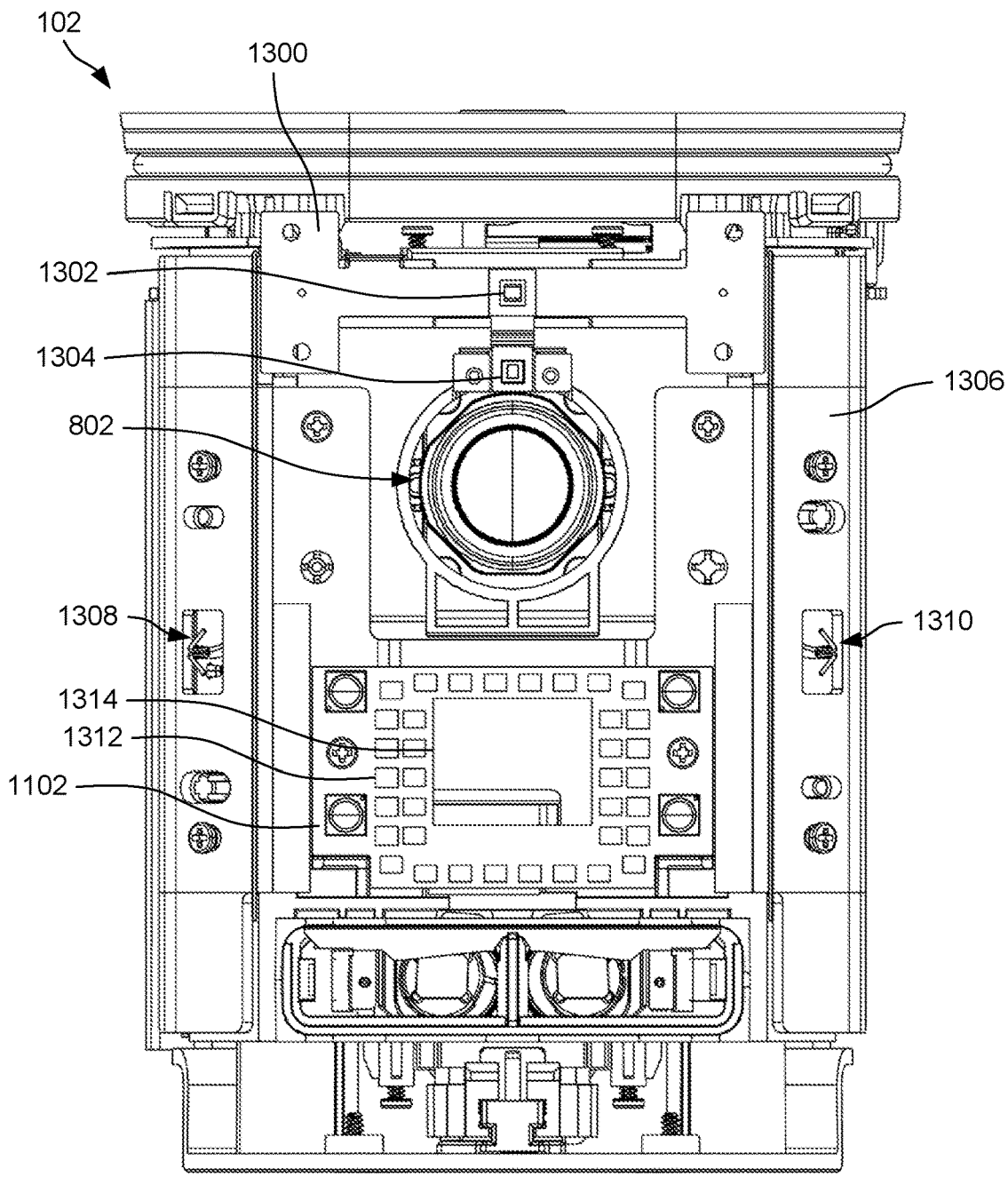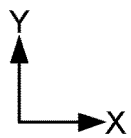
FIG. 13

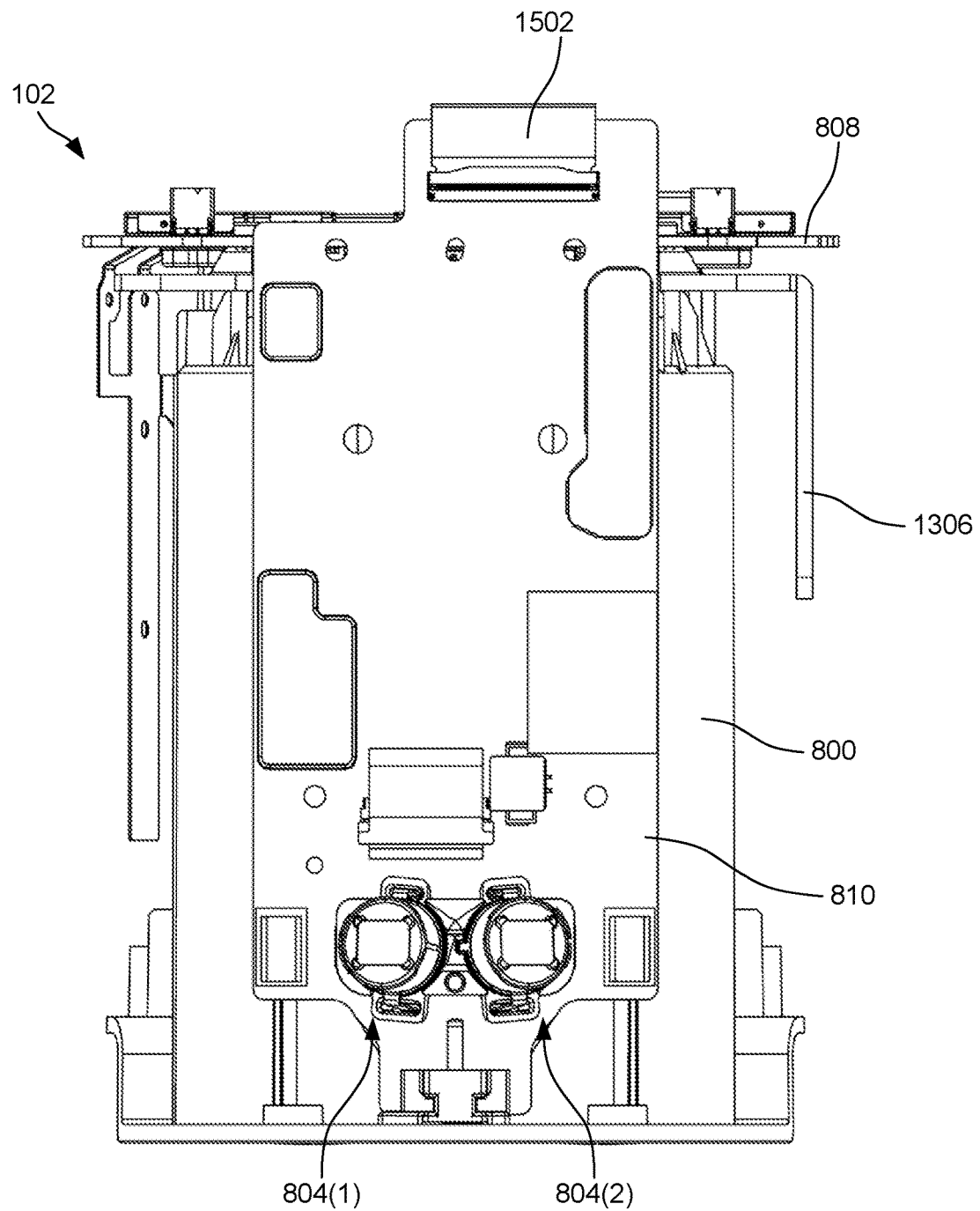
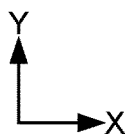
FIG. 16

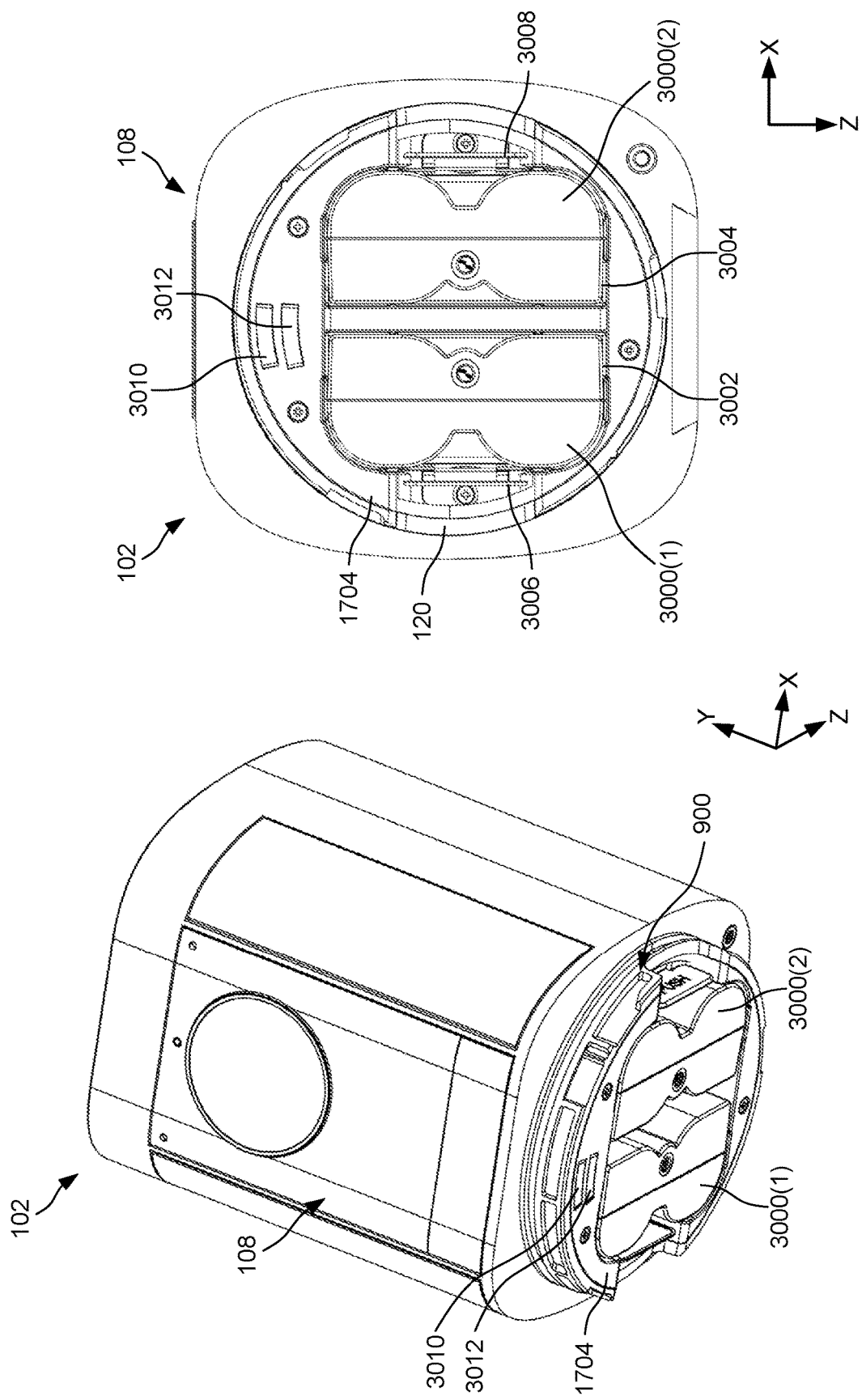

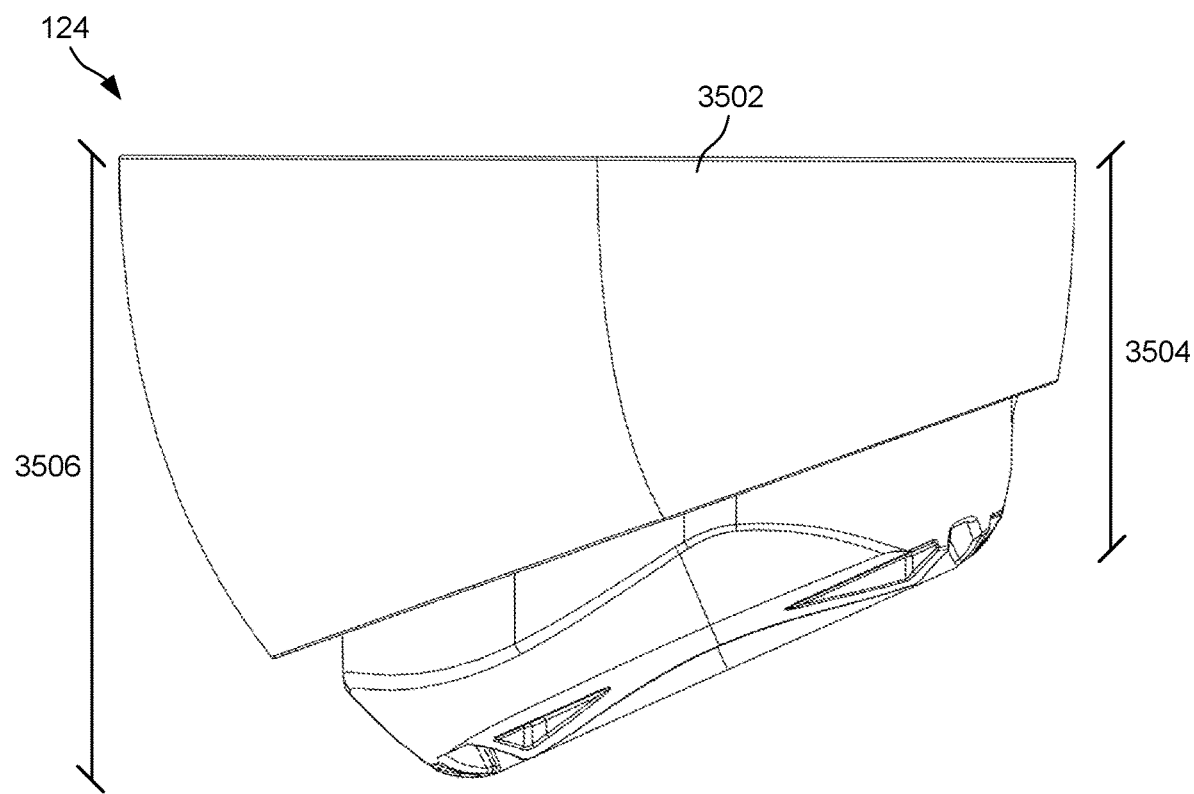
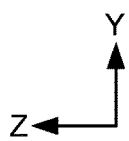
FIG. 35C

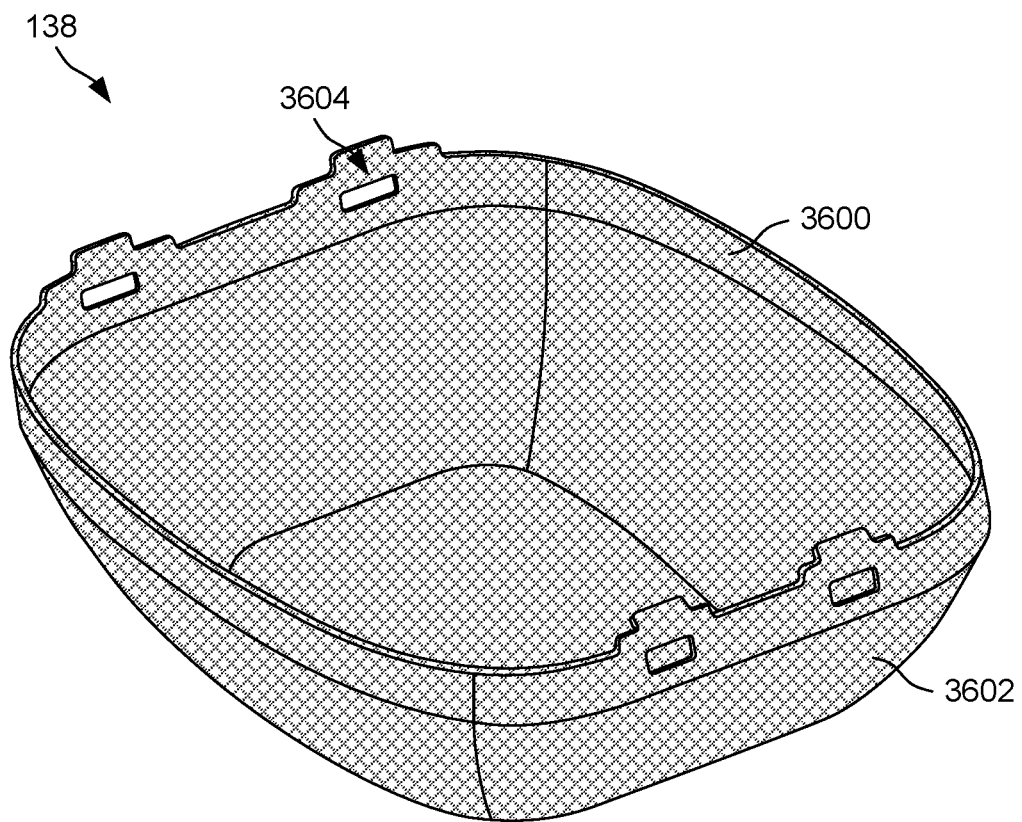
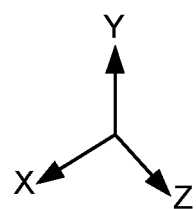
FIG. 36

SECURITY CAMERA DEVICE WITH PASSIVE INFRARED (PIR) SENSORS

BACKGROUND

Security is a concern for many homeowners, businesses, and the like. In some examples, those seeking to protect or monitor their homes or place of business may wish to have video and audio communications. Devices, for example, may be placed adjacent to an external door or entryway. However, conventional devices may be unaesthetically appealing, have large form factors, and/or have suboptimal audio and/or video characteristics. Additionally, current devices may fail to accurately warn homeowners, businesses, and the like of imminent threats, such as detecting intruders or unwelcomed guests.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 12 illustrates example components disposed within the top housing of FIG. 9, according to examples of the present disclosure.

FIG. 13 illustrates example components disposed within the top housing of FIG. 9, according to examples of the present disclosure.

FIG. 16 illustrates example components disposed within the top housing of FIG. 9, according to examples of the present disclosure.

FIGS. 30A and 30B illustrate example batteries and contacts of the top housing of FIG. 9, according to examples of the present disclosure.

FIGS. 35A-35C illustrate an example cover of the bottom housing of FIG. 9, according to examples of the present disclosure.

FIG. 36 illustrates an example loudspeaker grill of the bottom housing of FIG. 9, according to examples of the present disclosure.

DETAILED DESCRIPTION

Figure 1:
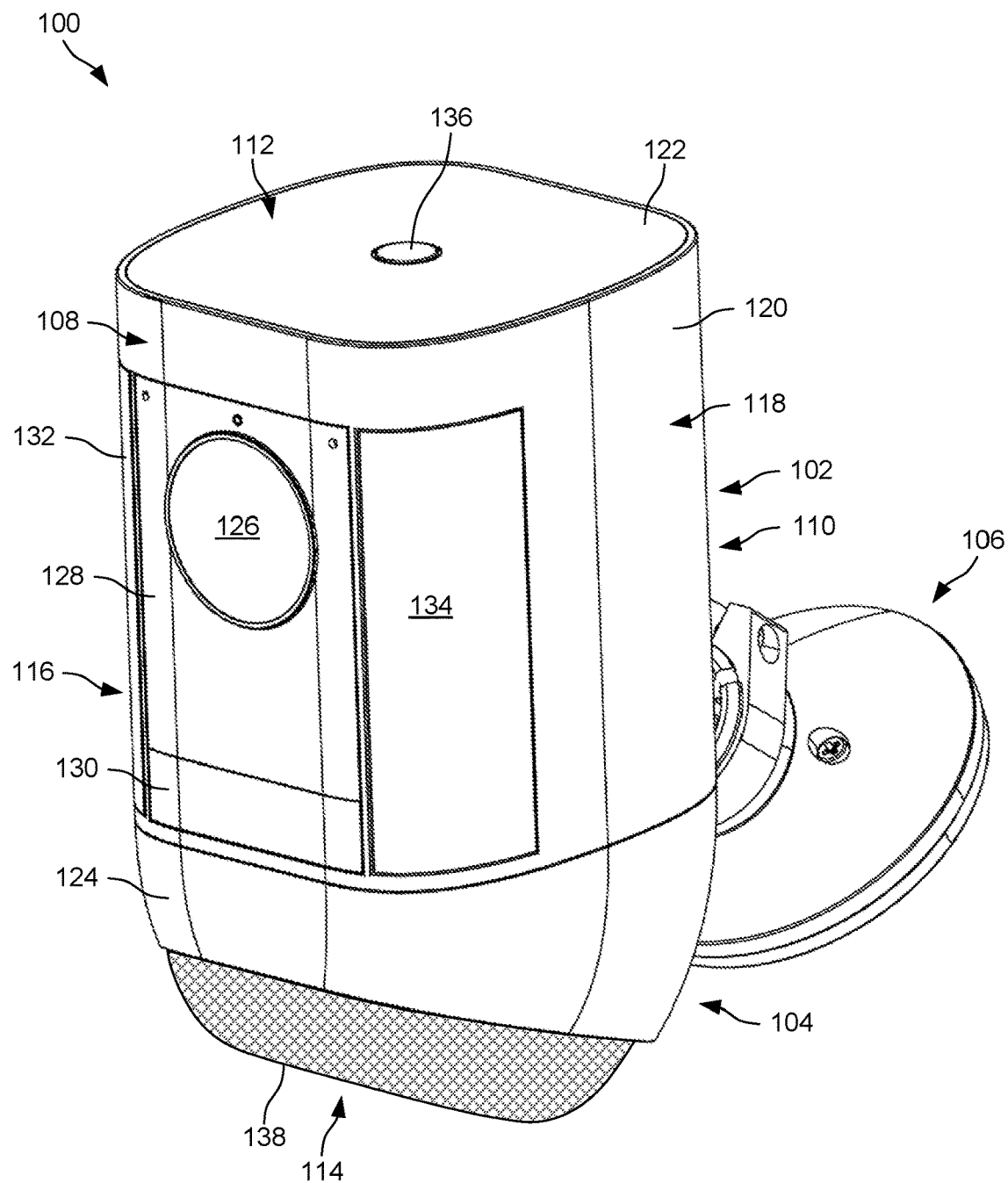
FIG. 1 illustrates a front perspective view of an example security camera device, according to examples of the present disclosure.

This application is directed, at least in part, to a security camera device (e.g., electronic device, audio/video (A/V) device, etc.) having improved image, audio, and video capturing characteristics. In some instances, the security camera device may include a first housing and a second housing that couple together. Additionally, a mount may couple to the first housing for disposing the security camera device on a surface (e.g., wall). The first housing may include various computing components, such as a camera, light emitting elements (e.g., light emitting diodes (LEDs)), RADAR, passive infrared (PIR) sensor(s), and so forth for detecting motion, recording audio and/or video, and so forth within an environment of the security camera device. The second housing may include a loudspeaker (e.g., mid-range speaker, tweeter speaker, or subwoofer speaker) for outputting sound within the environment. The first housing and the second housing may communicatively couple to one another via various connections (e.g., contacts) to enable operation of the security camera device.

The security camera device may include a front, a back, a top, a bottom, and adjacent lateral sides. In some instances, the first housing includes the camera(s), the PIR sensor(s), and/or the RADAR oriented towards the front. In some instances, the camera(s) may be located closer to the top of the security camera device than the PIR sensor(s) and the RADAR, the PIR sensor(s) may be located closer to the bottom of the security camera device than the camera(s) and the RADAR, and/or the RADAR may be located between the camera(s) and the PIR sensor(s). The camera(s), the PIR sensor(s), and/or the RADAR may serve to detect motion within an environment of the security camera device. For example, image processing on video data captured by the camera(s) may be used to detect persons (or other objects of interest). The PIR sensor(s) detect or receive mid-IR light emitted by persons (e.g., according to a temperature of the person). The RADAR may be used to determine polar coordinates (or a position) of persons. In some instances, the RADAR may enable the security camera device to focus on object detection and capabilities to operation in low power modes. In some instances, the camera(s), the PIR sensor(s), and/or the RADAR may be used in combination to detect persons, and in response, capture video and/or audio data. For example, upon mid-IR (e.g., motion) being detected via the PIR sensor(s), the camera(s) may begin recording video data.

A PIR sensor may comprise, for example, two pyroelectric sensing elements. Each pyroelectric sensing element comprises a pyroelectric crystal. Each pyroelectric sensing element generates an electrical charge in response to heat. Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

In some instances, a PIR sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A PIR sensor may include two slots, each providing an optical path to one of the pyroelectric sensing elements. A PIR sensor or electronic device may comprise one or more lenses configured to direct light received at the one or more lenses onto one of the pyroelectric sensing elements. A PIR sensor or electronic device may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A PIR sensor may be analog, with an analog signal output, or may be digital, with digital data output generated utilizing an analog-to-digital converter (ADC).

An electronic device may include one or more PIR sensors that the electronic device uses to detect objects. Each PIR sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first PIR sensor may have a first field-of-view (FOV) that extends a first distance from the electronic device. In some examples, the first FOV is created based on placing the first PIR sensor in a first direction and/or using one or more lenses (which may be a lens of the passive infrared sensor or which may be used in addition to or in replacement of a lens of the PIR sensor).

The electronic device may include one or more lenses configured to direct light received at various first portions of the one or more lenses onto a passive infrared sensor. The one or more lenses may comprise one or more Fresnel lenses having one or more features configured to direct light.

In some instances, the PIR sensor(s) are part of a PIR assembly disposed within the first housing. The PIR assembly may include a mount, a PIR frame, a reflective surface (e.g., mirror), and the PIR sensor(s). The PIR sensor(s) may couple to the mount or be disposed on and/or within the mount. As such, the mount may receive the PIR sensor(s). In some instances, the mount may orient the PIR sensor(s) towards the sides, the top, and/or the front of the security camera device. The PIR sensor(s) and the mount may couple to the PIR frame. In some instances, the PIR frame includes two cavities (e.g., one for each PIR sensor), separated by a divider (e.g., wall), and through which the PIR sensor(s) are configured to receive IR radiation. In some instances, the mirror couples to the PIR frame and the PIR sensor(s) are oriented towards the mirror. The mirror is configured to reflect the IR signals in a direction towards the PIR sensor(s). The mirror may serve to increase a field of view of the PIR sensor(s). In some instances, the mirror is formed via two separate mirrors, or may be a unibody structure. In instances in which the device includes two mirrors, a first of the PIR sensor(s) may be oriented towards a first mirror, and a second of the PIR sensor(s) may be oriented towards a second mirror.

The security camera device may include various LEDs for illuminating the environment and for enabling the camera(s) to capture video data and/or motion detection. In some instances, the LEDs may be disposed within the first housing. In some instances, the LEDs may include first LEDs (e.g., IR LEDs) arranged on the front of the security camera device, second LEDs (e.g., WLEDs) arranged at a first corner the security camera device, between the front and a first side, and/or third LEDs (e.g., WLEDs) arranged at a second corner of the security camera device, between the front and a second side. The first LEDs may enable the camera(s) to capture video data in low-light conditions (e.g., night time), while the second LEDs and/or the third LEDs emit light upon motion being detected. In some instances, the first LEDs are located vertically beneath the camera(s) and above the PIR sensor(s). Additionally, the first LEDs may be located horizontally between the second LEDs (at the first corner) and the third LEDs (at the second corner).

The security camera device may include microphone(s) for capturing audio within the environment. In some instances, the microphone(s) are arranged on or across the front of the security camera device. In some instances, the microphone(s) may be located between the camera and the top of the device. As such, the microphone(s) may be located closer to the top of the security camera device than the camera(s). Additionally, the microphone(s) may include at least two microphones for noise cancellation, directionality, and so forth. In some instances, a first of the microphones is disposed proximate to the first corner, while a second of the microphones is disposed proximate the second corner (e.g., spaced apart across the front).

Additionally, the front may include a status indicator (e.g., RGB LED) that indicates an operational state of the security camera device. For example, the status indicator may indicate whether the microphone(s) is/are recording audio, whether the camera(s) is/are capturing video, and so forth. In some instances, the status indicator is located between the first microphone and the second microphone, vertically above and/or aligned with camera(s). The front of the security camera device may also include an ambient light sensor that is used to transition the security camera device to night mode (e.g., low light conditions). The ambient light sensor may be interposed between the status indicator and the camera. In some instances, the microphone(s), status indicator, and/or ambient light sensor are disposed within the first housing.

The top of the first housing may include a button, which in some instances, may be used to setup the security camera device. For example, as part of an out of box experience (OOBE), the button may be pressed to setup the security camera device. In some instances, the button is disposed through a cap of the first housing. In some instances, the button may be a mechanical button, resistive-type button, or a capacitive-type button. The cap may be located on the top of the security camera device, and secured to the first housing via fasteners, snap-fits, press-fit, etc.

The first housing may also include a battery frame (e.g., housing) that defines one or more battery receptacles. For example, the battery frame may include a body that defines a first battery receptacle and a second battery receptacle for receiving a first battery and a second battery, respectively. In some instances, the battery receptacles may be accessible via a bottom of the first housing, and by uncoupling the first housing and the second housing.

In some instances, one or more printed circuit boards (PCBs) or printed circuit board assemblies (PCBAs) are disposed within the first housing. In some instances, a first PCBA may be disposed at or beneath the front of the security camera device. The first PCBA may include, or communicatively couple to, the camera(s), the PIR sensor(s), the RADAR, the first LEDs (IR LEDs), the microphone(s), and so forth. A PCB may be disposed at or beneath the cap of the security camera device. In some instances, the PCB may include network interfaces (e.g., antenna(s)) for wirelessly coupling the security camera device with one or more remote devices (e.g., mobile device, laptop, etc.) over one or more networks (e.g., Cellular, Wi-Fi, BLE, Bluetooth, etc.). The PCB may also receive power from the batteries of the security camera device. Additionally, the second LEDs and the third LEDs arranged at corners may be disposed on one or more PCBAs. For example, a second PCBA (or PCB) may include the second LEDs disposed at the first corner of the security camera device, while a third PCBA (or PCB) may include the third LEDs located at the second corner of the security camera device. The PCBAs and the PCB (as well as other computing components of the security camera device) may be communicatively coupled to one another via one or more flex circuits, wires, connectors, and so forth. For example, the PCBAs and the PCBs may be communicatively coupled for distributing power to components of the security camera device.

The security camera device may include one or more windows or lenses disposed over the camera(s), PIR sensor(s), RADAR, and/or the LED(s). For example, a window may be disposed over the camera(s), a first lens may be disposed over the first LEDs and/or the RADAR, a second lens may be disposed over the PIR sensor(s), a third lens may be disposed over the second LEDs at the first corner, and/or a fourth lens may be disposed over the third LEDs at the second corner. In some instances, the window may be received within a least a portion of the first lens. For example, the window may reside within an opening of the first lens. In some instances, the windows and/or lenses may couple to a frame of the first housing, at the front and/or along the sides. For example, as the second LEDs and the third LEDs may be disposed at corners of the security camera device, the third lens and/or the fourth lens may at least partially wrap around wrap around the front and/or the sides of the security camera device. The windows and/or lenses may also conceal the camera(s), PIR sensor(s), RADAR, and/or the LED(s) from view. In some instances, the windows and/or lenses may include a material that is transparent or translucent to permit the PIR sensor(s) to detect motion and the cameras to record video, for example. Example materials may include glass and polycarbonate.

The windows and/or lenses may also reduce glare (e.g., anti-glare coatings) to increase a quality of videos being captured.

The second housing includes the loudspeaker for outputting sound into the environment. In some instances, the loudspeaker is arranged to output sound towards the front and/or the bottom of the security camera device. For example, the loudspeaker may be oriented towards the front and the bottom to project sound outward from the security camera device. The second housing may include a frame to which the loudspeaker couples for orienting the loudspeaker towards the front and the bottom. In some instances, a loudspeaker grill and/or other membranes are disposed over the loudspeaker.

In some instances, the first housing and the second housing may couple together via a twist and lock mechanism. Attachment mechanisms of the first housing and the second housing may form the twist and lock mechanism. For example, the first housing may include first attachment mechanisms that engage with second attachment mechanism of the second housing. In some instances, the first attachment mechanisms may angularly span around at least a portion of a perimeter, circumference, or periphery of the first housing, while the second attachment mechanisms may span around at least a portion of an opening, annulus, or receptacle of the second housing. The first attachment mechanisms and the second attachments mechanism may engage (e.g., interlock) via a rotation of the first housing and/or the second housing. For example, rotating the first housing and/or the second housing in a first direction (e.g., clockwise) may lock the first attachment mechanisms and the second attachment mechanisms together. When engaged, the first housing and the second housing may be securely coupled together. Rotating the first housing and/or the second housing in a second direction (e.g., counterclockwise) may unlock the first attachment mechanisms and the second attachment mechanisms such that the first housing and the second housing may be uncoupled. The first attachment mechanisms may resemble tabs, hooks, protrusions, keys, keyways, slots, or other male/female connectors that are complimentary to engage with the second attachment mechanisms.

The first housing may also include first contacts that engage with second contacts of the second housing. When the first housing and the second housing are coupled together, the first contacts and the second contacts may engage. In some instances, the engagement between the first contacts and the second contacts transfer power, data, and so forth between computing components in the first housing and computing components in the second housing. For example, power may be transferred between the first housing and the second housing via an engagement between the first contacts and the second contacts. Additionally, sound (e.g., audio data/audio signal) that is output via the loudspeaker may be transferred via the first contacts and the second contacts. In some instances, the first contacts represent prongs, pins, tabs, etc. and the second contacts represent races, strips, pads, etc. that receive the prongs.

The mount may include a ball and socket joint that couples to the first housing. In some instances, an arm with a ball may extend from the back of the first housing. The arm extends the ball away from the back of the first housing. The ball may be received within a socket of the mount, and a clamp of the socket (e.g., fastener) may couple the ball and socket together. The ball and socket joint may enable an orientation of the security camera device to be changed. In some instances, the mount may be coupled (e.g., fastened) to surfaces (e.g., walls, roof eave, etc.). Additionally, the back may include a port, such as a USB-C port. However, additional or alternative ports are envisioned (e.g., auxiliary, ethernet, etc.) and/or the port(s) may be located elsewhere than the back. In some instances, the port may be used for charging batteries of the security camera device (e.g., power), connecting the security camera device to networks, connecting the security camera device to solar panels, and so forth.

The first housing and the second housing may include covers that form an exterior surface of the security camera device. For example, the first housing may include a first cover and the second housing may include a second cover. The first cover and the second cover may include cutouts, apertures, recesses, and the like for accommodating or otherwise receiving the windows, lenses, loudspeaker grill, and so forth, respectively. By way of example, the third lens and the fourth lens may be received within cutouts of the first cover. In some instances, the lenses, windows, and covers may couple to create the uniform exterior surface of the security camera device.

The first housing and the second housing may include various frames, mounts, and brackets for receiving components of the security camera device, or to which components of the security camera device couple. For example, a frame of the first housing may include a cutout through which the camera is disposed, and/or to which PCBAs and/or PCBs couple. In some instances, the covers of the first housing and the second housing couple to the frames. The frames may also include various alignment mechanisms, such as tabs, pins, slits, and so forth for aligning components within the security camera device. For example, prongs extending from a frame may be disposed through openings on the PCBAs and/or the PCBs for aligning the PCBAs and/or the PCBs on the frame (and within the security camera device). Various seals (e.g., O-rings, gaskets, etc.) may be included to environmentally seal the security camera device.

In some instances, heat dissipating elements are included to disperse heat generated by components of the security camera device. By way of example and not limitation, the camera(s), LEDs, power supply, network interfaces, and so forth generate heat during use. Without effectively dispersing or dissipating this heat, the internal components, such as a camera, may be adversely effected and become uncappable of performing its intended function. To efficiently dissipate heat generated by the components, heat dissipating elements may be included within the first housing and/or the second housing to transmit heat away from generating sources toward an exterior of the first housing and/or the second housing, and/or to uniformly distribute the heat over the surface area of the security camera device.

Components of the security camera device may be manufactured using any suitable manufacturing technique, such as blow molding, injection molding, stamping, and so forth. Additionally, suitable materials include metals, composites, plastics, and/or any combination thereof.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example security camera device 100, according to examples of the present disclosure. In some instances, the security camera device 100 may represent an electronic device, audio/video (A/V) device, and so forth. The security camera device 100 may include a first housing 102 (e.g., top housing) that couples to a second housing 104 (e.g., bottom housing). As shown, the first housing 102 may reside vertically above the second housing 104, such that the second housing 104 may couple to a bottom of the first housing 102. When coupled together, the first housing 102 and the second housing 104 may form an exterior surface of the security camera device 100. Additionally, a mount 106 may couple to the first housing 102. The mount 106 may be used to secure the security camera device 100 to surfaces (e.g., wall). For example, fasteners may be disposed through the mount 106 for securing the security camera device 100 to the surfaces.

As will be explained herein, the first housing 102 and the second housing 104 may couple together via a twist and lock mechanism. For example, rotating the first housing 102 and/or the second housing 104 in a first direction may couple the first housing 102 and the second housing 104 together, while rotating the first housing 102 and/or the second housing 104 in a second direction (opposite the first direction) may uncouple the first housing 102 and the second housing 104.

The security camera device 100 includes a front 108, a back 110, a top 112, a bottom 114, and adjacent lateral sides, such as a first side 116 and a second side 118. The first housing 102 may include a first cover 120 and a cap 122. The first cover 120 may be disposed along the front 108, the back 110, the first side 116, and/or the second side 118 of the security camera device 100. The cap 122, meanwhile, may couple to a top of the first cover 120, to form the top 112 of the security camera device 100. Seals or gaskets may be disposed at an interfaces between the cap 122 and the first cover 120. The second housing 104 may include a second cover 124 disposed along the front 108, the back 110, the bottom 114, the first side 116, and/or the second side 118 of the security camera device 100.

The front 108 may include a window 126, a first lens 128, a second lens 130, a third lens 132, and a fourth lens 134. As shown, the window 126, the first lens 128, and the second lens 130 may reside on the front 108 of the security camera device 100, while the third lens 132 may reside on the front 108 and/or the first side 116 of the security camera device 100 (e.g., first corner) and the fourth lens 134 may reside on the front 108 and/or the second side 118 of the security camera device 100 (e.g., second corner). Additionally, the window 126 may reside within the first lens 128 (e.g., an opening of the first lens 128). The second lens 130 resides vertically beneath the window 126 and the first lens 128.

In some instances, the window 126, the first lens 128, the second lens 130, the third lens 132, and the fourth lens 134 are part of the first housing 102. The window 126, the first lens 128, the second lens 130, the third lens 132, and the fourth lens 134 may also couple to the first cover 120. As will be explained herein, the first cover 120 may include cutouts, pockets, and the like for receiving the window 126, the first lens 128, the second lens 130, the third lens 132, and/or the fourth lens 134. As will also be explained herein, a camera of the security camera device 100 may reside within the first housing 102 and beneath the window 126, a RADAR and/or IR LEDs of the security camera device 100 may reside within the first housing 102 and beneath the first lens 128, PIR sensor(s) of the security camera device 100 may reside within the first housing 102 and beneath the second lens 130, LEDs of the security camera device 100 may reside within the first housing 102 and beneath the third lens 132, and/or LEDs of the security camera device 100 may reside within the first housing 102 and beneath the fourth lens 134.

In some instances, the window 126, the first lens 128, the second lens 130, the third lens 132, and/or the fourth lens 134 may include a material that is transparent or translucent to permit the camera, PIR sensor(s), and LEDs to detect motion, emit light, and so forth, respectively. Example materials may include glass and polycarbonate.

The top 112 includes a button 136, which in some instances, is part of the cap 122 and/or is disposed through an opening in the cap 122. The button 136 may correspond to a setup button, a power button, a wireless connectivity button, a mute button, a volume button, a sync button, or any other type of button or control. The button 136 may be mechanical (e.g., having physically movable components) and/or electronic (e.g., capacitive sensors, optical sensors, touch screen, or the like).

The second housing 104, as explained herein, may include a loudspeaker oriented to emit sound in a direction away from the security camera device 100. A loudspeaker grill 138 (e.g., speaker mesh) may couple to the second cover 124 to permit sound generated by the loudspeaker to exit the security camera device 100.

Figure 2:
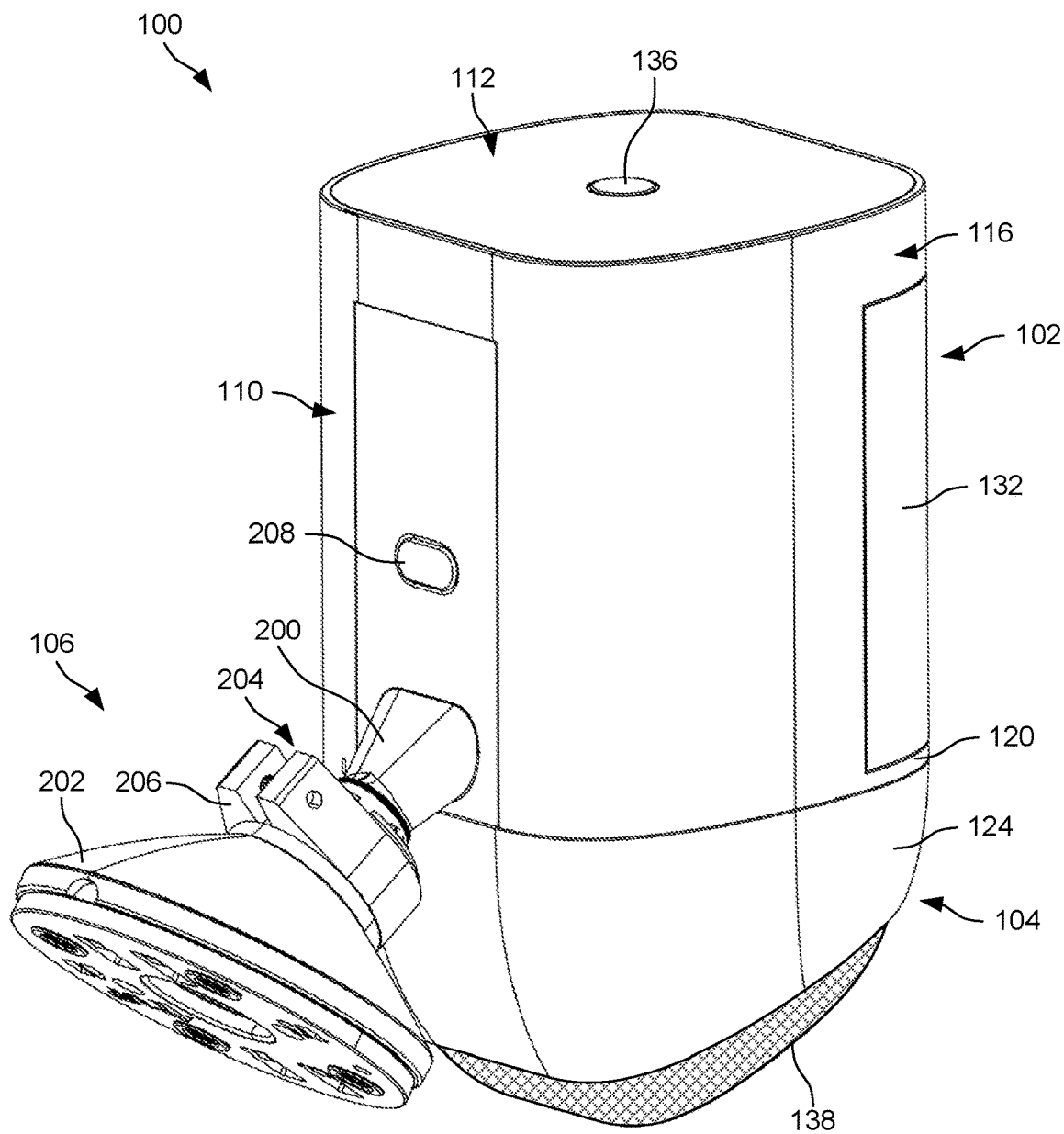
FIG. 2 illustrates a rear perspective view of the security camera device of FIG. 1, according to examples of the present disclosure.

FIG. 2 illustrates a rear perspective view of the security camera device 100, according to examples of the present disclosure. The security camera device 100 includes the first housing 102 having the third lens 132 disposed on the front 108 and the first side 116 and the button 136 located on the top 112. Additionally, the first housing 102 includes an arm 200 that extends from the back 110 of the security camera device 100 or the first cover 120. The arm 200 may be received by (or within) the mount 106. For example, the mount 106 may include a base 202 for securing the security camera device 100 to a surface (via fasteners), a socket 204, and a clamp 206. The socket 204 may represent a receptacle for receiving the arm 200 (e.g., a ball of the arm 200). The clamp 206 may be tightened and loosened such than an orientation of the security camera device 100 may be adjusted.

The back 110 is also shown including a port 208, which in some instances, may represent a USB-C port. The port 208 may accept a cable for receiving power to power components of the security camera device 100, for recharging batteries of the security camera device 100, for connecting with one or more networks (e.g., Ethernet cable), for connecting the security camera device 100 to a solar panel, and so forth.

The second housing 104 is shown including the loudspeaker grill 138 disposed on the bottom 114 of the security camera device 100, coupled to the second cover 124.

Figure 3:
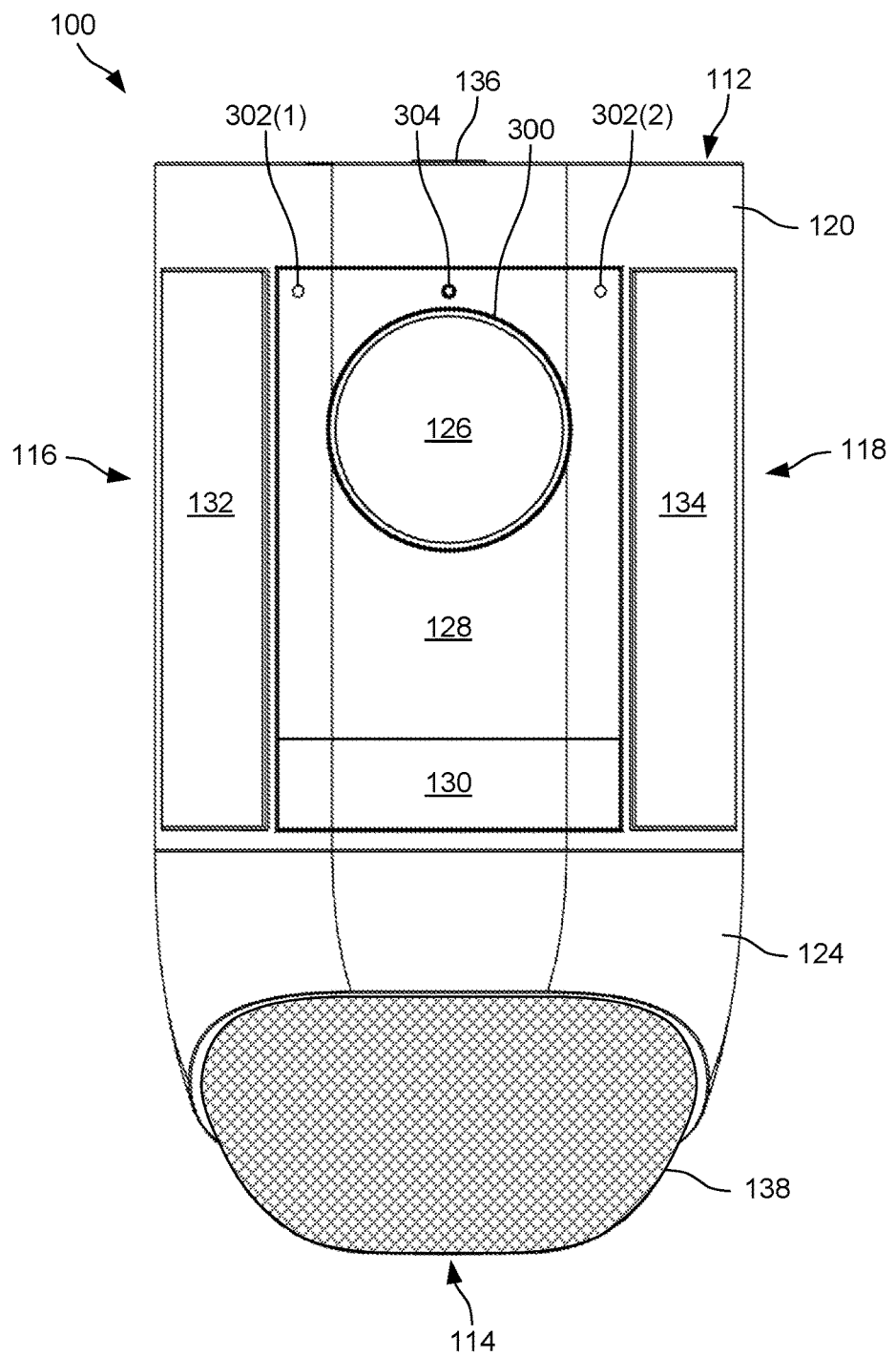
FIG. 3 illustrates a front view of the security camera device of FIG. 1, according to examples of the present disclosure.

FIG. 3 illustrates a front view of the security camera device 100, according to examples of the present disclosure. The first housing 102 is shown including the window 126, the first lens 128, the second lens 130, the third lens 132, and the fourth lens 134. The first lens 128, the second lens 130, the third lens 132, and the fourth lens 134 may be disposed with receptacles of the first cover 120. The first lens 128 is shown including an opening 300 (e.g., circular opening) through which the window 126 is disposed, such that the window 126 may reside within the first lens 128. The second lens 130 is shown located vertically below the window 126 and the first lens 128. The window 126, the first lens 128, and the second lens 130 also reside between the third lens 132 and the fourth lens 134 (e.g., horizontally). In some instances, the window 126 may be substantially circular shaped, the first lens 128 may be substantially rectangular shaped, the second lens 130 may be substantially rectangular shaped, the third lens 132 may be substantially rectangular shaped, and/or the fourth lens 134 may be substantially rectangular shaped. In some instances, a top of the first lens 128 may be aligned with a top of the third lens 132 and/or the fourth lens 134, and/or a bottom of the first lens 128 may be aligned with a bottom of the third lens 132 and/or the fourth lens 134.

The first lens 128 may define a first microphone port 302(1) and a second microphone port 302(2). In some instances, the microphone ports 302 may be located closer to the top 112 than the window 126. In some instances, the first microphone port 302(1) is located closer to the first side 116 of the security camera device 100, and the second microphone port 302(2) is located closer to the second side 118 of the security camera device 100. As will be explained herein, microphone(s) of the security camera device 100 may reside beneath (Z-direction) the microphone ports 302 such that sound may reach the microphones. That is, the microphone(s) may receive sound, for instance, via the microphone ports 302. In some instances, the microphone ports 302 may be aligned with the microphones, or vice versa. Additionally, the microphones and/or the microphone ports 302 may be encased with foam that acoustically seals the microphones to minimize sound received and/or generated via other portions of the security camera device 100. For example, the foam may isolate the microphones from one or more of the loudspeaker(s) to minimize an intensity of audio received from the loudspeaker(s).

The first lens 128 may also include an area 304 through which light is emitted via a status indicator. For example, a status indicator may reside beneath the first lens 128, and emit light through the area 304 of the first lens 128. In some instances, the status indicator (e.g., RGB LED) indicates an operational state of the security camera device 100. As shown, the area 304 of the first lens 128 may be located between the microphone ports 302, and may be disposed vertically above the window 126. In some instances, the area 304 may be an opening, or a portion of the first lens 128 that is transparent to light emitted by the status indicator. In some instances, the status indicator is centered between the microphone ports 302.

The top 112 includes the button 136, which in some instances, is proud of the top 112 (e.g., extends beyond an exterior surface of the top 112). In some instances, the button 136, the area 304, and the window 126 may be centrally aligned (e.g., in the X-direction). As shown, the first housing 102 (or the first cover 120), may be substantially rectangular shaped, while the second housing 104 (or the second cover 124) may include a taper. For example, in a direction between the top 112 and the bottom 114, the exterior surface may taper.

Figure 4:
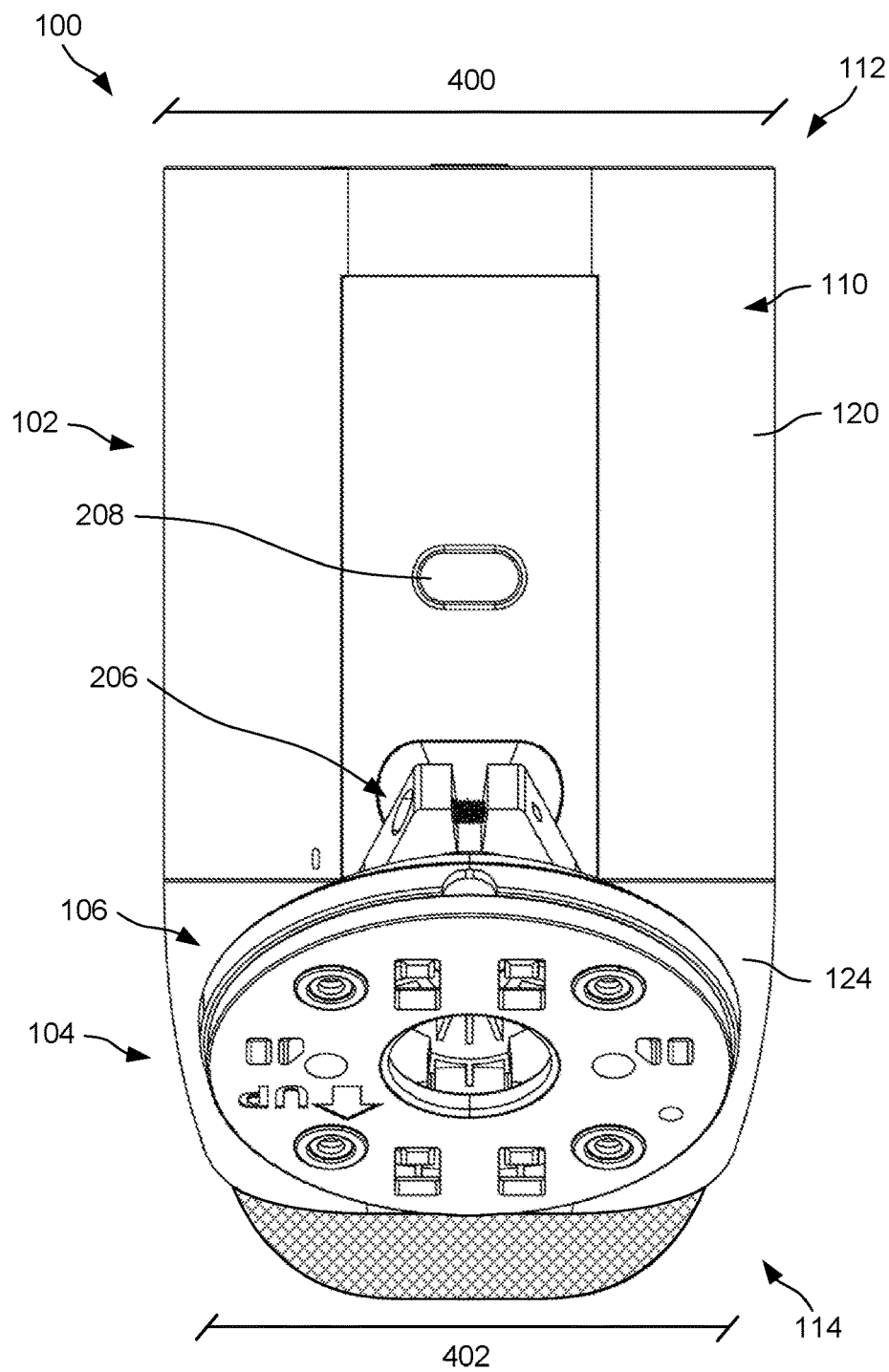
FIG. 4 illustrates a rear view of the security camera device of FIG. 1, according to examples of the present disclosure.

FIG. 4 illustrates a rear view of the security camera device 100, according to examples of the present disclosure. In some instances, the port 208 and the arm 20 are centrally located (e.g., in the X-direction) on the back 110. In doing so, the mount 106 may be aligned with the security camera device 100.

In some instances, and as noted above in FIG. 4, the security camera device 100 may taper between the top 112 and the bottom 114. For example, security camera device 100 (or the first housing 102 or the first cover 120) may include a first width 400 (e.g., in the X-direction) proximate to the top 112, and the second housing 104 or the second cover 124 has a second width 402 (e.g., in the X-direction) proximate to the bottom 114. The first width 400 may be greater than the second width 402. In some instances, the first housing 102 may include the first width 400 along a height (e.g., in the Y-direction) of the first housing 102. In some instances, the second housing 104 may include a variable width along a height of the second housing 104 (e.g., the first width 400, the second width 402, a width of the loudspeaker grill 138, and so forth).

The mount 106 may include various holes, channels, and so forth for mounting the security camera device 100 to a surface. In some instances, a rubber foot, for example, may be disposed on the mount 106 to reduce vibrations being imparted to the security camera device 100 and/or to secure the mount 106 to the surface (e.g., increased friction).

Figure 5:
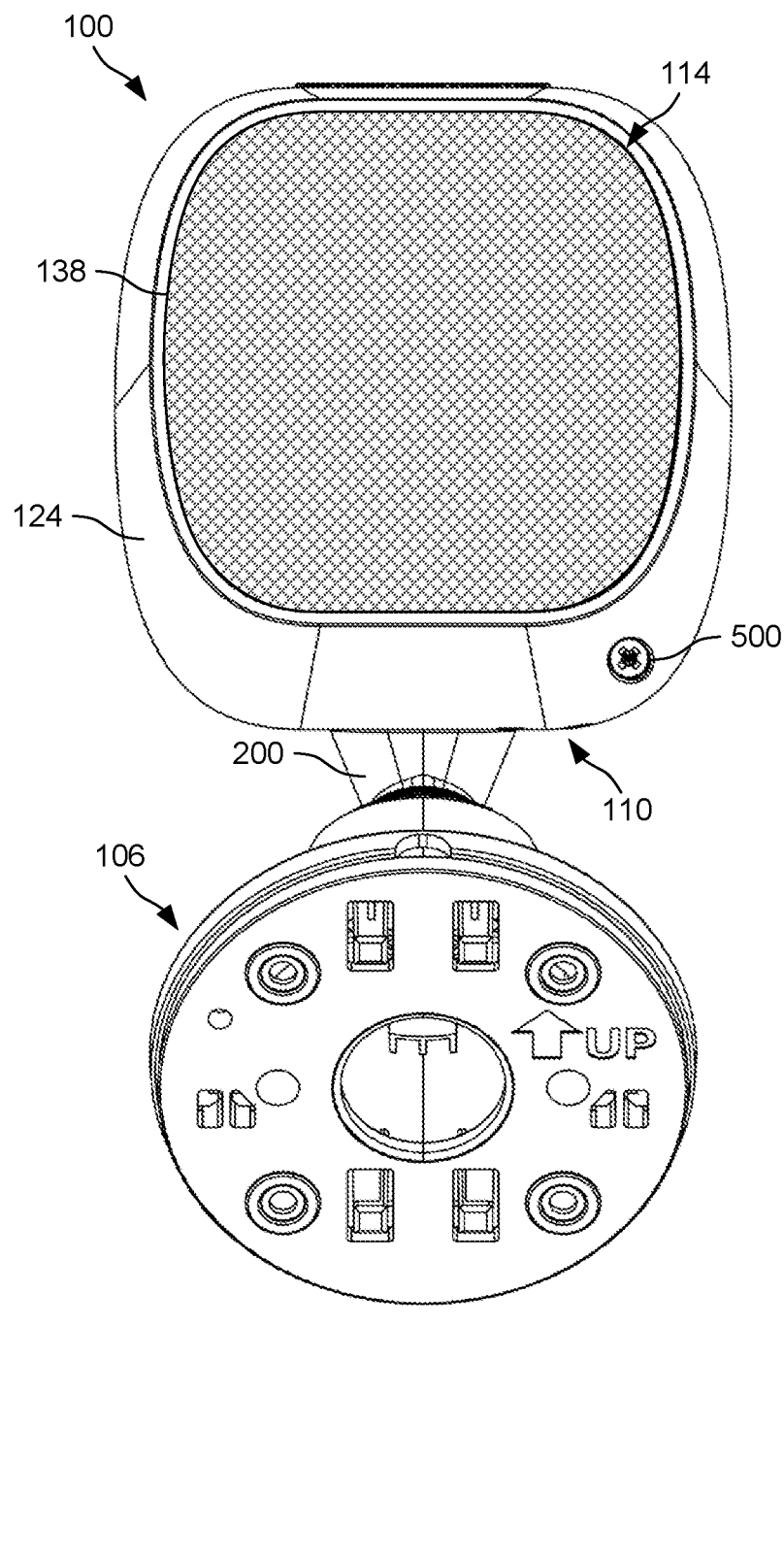
FIG. 5 illustrates a bottom view of the security camera device of FIG. 1, according to examples of the present disclosure.

FIG. 5 illustrates a bottom view of the security camera device 100, according to examples of the present disclosure. The bottom 114 is shown including the loudspeaker grill 138 through which sound output by the loudspeaker(s) passes. The arm 200 is also shown extending from the back 110 of the first housing 102 for engaging with the mount 106.

As noted above, the first housing 102 and the second housing 104 may couple together via a twist and lock mechanism. In some instances, a fastener 500 may also be used to couple to the first housing 102 and the second housing 104 together. For example, after the first housing 102 and the second housing 104 are coupled together via the twist and lock mechanism, the fastener 500 may be used to further secure the first housing 102 and the second housing 104 together. This may, for example, prevent an uncoupling of the first housing 102 and the second housing 104. That is, the first housing 102 and the second housing 104 may be restricted from rotating when the fastener 500 is tightened (e.g., thereby coupling the first housing 102 and the second housing 104).

Figure 6:
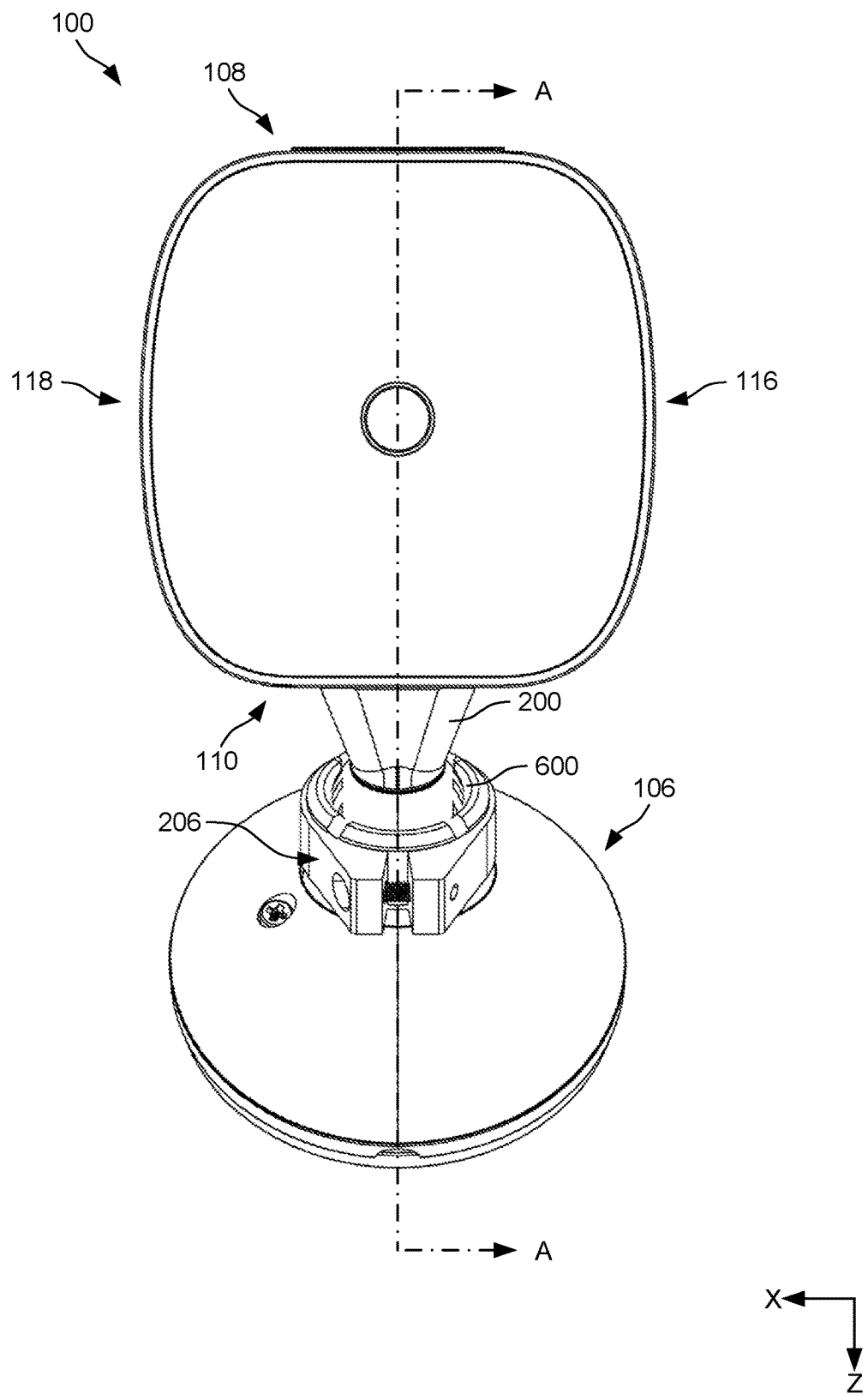
FIG. 6 illustrates a top view of the security camera device of FIG. 1, according to examples of the present disclosure.

FIG. 6 illustrates a top view of the security camera device 100, according to examples of the present disclosure. The security camera device 100 includes the front 108, the back 110, the first side 116, and the second side 118. The arm 200 is shown extending from the back 110 for coupling to the mount 106. The arm 200 includes a ball 600 that is received within the socket 204 of the mount 106, and the clamp 206 secures the ball 600 and the socket 204 together.

Figure 8:
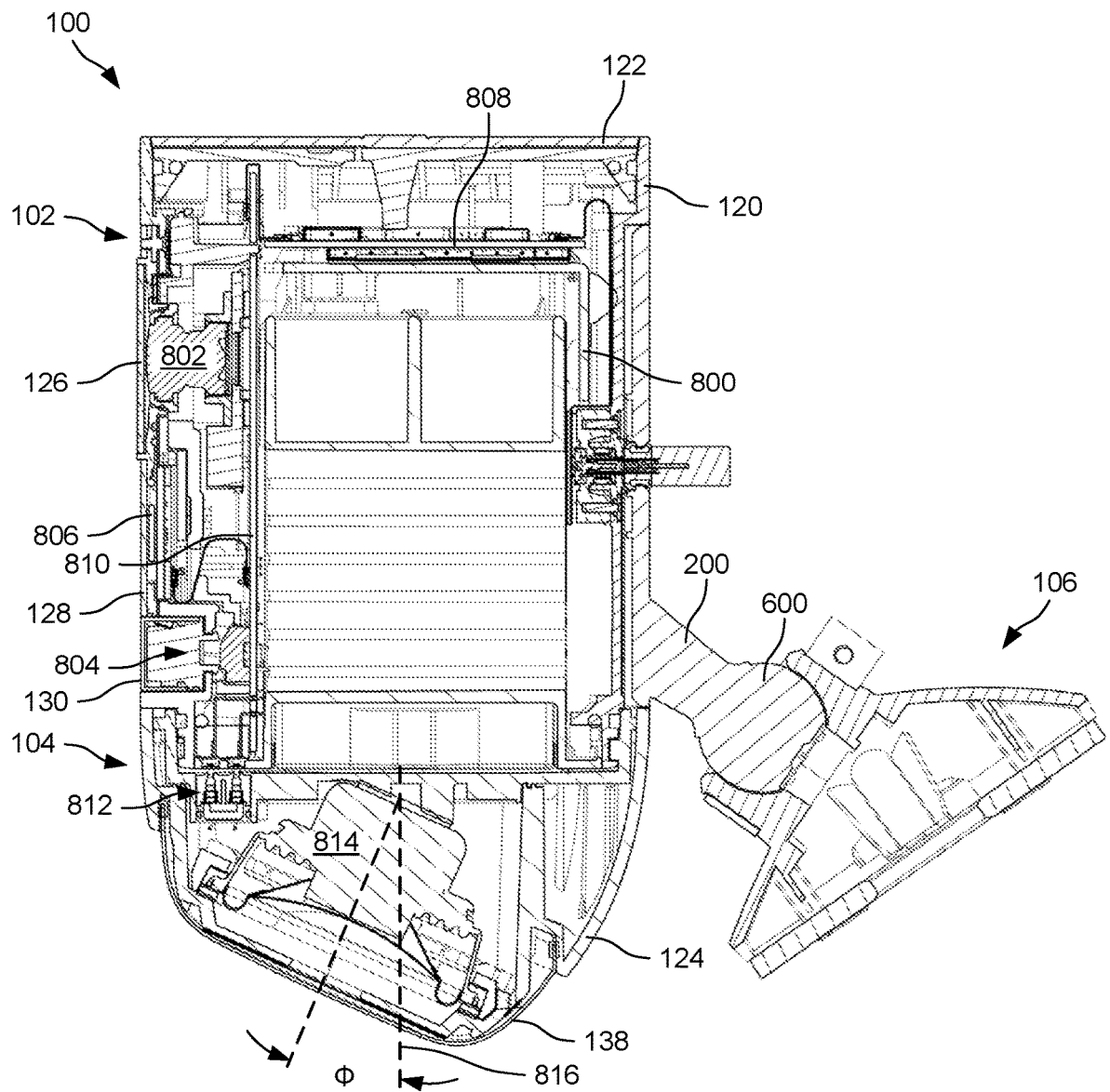
FIG. 8 illustrates a cross-sectional view of the security camera device of FIG. 1, taken along line A-A of FIG. 6, according to examples of the present disclosure.

A line A-A is shown extending through the security camera device 100, which is used to illustrate a cross-sectional view of the security camera device in FIG. 8.

Figure 7A:
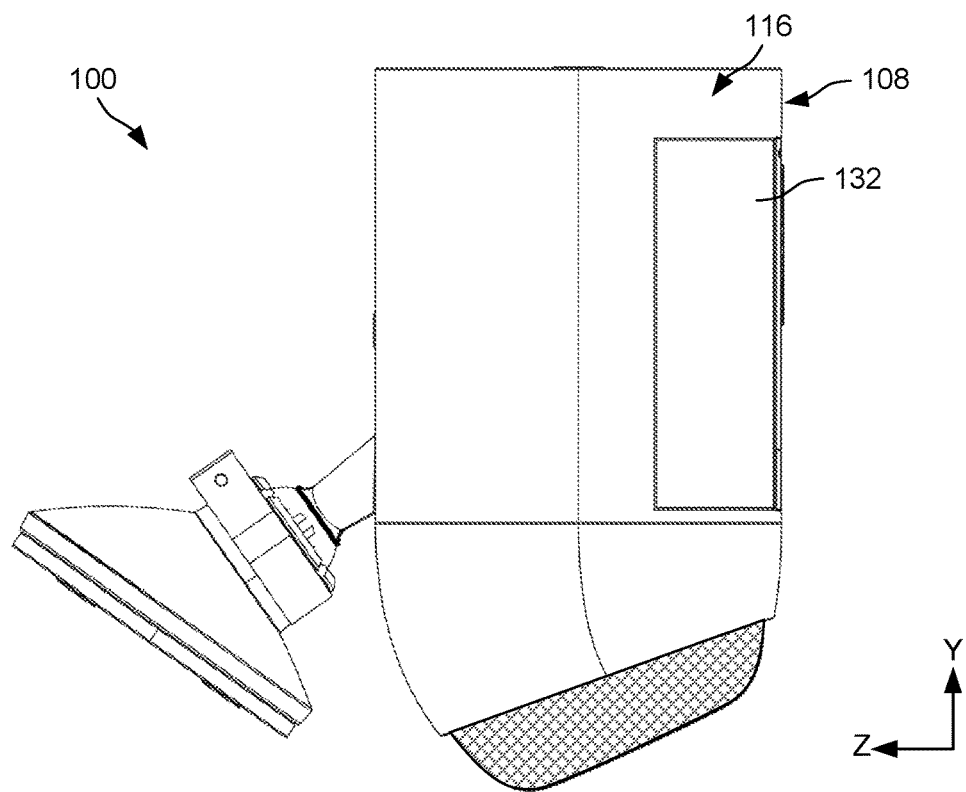
FIG. 7A illustrates a first side view of the security camera device of FIG. 1, according to examples of the present disclosure.
Figure 7B:
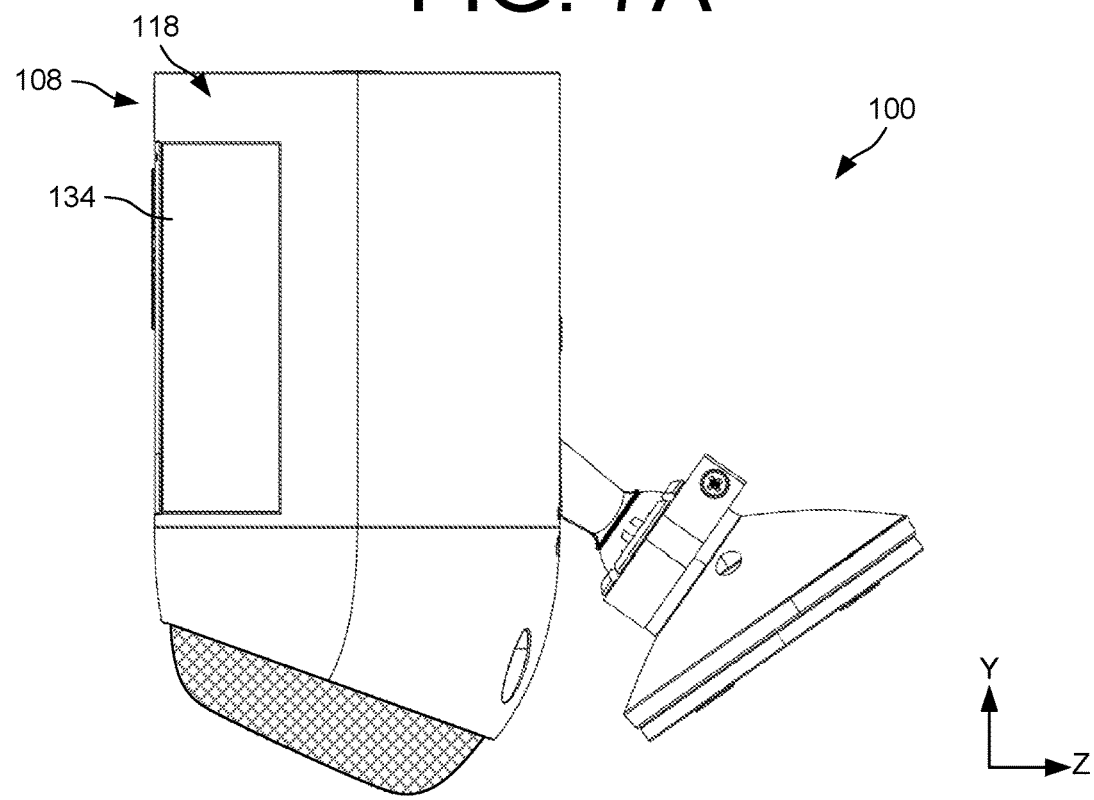
FIG. 7B illustrates a second side view of the security camera device of FIG. 1, according to examples of the present disclosure.

FIGS. 7A and 7B illustrate side views of the security camera device 100, according to examples of the present disclosure. FIG. 7A illustrates the first side 116 of the security camera device 100, while FIG. 7B illustrates the second side 118 of the security camera device 100. The third lens 132 may extend from the front 108 onto the first side 116, while the fourth lens 134 may extend from the front 108 onto the second side 118.

The loudspeaker may be oriented in a direction to output sound out and away from the security camera device 100. Orienting the loudspeaker in this manner may project sound outwards, in front of the security camera device 100 and/or to the sides of the security camera device 100. In other words, the loudspeaker may be oriented away from the back 110 of the security camera device 100.

FIG. 8 illustrates a cross-sectional view of the security camera device 100, taken along line A-A of FIG. 6, according to examples of the present disclosure. The first cover 120 and the second cover 124 are shown being disposed around components of the first housing 102 and the second housing 104, respectively, such that components of the first housing 102 and the second housing 104 reside within the first cover 120 and the second cover 124, respectively. Additionally, the cap 122 is shown being coupled to the first cover 120, and the loudspeaker grill 138 is shown being coupled to the second cover 124.

The security camera device 100 is shown including a battery housing 800, a camera 802, PIR sensor(s) 804, and a RADAR sensor 806. The battery housing 800, the camera 802, the PIR sensor(s) 804, and the RADAR sensor 806 are shown being disposed within the first housing 102. The camera 802 and the PIR sensor(s) 804 may be oriented towards the front of the security camera device 100 (e.g., in a first direction). Additionally, the camera 802 is disposed beneath (e.g., Z-direction) the window 126, while the RADAR sensor 806 may be disposed beneath (e.g., Z-direction) the first lens 128. The PIR sensor(s) 804 may be disposed beneath the second lens 130. As will be explained herein, the battery housing 800 may include receptacles for receiving batteries (e.g., two batteries) of the security camera device 100.

The security camera device 100 may include various PCBAs and/or PCBs for controlling an operation of the security camera device 100 and/or to enable function of the security camera device 100. Any number of PCBAs and/or PCBs (or like processors, memory, modules, controllers, etc.) may be included. In some instances, the PCBAs and/or PCBs may be disposed in the first housing 102 and/or the second housing 104. For example, the first housing 102 may include a PCB 808 and a PCBA 810. The PCB 808 may be disposed beneath the cap 122 (e.g., in the Y-direction), vertically above the battery housing 800. The PCB 808 may include or communicatively couple to the button 136. Additionally, as will be explained herein, the PCB 808 may include communicatively couple to network interfaces (e.g., antenna(s)) of the security camera device 100. The PCB 808 may also communicatively couple to the batteries within the battery housing 800, as well as the port 208.

The PCBA 810 may be disposed on the front 108 of the security camera device 100, between the battery housing 800 and the front 108. In some instances, the camera 802, the PIR sensor(s) 804, the RADAR sensor 806, as well as other components, may couple to, be disposed on, or communicatively couple to the PCBA 810. Various connections (e.g., flex circuits) may communicatively couple the PCB 808, the PCBA 810, and other computing components of the security camera device 100. Additionally, the security camera device 100 may include a contact connection 812 between the first housing 102 and the second housing 104 for communicatively coupling computing components in the first housing 102 with computing components in the second housing 104. For example, power may be routed from the first housing 102 and the second housing 104, via the contact connection 812, for transmitting power to a loudspeaker 814. As will be explained herein, the contact connection 812 may include first contacts of the first housing 102 that mate or otherwise engage with second contacts of the second housing 104. The first contacts and the second contacts may be brought into contact when the first housing 102 and the second housing 104 couple together, and may be brought out of contact when the first housing 102 and the second housing 104 uncouple. In some instances, the PCBA 810 may couple to a front of the battery housing 800, while the PCB 808 may couple to a top of the battery housing 800.

The loudspeaker 814 may reside beneath the loudspeaker grill 138, and oriented in a direction away from the back 110 of the security camera device 100, so as to output sound in front and to the sides of the security camera device 100. In some instances, an axis 816 (vertical axis/plane) may be disposed orthogonally through a center of the security camera device 100, and the loudspeaker 814 may be oriented relative to the axis 816. In some instances, the loudspeaker 814 is oriented at an angle @ relative to the axis 816. In some instances, the angle @ may be between approximately ten degrees and forty-five degrees. As such, the loudspeaker 814 may be oriented towards the front and away from the axis 816 (or a central vertical plan through the security camera device 100).

The arm 200 is also shown extending from the back 110 of the security camera device 100 (e.g., from the first cover 120), and includes the ball 600 for being received by the mount 106.

Figure 9:
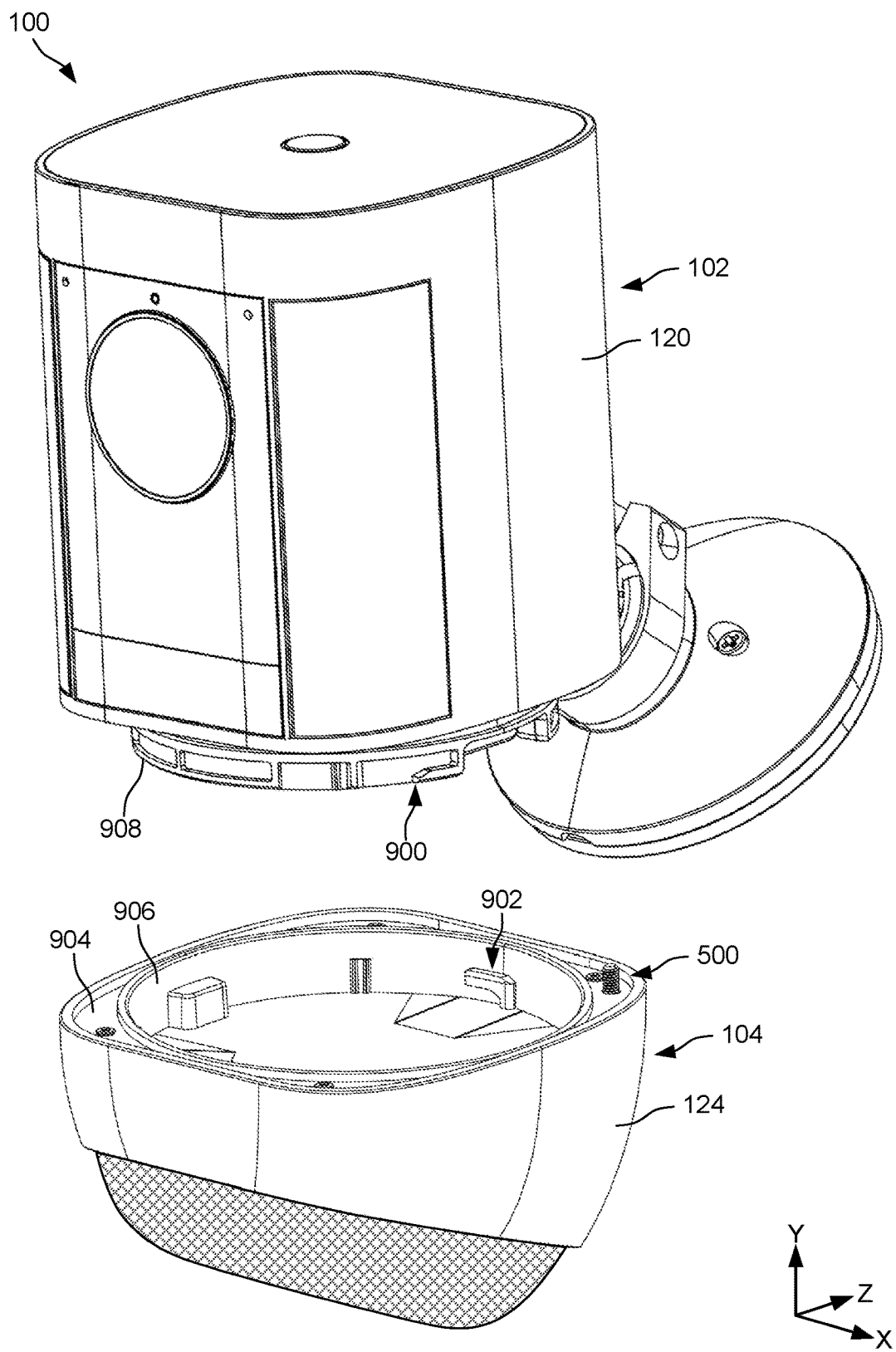
FIG. 9 illustrates a partially exploded view of the security camera device of FIG. 1, showing an example top (first) housing and an example bottom (second) housing of the security camera device, according to examples of the present disclosure.

FIG. 9 illustrates a partially exploded view of the security camera device 100, showing the first housing 102 and the second housing 104 being separated (e.g., in the Y-direction), according to examples of the present disclosure.

The first housing 102, or the first cover 120, may include first attachment mechanisms 900 that engage with second attachment mechanisms 902 of the second housing 104. In some instances, the second attachment mechanisms 902 may be formed within a frame 904 of the second housing 104 to which the second cover 124 couples. In some instances, the first attachment mechanisms 900 may resemble tabs, hooks, protrusions, keys, keyways, slots, or other male/female connectors that are complimentary to engage with the second attachment mechanisms 902 (e.g., tabs, hooks, protrusions, keys, keyways, slots, or other male/female connectors).

The first attachment mechanisms 900 may couple with the second attachment mechanisms 902 when the first housing 102 and/or the second housing 104 is rotated. That is, the first attachment mechanisms 900 may engage with and secure to the second attachment mechanisms 902 when the first housing 102 and/or the second housing 104 are rotated into contact with one another. As an example, the first attachment mechanisms 900 may include a keyway, and the second attachment mechanisms 902 may include a hook or a tab that is configured to engage with the keyway when rotated. In some instances, given that the first housing 102 may couple to a surface (via the mount 106), the second housing 104 may be more easily rotated to couple the first housing 102 and the second housing 104 together. In such instances, the second housing 104 may be rotated in a first direction (e.g., clockwise about the Y-axis) to engage the first attachment mechanisms 900 and the second attachment mechanisms 902, while the second housing 104 may be rotated in a second direction (e.g., counterclockwise about the Y-axis) to disengage the first attachment mechanisms 900 and the second attachment mechanisms 902. Additionally, in some instances, when engaged, the fastener 500 may be used to additionally couple the first housing 102 and the second housing 104.

In some instances, the first attachment mechanisms 900 may be formed on and/or within an exterior surface of the first cover 120. The first attachment mechanisms 900 may be disposed annularly around a perimeter 908 at a bottom end of the first cover 120. The second attachment mechanisms 902 may be formed within an annulus 906 of the frame 904. In some instances, the second attachment mechanisms 902 may be disposed annularly around the annulus 906. The perimeter 908 of the first cover 120 is insertable into the annulus 906 of the frame 904, or stated alternatively, the annulus 906 is configured to be disposed over the perimeter 908 of the first cover 120 for engaging with the first attachment mechanisms 900.

Any number of the first attachment mechanisms 900 and the second attachment mechanisms 902 may be included. For example, the security camera device 100 may include two of the first attachment mechanisms 900 that engage with two of the second attachment mechanisms 902. However, more than or less than two of the first attachment mechanisms 900 and the second attachment mechanisms 902 may be included.

Figure 10:
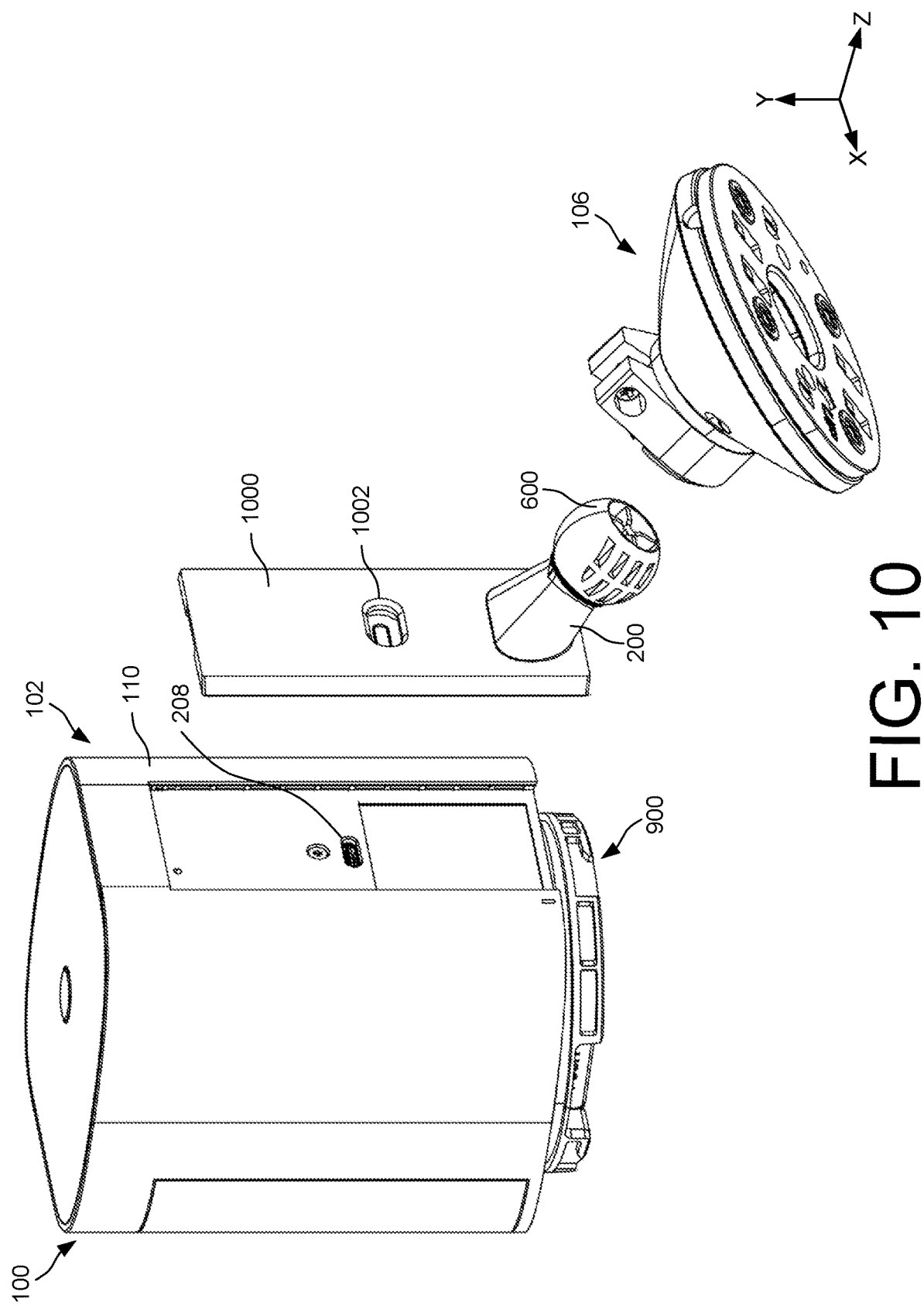
FIG. 10 illustrates a partially exploded view of the security camera device of FIG. 1, showing the top housing of FIG. 9 and an example mount configured to couple to the top housing, according to examples of the present disclosure.

FIG. 10 illustrates a partially exploded view of the security camera device 100, showing the mount 106 being separated from the first housing 102, according to examples of the present disclosure. In some instances, the arm 200 and the ball 600 may be components of a plate 1000 that couples to the back 110 of the first housing 102 (or the first cover 120). For example, the arm 200 may extend from the plate 1000 for engaging with the mount 106. In some instances, the plate 1000 may couple to the first cover 120 via fasteners, snap-fits, pressure fits, and/or adhesives. The plate 1000 may also include a passage 1002 for accommodating the port 208. The first attachment mechanisms 900 are also shown disposed on the first cover 120.

Figure 11:
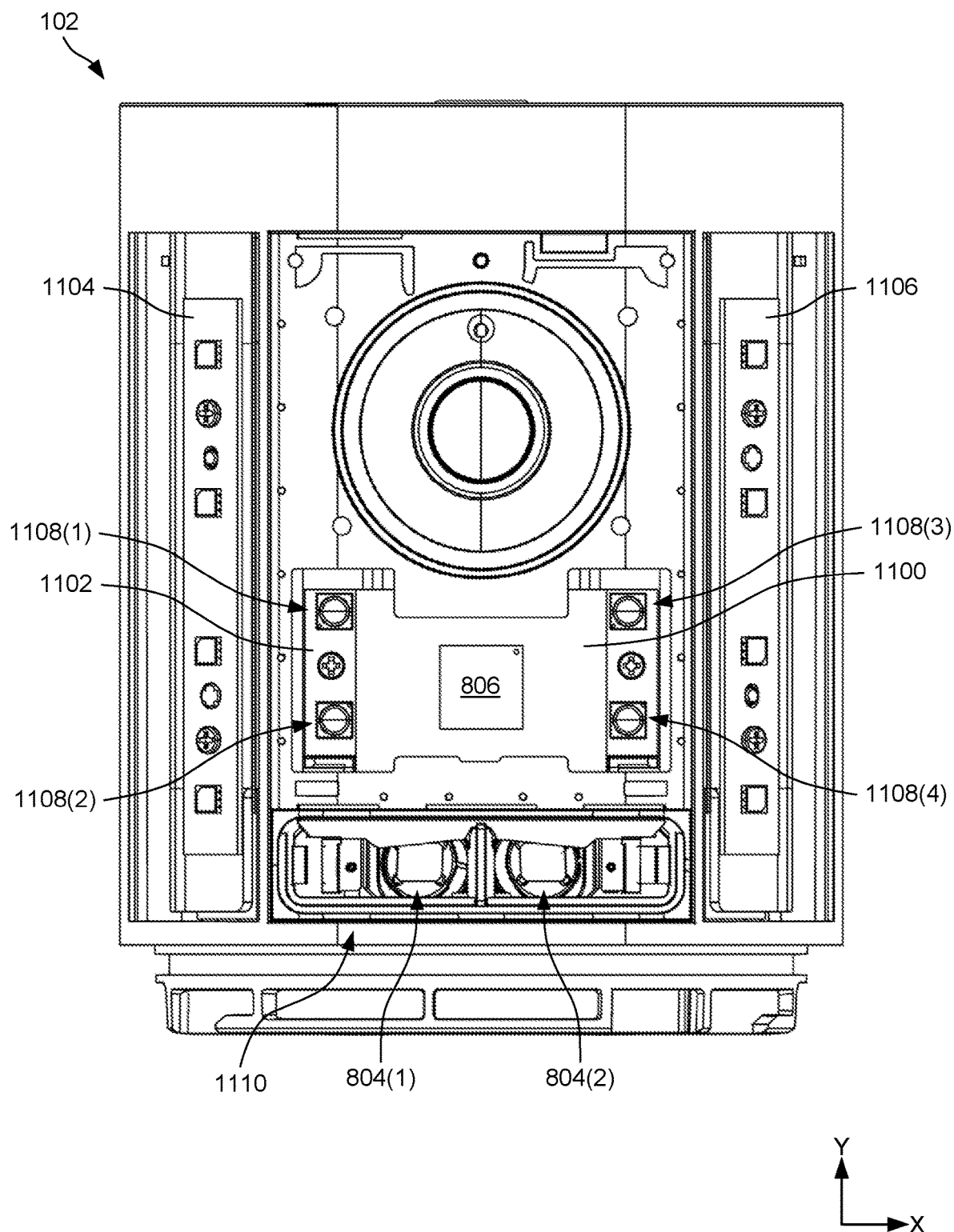
FIG. 11 illustrates example components disposed within the top housing of FIG. 9, according to examples of the present disclosure.

FIG. 11 illustrates a frontal view of the first housing 102, according to examples of the present disclosure. The window 126, the first lens 128, the second lens 130, the third lens 132, and the fourth lens 134 are removed to illustrate components of first housing 102.

Removing the window 126, the first lens 128, the second lens 130, the third lens 132, and the fourth lens 134 exposes components of the first housing 102. For example, the first housing 102 may include the RADAR sensor 806, a RADAR PCB 1100, an IR LED PCB 1102 having IR LEDs 1108, a first LED PCB 1104, and a second LED PCB 1106. The RADAR PCB 1100, the IR LED PCB 1102, the first LED PCB 1104, and the second LED PCB may communicatively couple to the PCB 808 and/or the PCBA 810, as well as additional computing components of the security camera device 100.

The RADAR sensor 806 may be mounted on the RADAR PCB 1100. In some instances, the RADAR PCB 1100 is disposed in front of the IR LED PCB 1102 (e.g., towards the front 108). In some instances, the IR LEDs 1108 may include a first IR LED 1108(1), a second IR LED 1108(2), a third IR LED 1108(3), and a fourth IR LED 1108(4). In some instances, the IR LEDs 1108 may be disposed at corners of the IR LED PCB 1102. The IR LEDs 1108 are oriented to emit IR light through the first lens 128, outwards from the front 108 of the security camera device 100. The IR LED PCB 1102 may include IR sensor(s) configured to detect the IR light reflected from objects within an environment of the security camera device 100. Such reflections may be used to detection motion around the security camera device 100. The first IR LED 1108(1) and the second IR LED 1108(2) may be disposed to a first side of the RADAR sensor 806 and/or the RADAR PCB 1100, and the third IR LED 1108(3) and the fourth IR LED 1108(4) may be disposed to a second side of the RADAR sensor 806 and/or the RADAR PCB 1100.

As shown and described in FIG. 12, the first LED PCB 1104 may include one or more white LEDs (e.g., four) and the second LED PCB 1106 may include one or more white LEDs (e.g., four). The white LEDs may emit visible light. The first LED PCB 1104 may reside beneath the third lens 132 and the second LED PCB 1106 may reside beneath the fourth lens 134. As such, the LEDs on the first LED PCB 1104 may emit light through the third lens 132, and the LEDs on second LED PCB 1106 may emit light through the fourth lens 134.

The first housing 102 may also include a PIR assembly 1110, which includes the PIR sensor(s) 804, such as a first PIR sensor 804(1) and a second PIR sensor 804(2). As shown, the PIR sensor(s) 804 are located vertically below the RADAR sensor 806, the RADAR PCB 1100, and IR LEDs 1108. The PIR sensor(s) 804 are oriented to sense motion in front of the security camera device 100, for example, via sensing mid-IR light emitted by persons. Additional details of the PIR assembly 1110 are discussed herein with regard to FIGS. 22A-26B.

FIG. 12 illustrates a frontal view of the first housing 102, according to examples of the present disclosure. The first cover 120 is removed to illustrate components of first housing 102. In some instances, the first LED PCB 1104 may include first LEDs 1200 (e.g., four), and/or the second LED PCB 1106 may include second LEDs 1202 (e.g., four). In some instances, the first LEDs 1200 and the second LEDs 1202 may be arranged in a vertical manner on the front 108 of the security camera device 100, behind the third lens 132 and the fourth lens 134, respectively In some instances, the first LEDs 1200 and the second LEDs 1202 may be equidistantly spaced apart along a length of the first LED PCB 1104 and the second LED PCB 1106. The first LED PCB 1104 and the second LED PCB 1106 may be angled outwards so as to output light in front of and to the sides of the security camera device 100, respectively.

The first housing 102 includes first foam 1204 for acoustically sealing a first microphone of the security camera device 100, and second foam 1206 for acoustically sealing a second microphone of the security camera device 100. The first foam 1204 and the second foam 1206 may include ports (e.g., openings) through which sound travels to reach the microphones, respectively. The camera 802 resides above the RADAR sensor 806, horizontally between the first LED PCB 1104 and the second LED PCB 1106. In some instances, the camera 802 may be centrally aligned with the RADAR sensor 806, the RADAR PCB 1100, and the IR LED PCB 1102.

As shown, the camera 802, the IR LEDs 1108, and/or the RADAR sensor 806 may be oriented in the same direction (e.g., towards the front). The first LEDs 1200 and the second LEDs 1202 may be oriented in towards the front and/or the sides, respectively.

FIG. 13 illustrates a frontal view of the first housing 102, according to examples of the present disclosure. From FIG. 12, the first LED PCB 1104, the second LED PCB 1106, the RADAR sensor 806, the RADAR PCB 1100, the first foam 1204, and the second foam 1206 are removed to illustrate components of first housing 102.

Removing the first foam 1204 and the second foam 1206 exposes a microphone flexible printed circuit (FPC) 1300. The microphone FPC 1300 may communicatively couple to microphones of the security camera device 100. The microphone FPC 1300 communicatively couples to the PCB 808 and the PCBA 810. A status indicator 1302 (e.g., LED) is shown being located above the camera 802, as well as an ambient light sensor 1304. The status indicator 1302 may output information associated with an operation state of the security camera device 100, such as whether the microphone(s) are recording audio, whether the camera 802 is capturing video, and so forth. The ambient light sensor 1304 may be used to determine lighting conditions of the environment of the security camera device 100, for example, when switching between daytime and nighttime modes (or light and dark lighting conditions). In some instances, the camera 802, the status indicator 1302, and the ambient light sensor 1304 may be centrally aligned with one another (e.g., in the X-direction).

The first LED PCB 1104 and the second LED PCB 1106, as well as other components of the first housing 102 such as the IR LED PCB 1102, may couple to a heat dissipating element 1306. In some instances, the heat dissipating element 1306 is disposed across the front 108, the first side 116, and/or the second side 118 of the security camera device 100. The heat dissipating element 1306 may assist in dispersing heat away from the first LED PCB 1104 and the second LED PCB 1106 (or the LEDs disposed thereon). As will be explained herein, the heat dissipating element 1306 may couple to a midframe of the first housing 102. The heat dissipating element 1306 also provides openings for routing power and/or signals to the first LED PCB 1104 (and the first LEDs 1200) and the second LED PCB 1106 (and the second LEDs 1202). For example, a first wire 1308 may couple to the first LED PCB 1104, and a second wire 1310 may couple to the second LED PCB 1106. In some instances, an opposite end of the first wire 1308 and the second wire 1310 not coupled to the first LED PCB 1104 and second LED PCB 1106, respectively, may couple to the PCB 808.

The IR LED PCB 1102 is shown including a plurality of RADAR pad(s) 1312. The RADAR pad(s) 1312 may represent pads disposed about the IR LED PCB 1102. The RADAR pad(s) 1312 may receive RADAR signals emitted by the RADAR sensor 806 for determining coordinates and/or a position of motion within the environment. Although a particular number of the RADAR pad(s) 1312 are shown, any number of RADAR pad(s) 1312 may be included. In some instances, the RADAR pad(s) 1312 may be arranged around an opening 1314 of the IR LED PCB 1102. For example, a flex circuit may route through the opening 1314 to communicatively couple to the RADAR sensor 806 (and the RADAR sensor 806).

Figure 14:
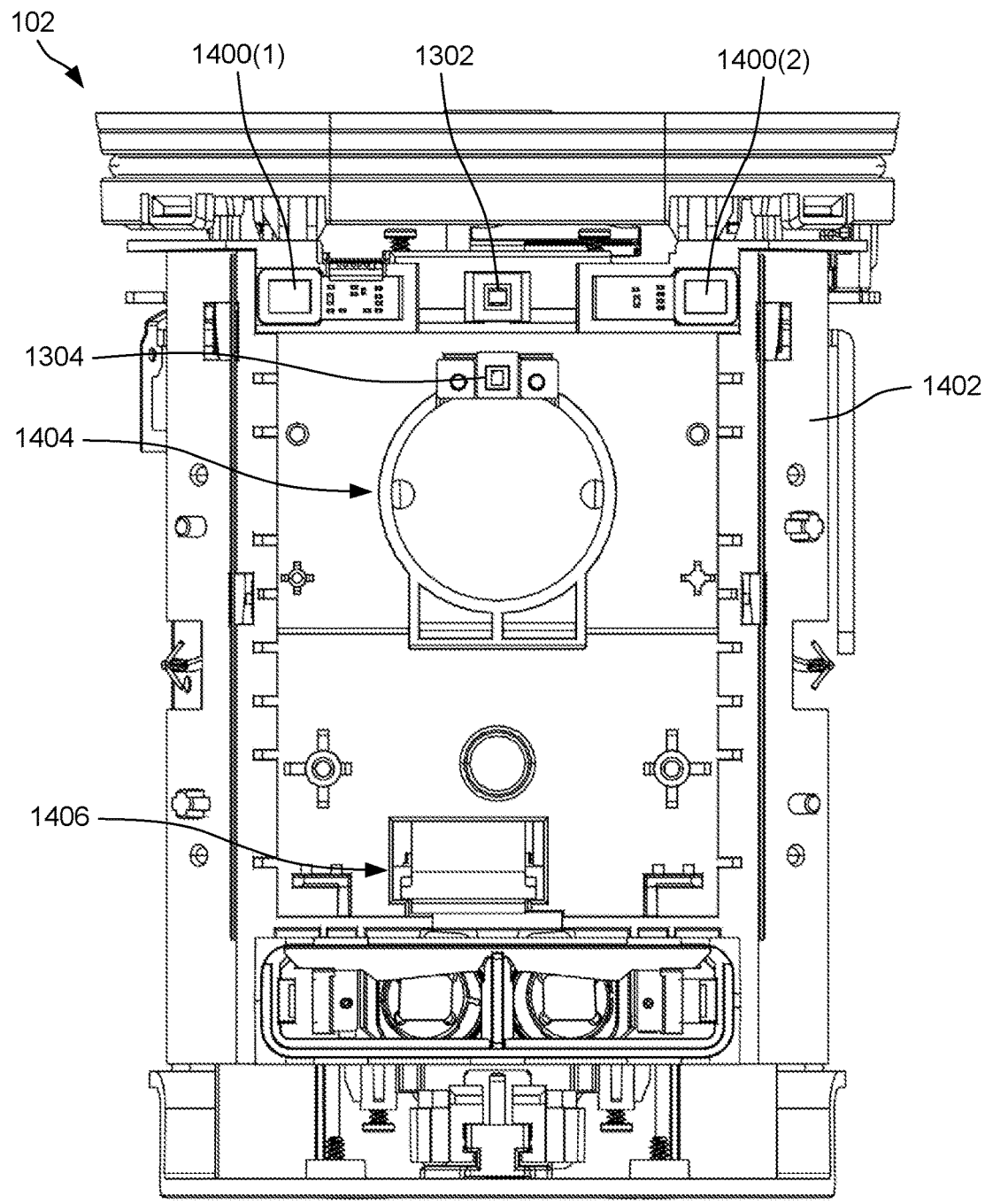
FIG. 14 illustrates example components disposed within the top housing of FIG. 9, according to examples of the present disclosure.

FIG. 14 illustrates a frontal view of the first housing 102, according to examples of the present disclosure. From FIG. 13, the IR LED PCB 1102 (including the IR LEDs 1108), the microphone FPC 1300, the camera 802, and the heat dissipating element 1306 are removed to illustrate components of first housing 102.

The security camera device 100 includes microphones 1400, such as a first microphone 1400(1) and a second microphone 1400(2). The first microphone 1400(1) may be aligned with the first microphone port 302(1) and the second microphone 1400(2) may be aligned with the second microphone port 302(2). In doing so, the microphone ports 302 assist in transferring or directing sound that is external to the security camera device 100 to the microphones 1400 located within the security camera device 100. That is, the microphones 1400 may receive audio, for instance, user speech, via the microphone ports 302.

The status indicator 1302 may be located between (e.g., interposed) the first microphone 1400(1) and the second microphone 1400(2), vertically above and/or aligned with camera 802 and/or the ambient light sensor 1304. In some instances, the first microphone 1400(1) and the second microphone 1400(2) may be aligned (e.g., horizontally) with the status indicator 1302.

The first housing 102 may include a midframe 1402 to which components of the first housing 102 couple. For example, the heat dissipating element 1306 may couple to the midframe 1402. In some instances, the midframe 1402 may include prongs, tabs, receptacles, slits, etc. that engage with corresponding features of the components that couple to the midframe 1402 for orienting and/or aligning the components within the security camera device 100. By way of example, prongs may extend from the midframe 1402 and which are disposed through the first LED PCB 1104 and the second LED PCB 1106, respectively. Such disposition may orient the first LED PCB 1104 and the second LED PCB 1106. In other words, the midframe 1402 may orient the first LEDs 1200 and the second LEDs 1202 towards the sides and front 108 of the security camera device 100. Prongs may also similarly extend through the heat dissipating element 1306. In some instances, the microphones 1400 are mounted to the midframe 1402.

The midframe 1402 is shown including an aperture 1404. In some instances, the camera 802 is at least partially disposed through the aperture 1404, or through which the camera 802 is configured to capture video data of the environment. A flex circuit 1406 is shown being disposed through the midframe 1402, which in some instances, may communicatively couple the RADAR PCB 1100 (and the RADAR sensor 806) with the PCBA 810.

Figure 15:
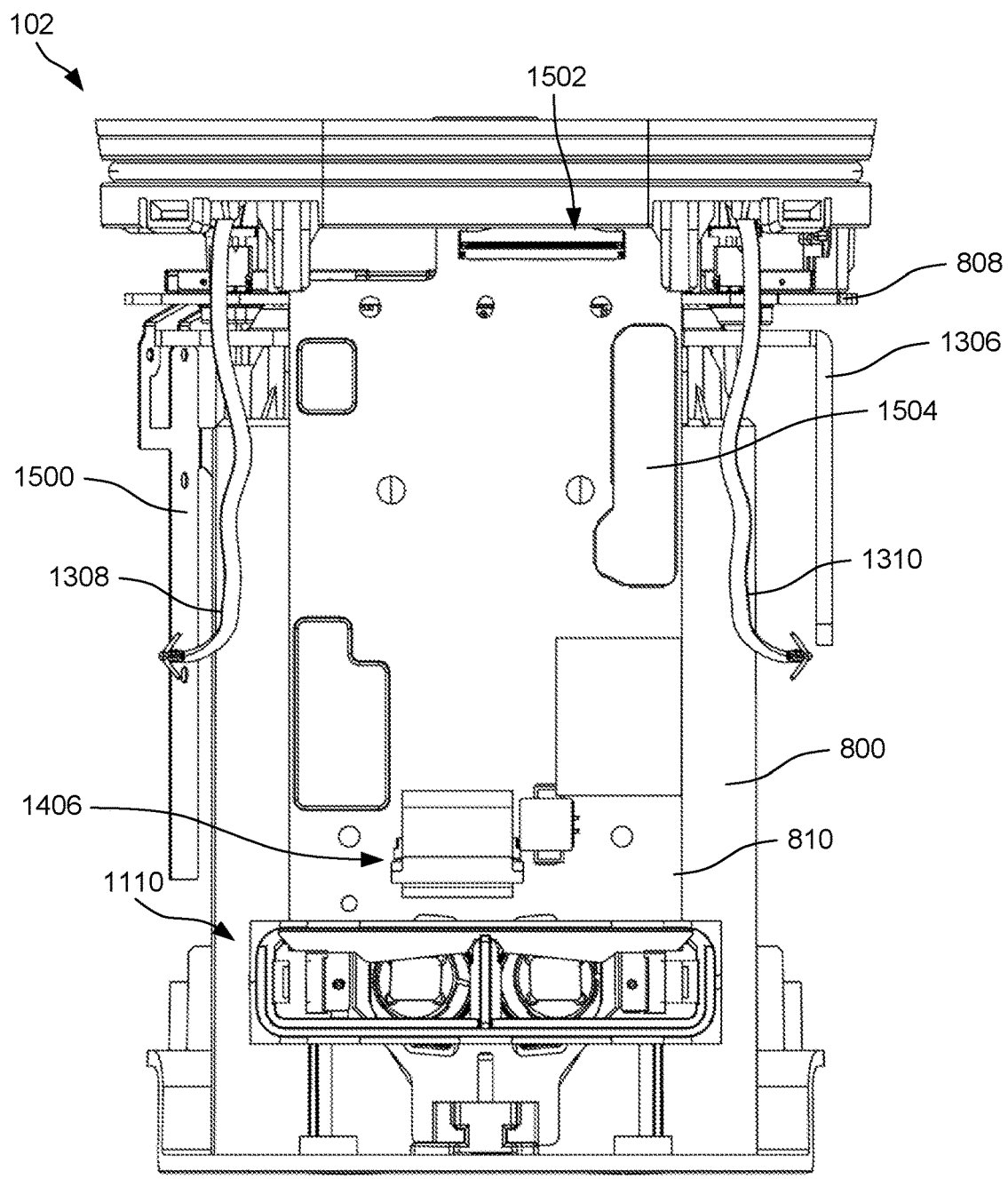
FIG. 15 illustrates example components disposed within the top housing of FIG. 9, according to examples of the present disclosure.

FIG. 15 illustrates a frontal view of the first housing 102, according to examples of the present disclosure. From FIG. 14, the microphones 1400, the ambient light sensor 1304, the status indictor 1302, and the midframe 1402 are removed to illustrate components of first housing 102.

The PCBA 810 is shown coupled to a battery housing 800, which as explained herein, receives or otherwise houses batteries of the security camera device 100. For example, the PCBA 810 may couple to a front of the battery housing 800, opposite a rear of the battery housing 800. The PCB 808 may couple to a top of the battery housing 800, opposite a bottom of the battery housing 800 in which the batteries are insertable into the battery housing 800. In some instances, the heat dissipating element 1306 may be disposed above the battery housing 800 and/or along one or more sides of the battery housing 800. The heat dissipating element 1306 may dissipate heat generated by components of the PCB 808.

An antenna 1500 may reside to a side of the battery housing 800, opposite a side in which a portion of the heat dissipating element 1306 is disposed. In some instances, the antenna 1500 may correspond to a long-range antenna. The antenna 1500 may be disposed along an inside surface of the first cover 120 when the security camera device 100 is assembled.

The flex circuit 1406 may communicatively couple the PCBA 810 to the RADAR sensor 806. The flex circuit 1406 may route through the opening 1314 for coupling to the RADAR sensor 806. Additionally, a flex circuit 1502 may communicatively couple the PCB 808 to the PCBA 810. The first wire 1308 and the second wire 1310 communicatively couple the PCB 808 to the first LED PCB 1104 and the second LED PCB 1106, respectively. The PCBA 810 may include various shields 1504 disposed over computing components to reduce magnetic, conductive, and/or other interferences. Further, the PIR assembly 1110 may couple to the PCBA 810.

FIG. 16 illustrates a frontal view of the first housing 102, according to examples of the present disclosure. From FIG. 15, the cap 122, the first wire 1308, the second wire 1310, and portions of the PIR assembly 1110, such as a frame of the PIR assembly 1110, are removed to illustrate components of first housing 102. The PCB 808 resides vertically beneath the cap 122, above the heat dissipating element 1306 and a top of the battery housing 800. The flex circuit 1502 routes between the PCB 808 and the PCBA 810. The first PIR sensor 804(1) and the second PIR sensor 804(2)

couple to PCBA 810 for being oriented outwards from the front 108 of the security camera device 100.

Figure 17:
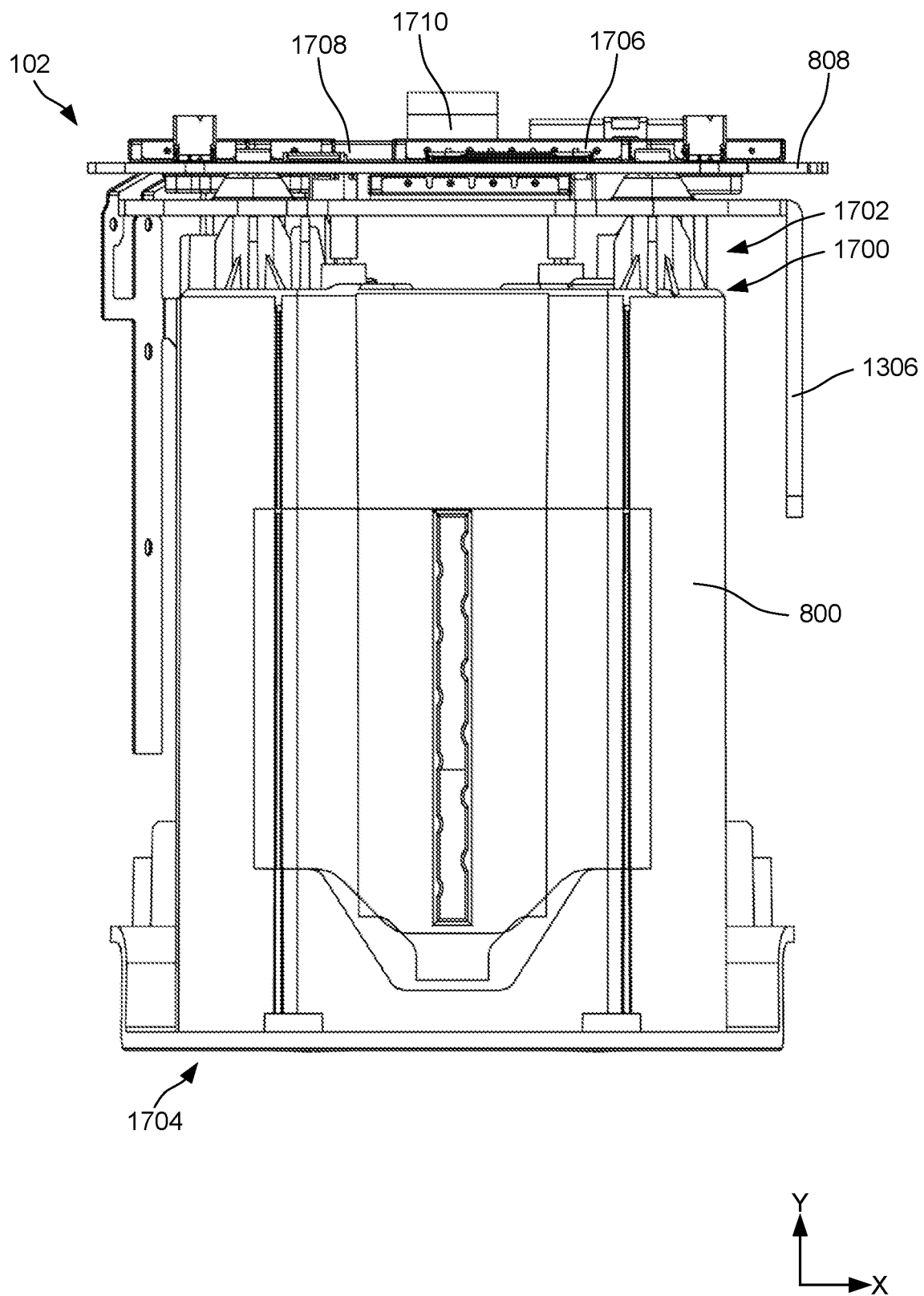
FIG. 17 illustrates example components disposed within the top housing of FIG. 9, according to examples of the present disclosure.

FIG. 17 illustrates a frontal view of the first housing 102, according to examples of the present disclosure. From FIG. 16, the PCBA 810 is removed to illustrate components of first housing 102.

The PCB 808 may be spaced apart from a top end 1700 of the battery housing 800. In some instances, the top end 1700 of the battery housing 800 includes posts 1702 to which the PCB 808 couples. For example, the posts 1702 may end from the battery housing 800, and the PCB 808 and/or the heat dissipating element 1306 may abut, rest on, or couple to the posts 1702. The top end 1700 is opposite a bottom end 1704 of the battery housing 800. The batteries of the security camera device 100 may be insertable into the battery housing 800 via the bottom end 1704. The PCB 808 may include various computing components to enable operation of the security camera device 100. For PCB 808 may include a Wi-Fi module 1706, a LORA (long range) module 1708, and so forth. Shields may be disposed over the Wi-Fi module 1706 and/or the LORA module 1708. A flex circuit 1710 may also communicatively couple between the port 208 and the PCB 808 for transferring power to components of the security camera device 100.

Figure 18:
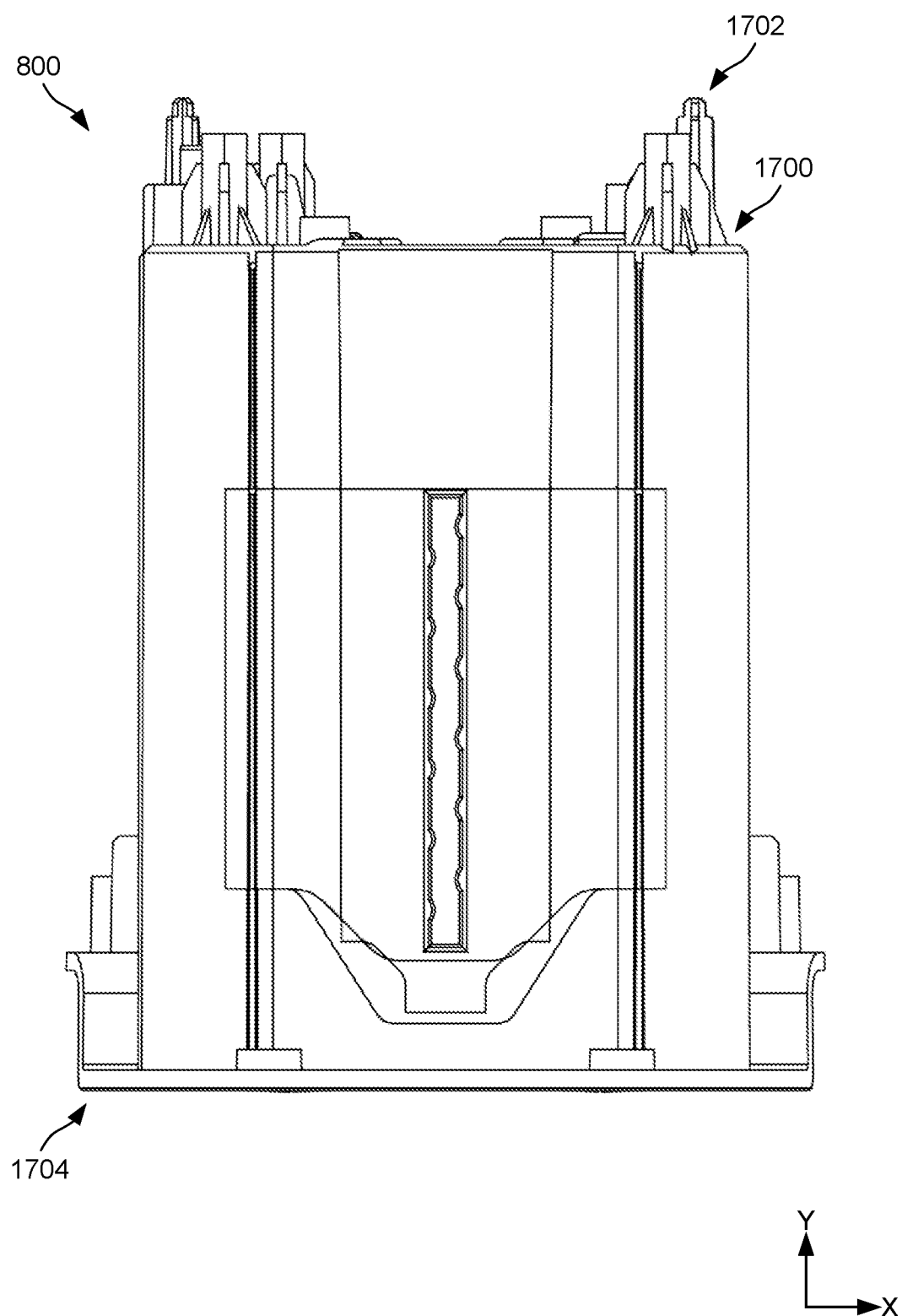
FIG. 18 illustrates an example battery housing disposed within the top housing of FIG. 9, according to examples of the present disclosure.

FIG. 18 illustrates the battery housing 800, according to examples of the present disclosure. The battery housing 800 includes the top end 1700 having the posts 1702 for receiving the PCB 808 and/or the heat dissipating element 1306, and the bottom end 1704 into which the batteries are insertable.

Figure 19:
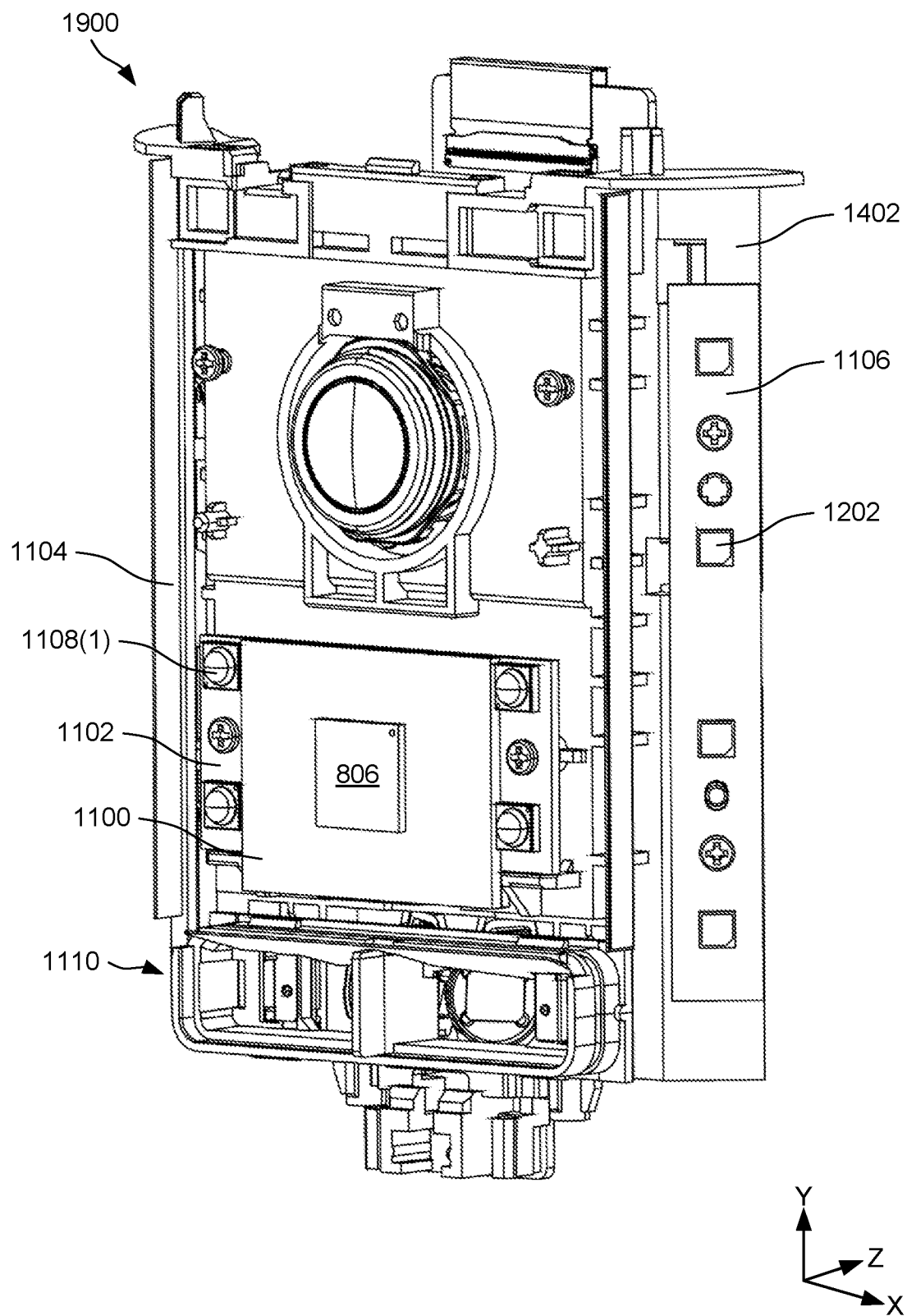
FIG. 19 illustrates an example sub-assembly disposed within the top housing of FIG. 9, according to examples of the present disclosure.

FIG. 19 illustrates a PCBA assembly 1900 that may include components of the first housing 102 and which resides in the first housing 102, according to examples of the present disclosure. In some instances, the PCBA assembly 1900 includes the PCBA 810, the IR LEDS 1108, the IR LED PCB 1102, the first LEDs 1200, the first LED PCB 1104, the second LEDs 1202, the second LED PCB 1106, the camera 802, the RADAR sensor 806, the RADAR PCB 1100, the PIR assembly 1110, and/or the midframe 1402. However, the PCBA assembly 1900 may include additional components, such as the microphones 1400. In some instances, components of the PCBA assembly 1900, such as the PCBA 810, couple to the midframe 1402. In turn, the midframe 1402 may couple to the battery housing 800. In some instances, the IR LED PCB 1102, the first LED PCB 1104, and/or the second LED PCB 1106 are coupled to a first side of the midframe 1402. The PCBA 810 may couple to an opposite, second side, adjacent to the battery housing 800.

Figure 20:
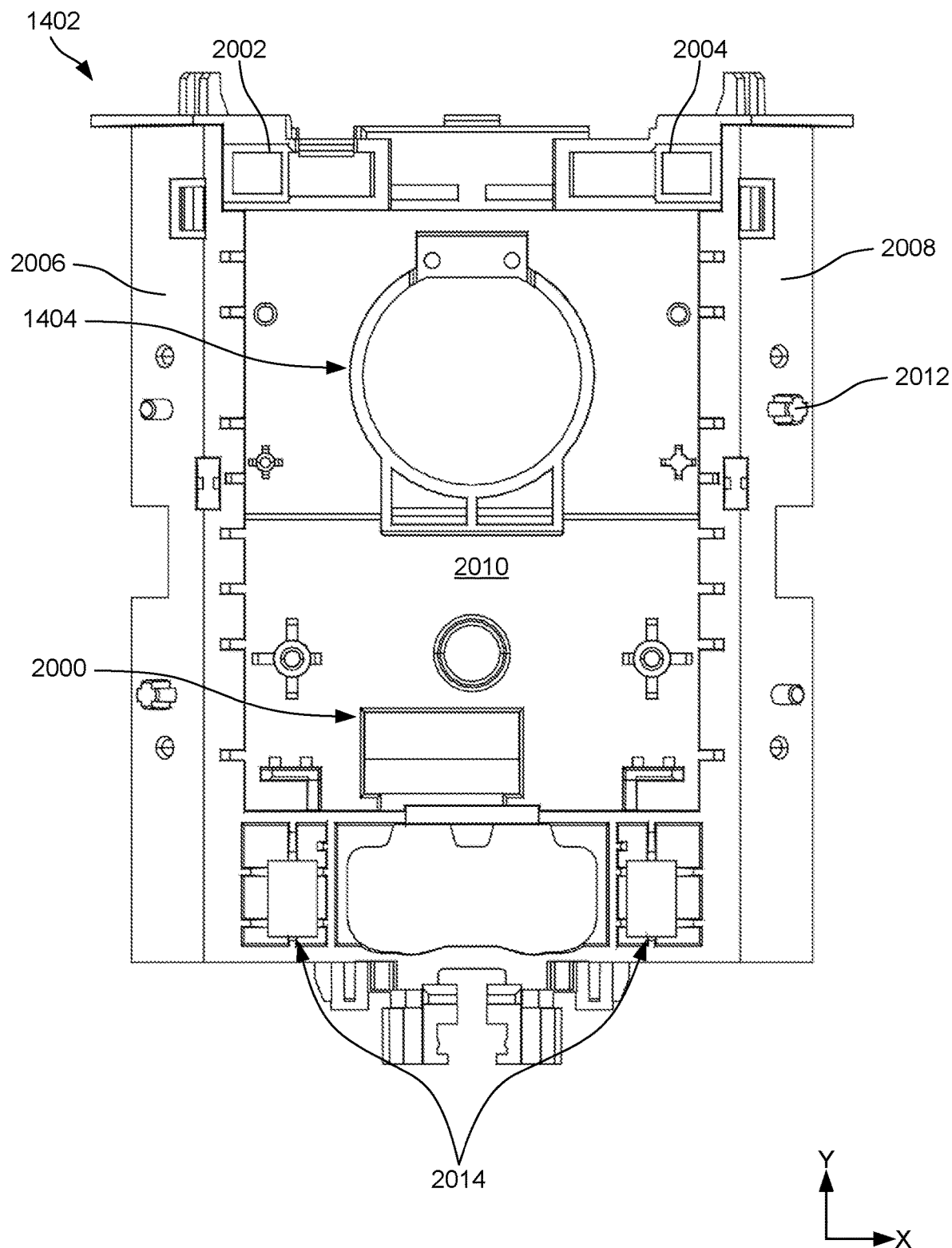
FIG. 20 illustrates an example midframe of the sub-assembly of FIG. 19, according to examples of the present disclosure.

FIG. 20 illustrates the midframe 1402 of the first housing 102, or the PCBA assembly 1900, to which components of the first housing 102 couple, according to examples of the present disclosure. The midframe 1402 may define, or otherwise include various features for receiving components of the first housing 102 or which components of the first housing 102 couple. For example, the midframe 1402 may include the aperture 1404 through which the camera 802 is at least partially disposed and/or an opening 2000 through which the flex circuit 1406 routes.

The midframe 1402 also includes a first receptacle 2002 and a second receptacle 2004 for the first microphone 1400(1) and the second microphone 1400(1), respectively. A first flange 2006 and a second flange 2008 of the midframe 1402 also receive the heat dissipating element 1306, and/or the first LED PCB 1104 and the second LED PCB 1106, respectively. The first flange 2006 and the second flange 2008 may respectively orient the first LEDs 1200 and the second LEDs 1202 within the environment. For example, in some instances, the midframe 1402 includes a front surface 2010 that is substantially planar (e.g., in the X-Y plane). In some instances, the IR LEDs 1108, the IR LED PCB 1102, the RADAR sensor 806, the RADAR PCB 1100, the PIR assembly 1110 may couple to the front surface 2010 of the midframe 1402. The camera 802, for example, may be disposed behind a rear surface (e.g., opposite the front surface 2010), of the midframe 1402.

The first flange 2006 and the second flange 2008 may be oriented at an angle relative to the front surface 2010. As an example, the first flange 2006 and the second flange 2008 may be angled backward relative to the front surface 2010. In doing so, the first LEDs 1200 and the second LEDs 1202 are configured to emit light from the first corner and the second corner of the security camera device 100. In some instances, the first flange 2006 and the second flange 2008 are oriented at between approximately ten degrees and thirty degrees relative to the front surface 2010.

The midframe 1402 may also include other features for receiving an orienting components of the first housing 102, and/or to otherwise align the components within the first housing 102. For example, the midframe 1402 may include prongs 2012 on the first flange 2006 and/or the second flange 2008 for receiving and aligning the heat dissipating element 1306, the first LED PCB 1104, and the second LED PCB 1106, respectively. The midframe 1402 may also include slots 2014 for receiving the PIR assembly 1110. For example, attachment mechanisms (e.g., hooks, tabs, latches, etc.) may be insertable into the slots 2014 for coupling the PIR assembly 1110 to the midframe 1402.

Figure 21:
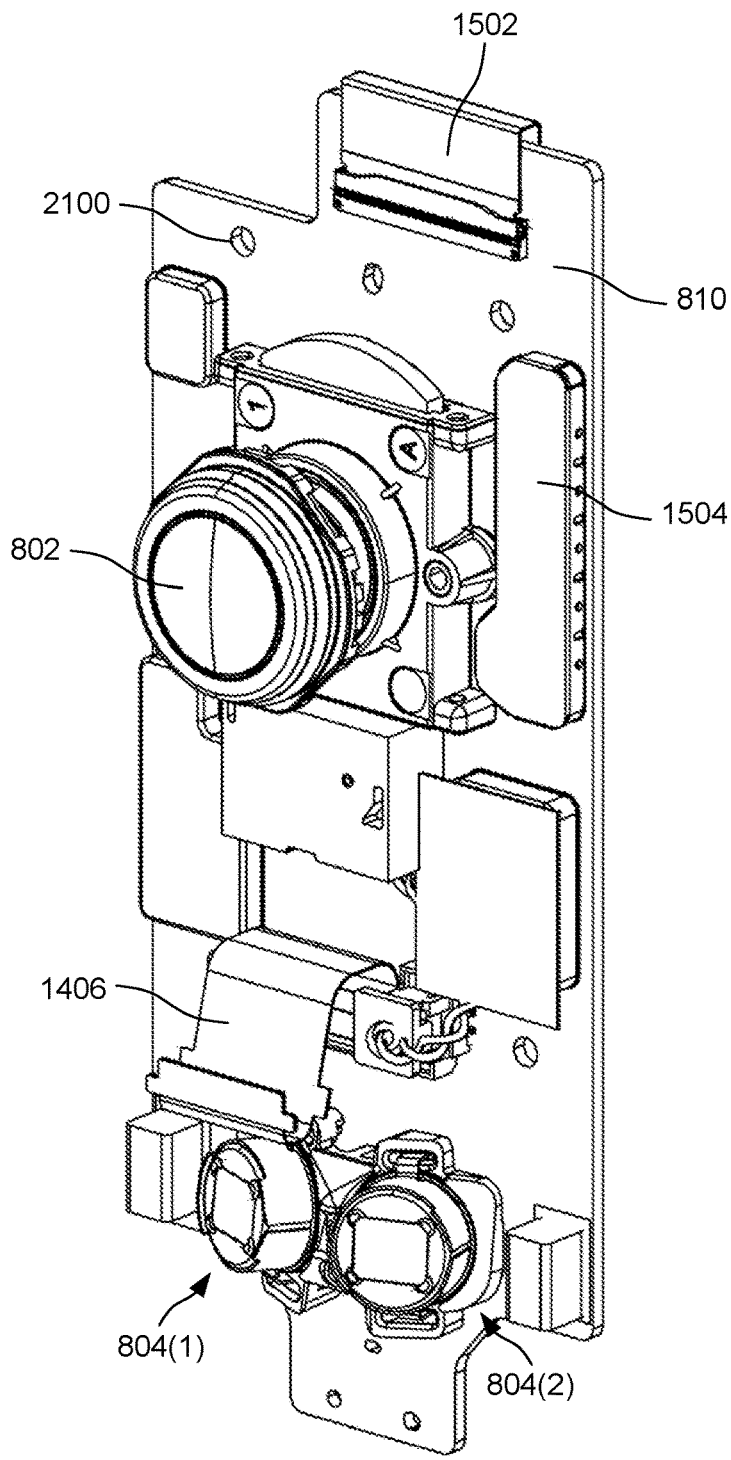
FIG. 21 illustrates an example printed circuit board assembly (PCBA) of the sub-assembly of FIG. 19, according to examples of the present disclosure.

FIG. 21 illustrates components of the first housing 102 coupled to the PCBA 810, according to examples of the present disclosure. For example, the camera 802, the shields 1504, the first PIR sensor 804(1), the second PIR sensor 804(2), the flex circuit 1406, and the flex circuit 1502 may couple to or be disposed on the PCBA 810. As shown, the camera 802 may reside vertically above the PIR sensor(s) 804. The PCBA 810 may also include holes 2100 that align with tabs, flanges, etc. of the midframe 1402 (e.g., a rear surface of the midframe 1402) for aligning the PCBA 810 on the midframe 1402 and/or within the first housing 102. In some instances, the camera 802 may include a 140 degree horizontal field of view (FoV) and/or an eighty degree vertical FoV. In some instances, the camera 802 may be a 1080P HD camera with high definition resolution (HDR) and color night vision.

Figure 22A:
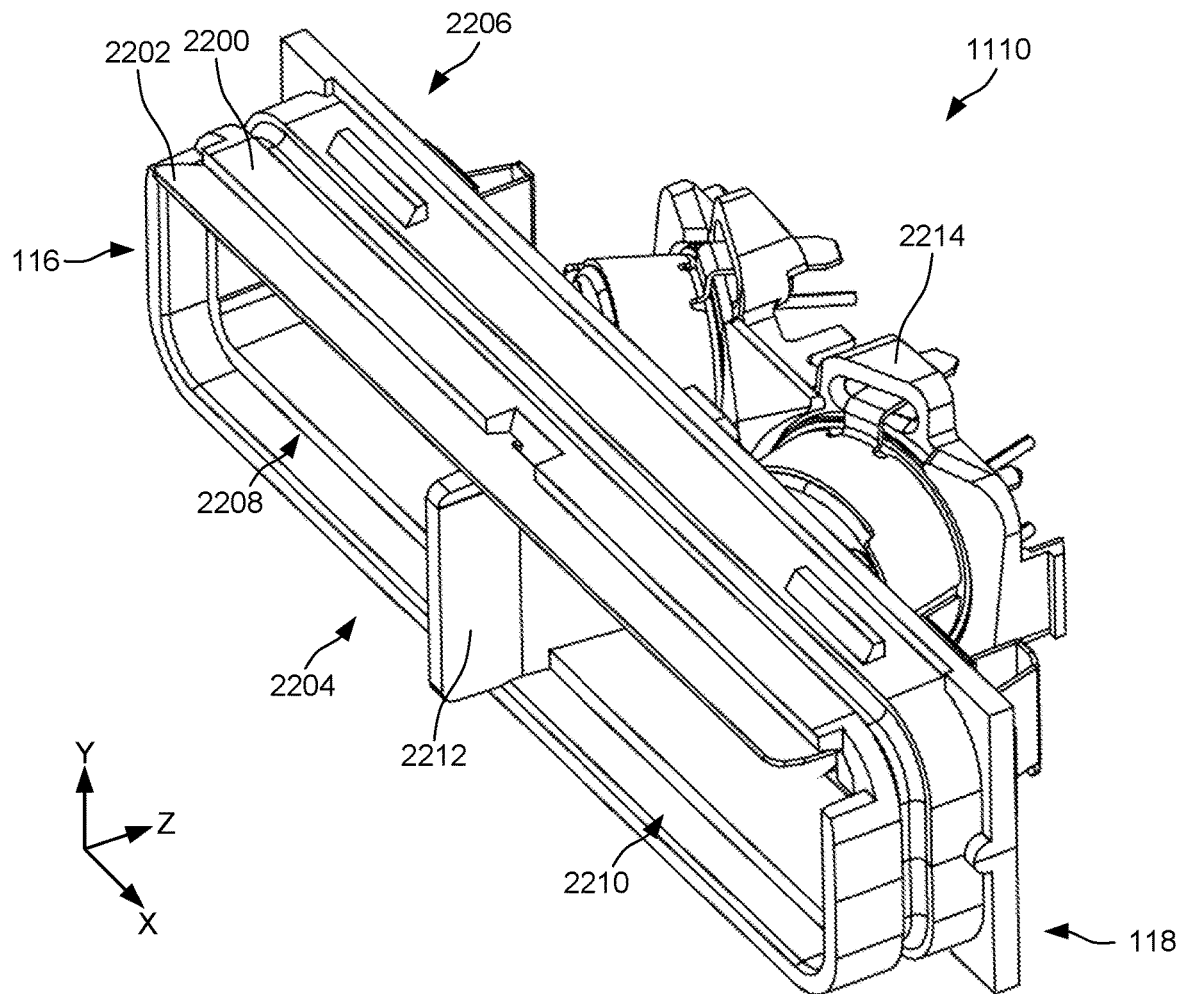
FIGS. 22A-22D illustrate an example passive infrared (PIR) assembly disposed within the top housing of FIG. 9, according to examples of the present disclosure.
Figure 22B:
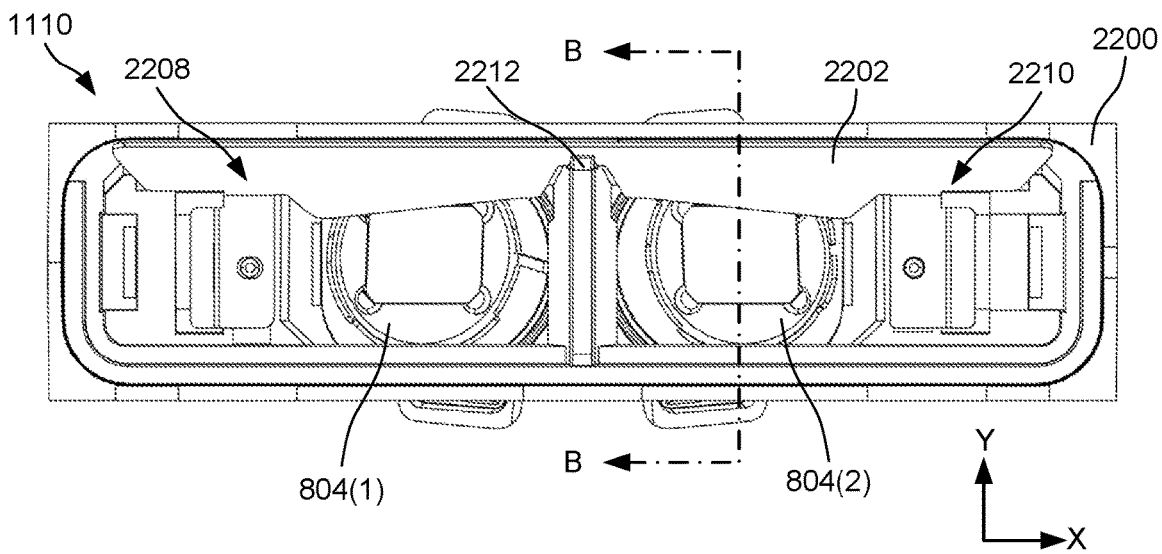
Figure 22C:
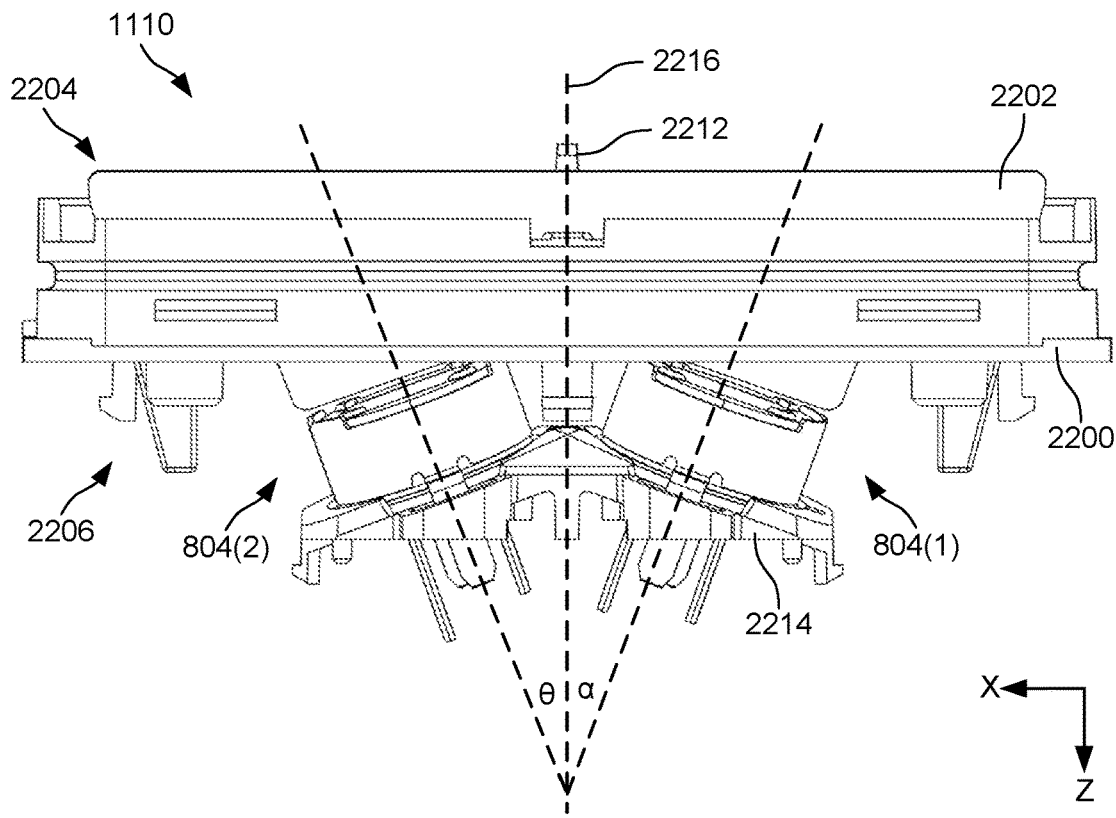
Figure 22D:
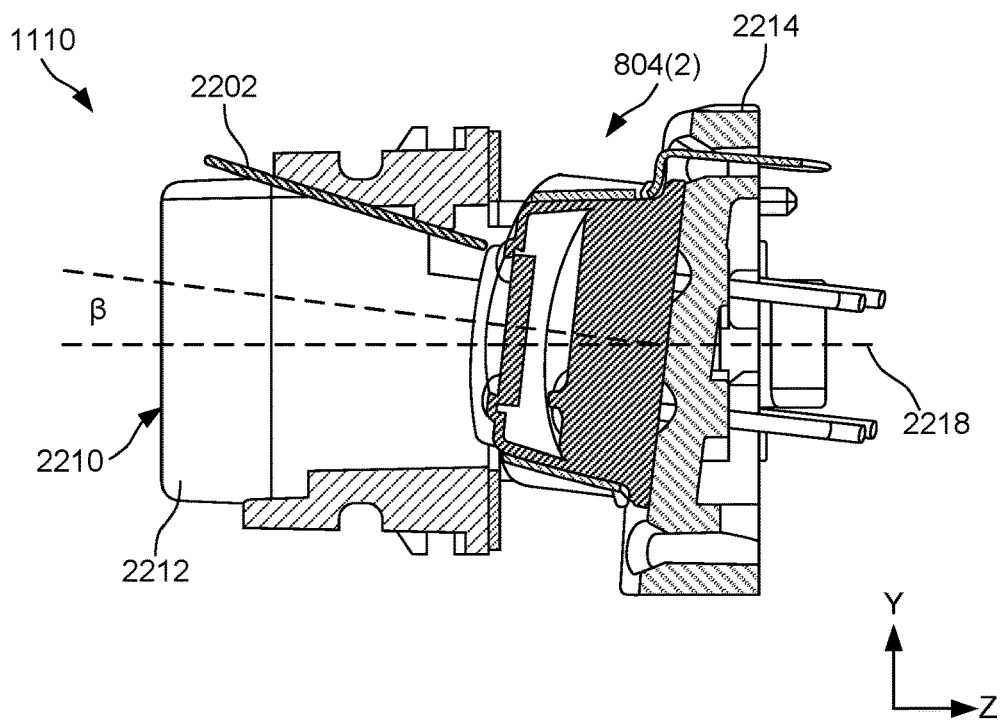

FIGS. 22A-22D illustrate the PIR assembly 1110, according to examples of the present disclosure. FIG. 22A illustrates a front perspective view of the PIR assembly 1110, FIG. 22B illustrates a front view of the PIR assembly 1110, FIG. 22C illustrates a top view of the PIR assembly 1110, and FIG. 22D illustrates a cross-sectional view of the PIR assembly 1110 taken along line B-B of FIG. 22B.

In some instances, the PIR assembly 1110 includes a PIR frame 2200, a mirror 2202 (e.g., reflective surface), a PIR mount 2214, and the PIR sensor(s) 804. As discussed herein, the PIR frame 2200 may include a front 2204 that is oriented towards the front 108 of the security camera device 100, and a back 2206 (opposite the front 2204). The PIR sensor(s) 804 and/or the PIR mount 2214 may be disposed at the back 2206 of the PIR frame 2200 (or behind the back 2206 of the PIR frame 2200). Additionally, the PIR frame 2200 may define a first cavity 2208 and a second cavity 2210, as well as a divider 2212 disposed between the first cavity 2208 and the second cavity 2210. The divider 2212 may represent a wall disposed between the first cavity 2208 and the second cavity 2210.

The first PIR sensor 804(1) is oriented to detect infrared signals via the first cavity 2208, and the second PIR sensor 804(2) is oriented to detect infrared signals via the second cavity 2210. Collectively, however, the PIR sensor(s) 804 have a field of view (e.g., monitored space) for detecting movements within the environment. For example, if no motion exists in the environment, the PIR sensor(s) 804 may not receive any signals. However, when motion exists, the PIR sensor(s) 804 may receive IR radiation emitted via persons (or animals) within the field of view. In some instances, the first PIR sensor 804(1) is oriented in a direction away from the bottom 110 of the security camera device 100 (or a bottom of the PIR frame 2200), and towards the first side 116. In some instances, the second PIR sensor 804(2) is oriented in a direction away from the bottom 110 of the security camera device 100 (or a bottom of the PIR frame 2200), and towards the second side 118. In some instances, the first PIR sensor 804(1) and/or the second PIR sensor 804(2) are oriented away from the divider 2212.

The mirror 2202 may assist in generating the field of view of the PIR sensor(s) 804. For example, the PIR sensor(s) 804 may be oriented towards the mirror 2202, such that the mirror 2202 reflects signals towards the PIR sensor(s) 804. As shown, the mirror 2202 may be disposed more proximate to a top of the PIR frame 2200 than a bottom of the PIR frame 2200. Given the compact nature of the PIR assembly 1110 (or more generally, the security camera device 100), the use of the mirror 2202 may assist in creating a larger field of view for the PIR sensor(s) 804. In some instances, the mirror 2202 couples to the PIR frame 2200 at a location within the first cavity 2208 and the second cavity 2210. For example, the mirror 2202 may couple to the PIR frame 2200 at a top of the first cavity 2208 and the second cavity 2210. As shown, the mirror 2202 may span between the first cavity 2208 and the second cavity 2210, across the divider 2212.

The mirror 2202 may include a single mirror that spans between the first cavity 2208 and the second cavity 2210, across the divider 2212. However, in some instances, the mirror 2202 may be formed from a first element (e.g., section) and a second element (e.g., section). Here, the first PIR sensor 804(1) may be oriented towards the first element, and the second PIR sensor 804(2) may be oriented towards the second element.

The PIR sensor(s) 804 couple to the PIR mount 2214 for disposing or orienting the PIR sensor(s) 804 in a direction towards the front 108 of the security camera device 100, as well as towards the mirror 2202. In some instances, the PIR sensor(s) 804 are angled outward from a central vertical plane 2216 (Y-Z plane) of the PIR assembly 1110 (or the PIR frame 2200). For example, the first PIR sensor 804(1) may be disposed at an angle α relative to the central vertical plane 2216, and/or the second PIR sensor 804(2) may be disposed at an angle θ relative to the central vertical plane 2216. In some instances, the angle α and/or the angle θ may be between ten degrees and forty-five degrees. Disposing the first PIR sensor 804(1) and the second PIR sensor 804(2) at the angle α and the angle θ, respectively, may increase a field of view of the PIR sensor(s) 804 for detecting motion. More particularly, disposing the first PIR sensor 804(1) and the second PIR sensor 804(2) at the angle α and the angle θ, respectively, may increase a horizontal component of the field of view. In some instances, the angle α and the angle θ may be the same and/or different. Moreover, as discussed herein, the PIR mount 2214 may orient the first PIR sensor 804(1) and the second PIR sensor 804(2) at the angle α and the angle θ, respectively.

In addition to being oriented outward, the PIR sensor(s) 804 may be oriented vertically upward, relative to a central horizontal plane 2218 of the PIR assembly 1110 (or the PIR frame 2200). The central horizontal plane 2218 may be disposed centrally through the PIR frame 2200, and/or may be orthogonal to the central vertical plane 2216. As shown in FIG. 22D, the second PIR sensor 804(2) may be oriented at an angle β relative to the central horizontal plane 2218, which extends centrally (e.g., in the Y-direction) through the PIR frame 2200. In some instances, the angle β may be between approximately ten degrees and thirty degrees. Disposing the second PIR sensor 804(2) at the angle β orients the second PIR sensor 804(2) towards the mirror 2202, such that the second PIR sensor 804(2) may receive signals (e.g., IR radiation) reflected off the mirror 2202. In some instances, the second PIR sensor 804(2) may be oriented substantially parallel with the mirror 2202. Alternatively, in some instances, the second PIR sensor 804(2) may not be oriented parallel with the mirror 2202. For example, the mirror 2202 may be oriented at an angle relative to the central horizontal plane 2218, which may be between ten degrees and thirty degrees. Although the discussion is with regard to the second PIR sensor 804(2), the first PIR sensor 804(1) may be oriented at the angle β as well.

In some instances, the PIR assembly 1110 couples to the PCBA 810. Additionally, the second lens 130 may be disposed over the front 2204 of the PIR assembly 1110, where the PIR sensor(s) 804 are arranged towards the second lens 130. In some instances, an IR-aperture height of the PIR sensor(s) 804 may be twelve millimeters (mm) (e.g., in the Y-direction), and an IR-aperture width of the PIR sensor(s) may be thirty-eight mm. In this sense, the PIR sensor(s) 804 are arranged to receive signals through the IR-aperture for detecting motion within the environment. However, other sizes of the IR-aperture, whether the width and/or the height, may be different. In some instances, a portion of the first PIR sensor 804(1) may be disposed within the first cavity 2208, and/or a portion of the second PIR sensor 804(2) may be disposed in the second cavity 2210.

Figure 23A:
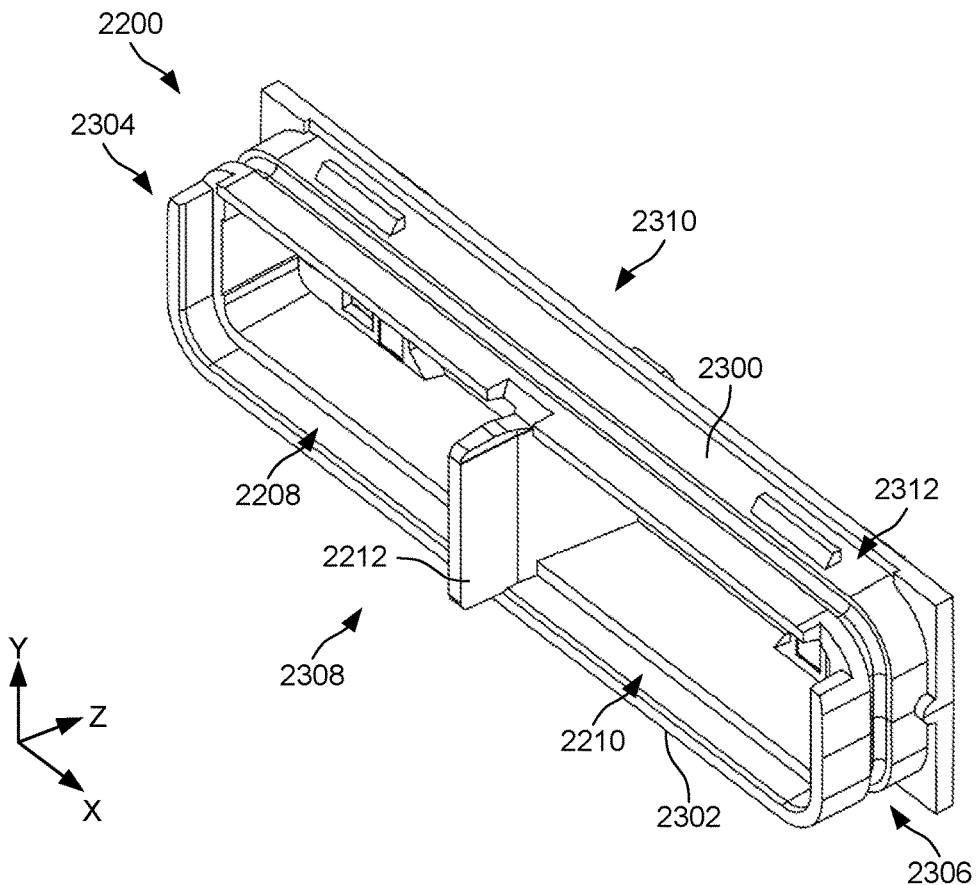
FIGS. 23A-23D illustrate an example frame of the PIR assembly of FIGS. 22A-22D, according to examples of the present disclosure.
Figure 23B:
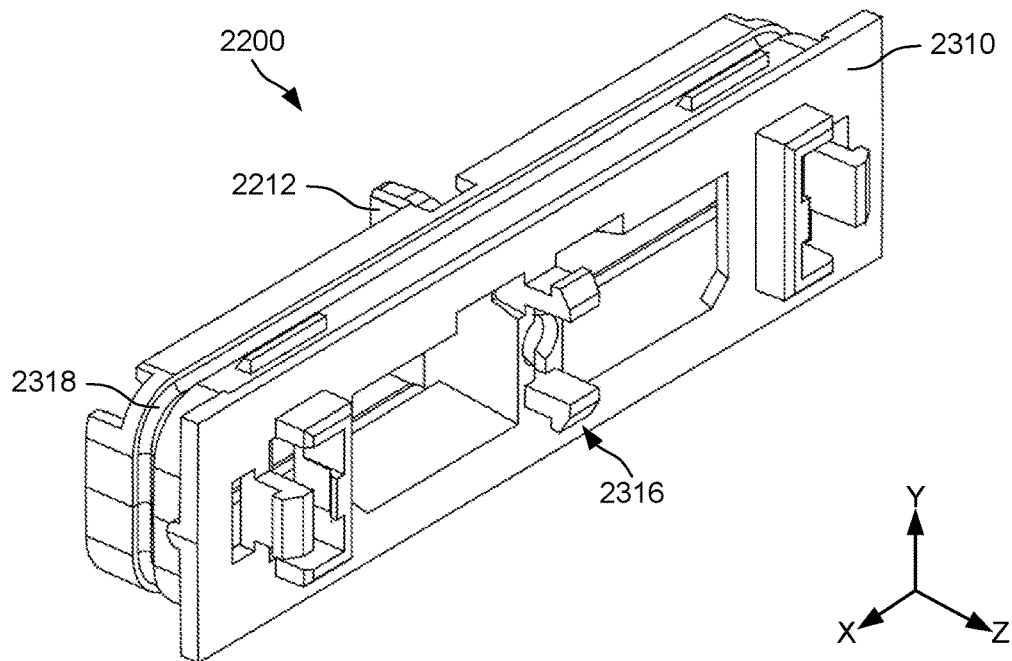
Figure 23C:
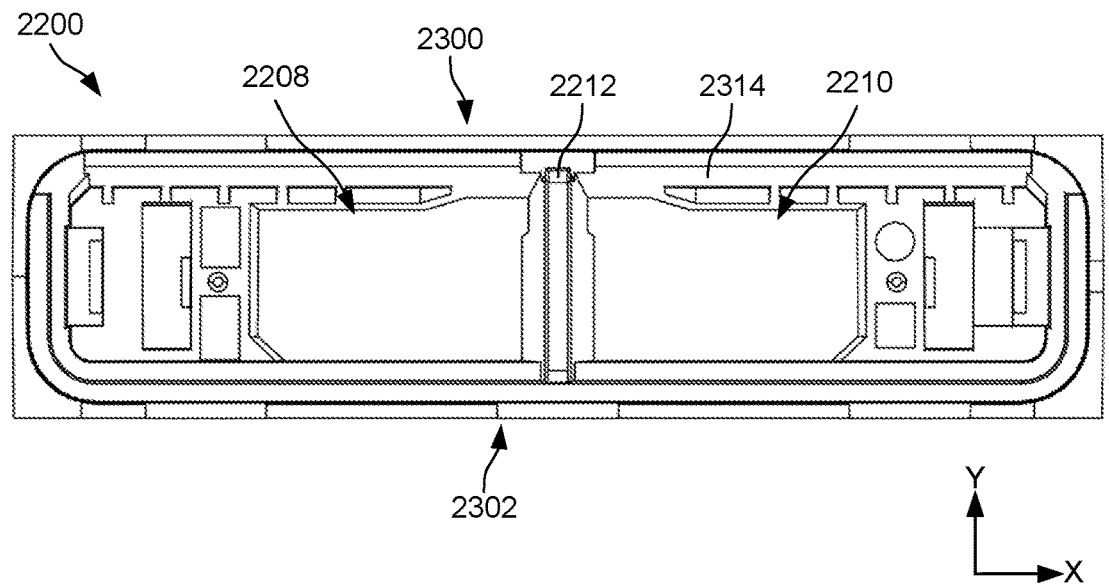
Figure 23D:
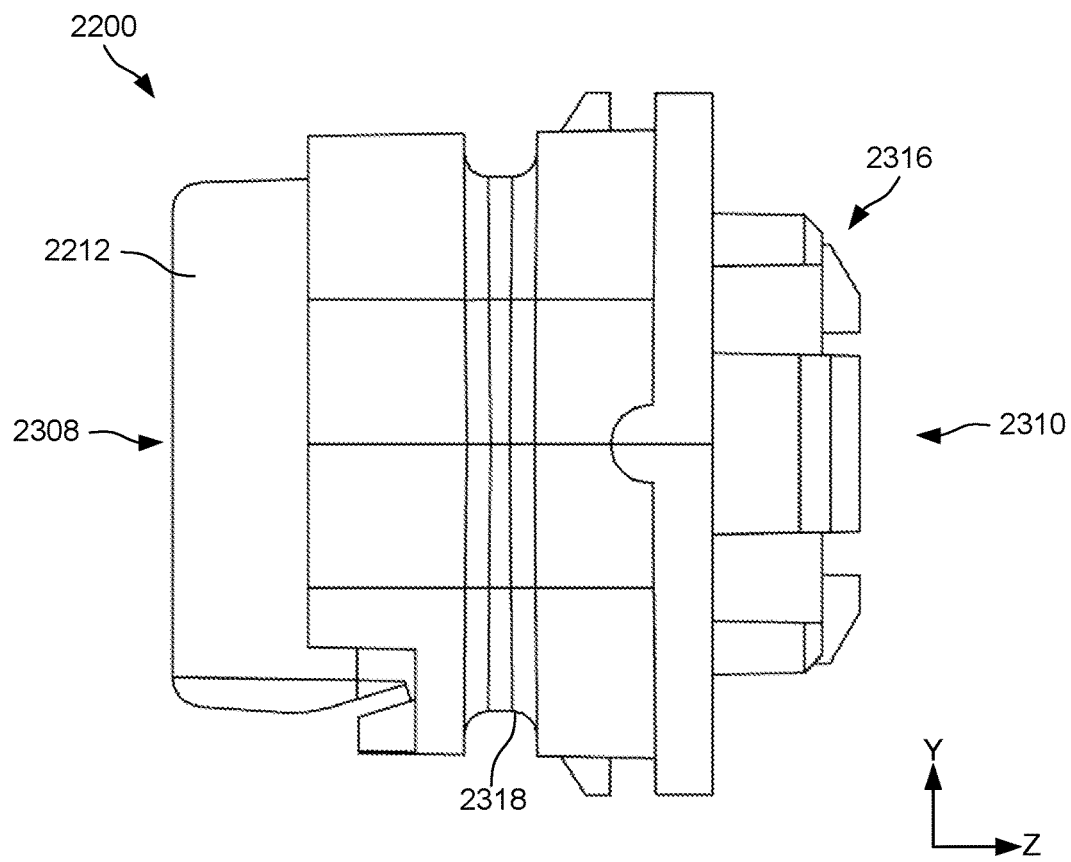

FIGS. 23A-23D illustrate the PIR frame 2200, according to examples of the present disclosure. FIG. 23A illustrates a front perspective view of the PIR frame 2200, FIG. 23B illustrates a rear perspective view of the PIR frame 2200, FIG. 23C illustrates a front view of the PIR frame 2200, and FIG. 23D illustrates a side view of the PIR frame 2200.

The PIR frame 2200 includes a top 2300, a bottom 2302, a first side 2304, a second side 2306, a front 2308, and a back 2310. When disposed in the first housing 102, the top 2300 may be oriented towards the top 2300 of the security camera device 100, the bottom 2302 may be oriented towards the bottom 114 of the security camera device 100, the front 2308 may be oriented towards the front 108 of the security camera device 100, and the back 2310 may be oriented towards the PCBA 810 (or towards the back 108 of the security camera device 100). In some instances, the front 2308 of the PIR frame 2200 may correspond to the front 2204 of the PIR assembly 1110. Additionally, the first side 2304 and the second side 2306 may be oriented towards the lateral sides of the security camera device 100. As shown, the PIR frame 2200 may generally include a rectangular shape.

As introduced above, the PIR frame 2200 defines the first cavity 2208 and the second cavity 2210 in which the first PIR sensor 804(1) and the second PIR sensor 804(2) are at least partially disposed, as well as the divider 2212 between the first cavity 2208 and the second cavity 2210. However, in some instances, the PIR sensor(s) 804 may not be disposed within the first cavity 2208 and the second cavity 2210, respectively, but may be oriented towards the first cavity 2208 and the second cavity 2210, respectively (e.g., spaced apart from the back 2310). For example, the PIR sensor(s) 804 may be disposed behind the back of the PIR frame 2200, and oriented towards the first cavity 2208 and the second cavity 2210, respectively. In some instances, the divider 2212 is centrally located between the first side 2304 and the second side 2306. The first cavity 2208 and the second cavity 2210 may be the same or of different sizes.

The PIR frame 2200 may also include an exterior surface 2312 and an interior surface 2314. In some instances, the first cavity 2208, the second cavity 2210, and the divider 2212 are formed within or by the interior surface 2314. When the mirror 2202 couples to the PIR frame 2200, the mirror 2202 may be disposed along a top of the first cavity 2208 and the second cavity 2210. In some instances, the mirror 2202 may couple to the top via adhesives, fasteners, snap-fits, and so forth. The mirror 2202 may also span between the first cavity 2208 and the second cavity 2210, across the divider 2212. In some instances, the interior surface 2314 along a top of the first cavity 2208 and a top of the second cavity 2210 may include an angle (relative to the central horizontal plane 2218) such that the mirror 2202 is oriented as described herein.

In some instances, the exterior surface 2312 forms alignment mechanisms and/or attachment mechanisms for coupling the PIR frame 2200 (or the PIR assembly 1110) to the PCBA 810 (or more generally, the first housing 102). For example, the back 2310 may include hooks 2316 that engage with slots or grooves in the PCBA 810 for coupling the PIR frame 2200 to the PCBA 810. A groove 2318 may also disposed on the exterior surface 2312 for receiving a gasket or other seal (not shown). As shown, the back 2310 may also be include openings for receiving the PIR sensor(s) 804 and through which the PIR sensor(s) 804 receive signals.

Additional details of the PIR assembly 1110, or PIR sensor(s) configured to detect motion, are described in, for example, U.S. patent application Ser. No. 17/855,752, filed Jun. 30, 2022, the entirety of which is herein incorporated by reference.

Figure 24A:
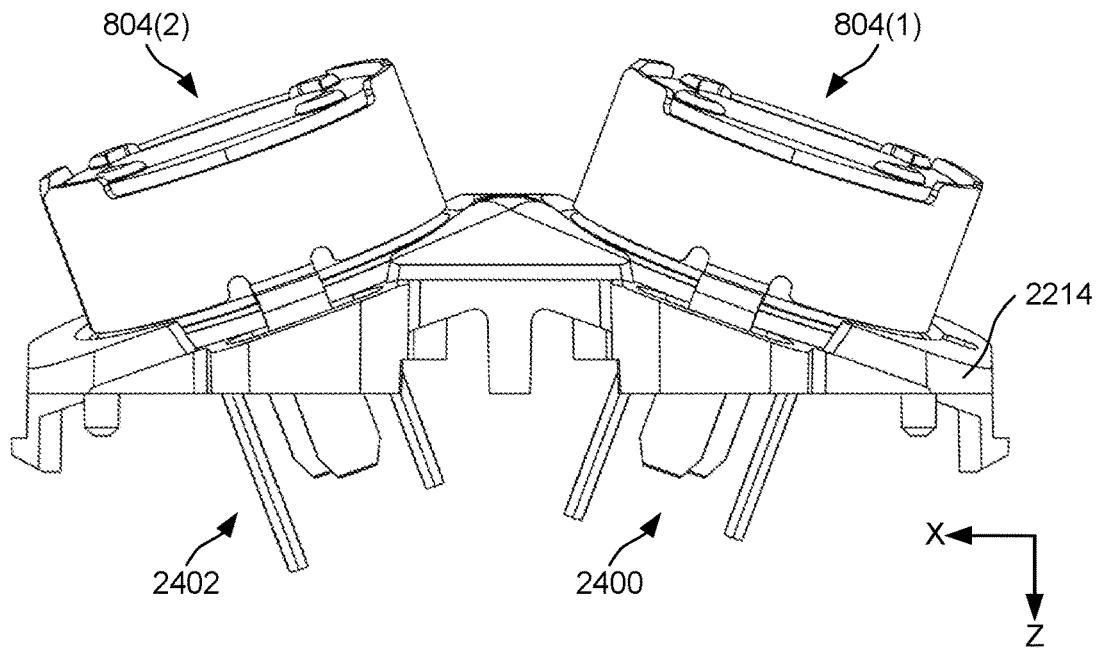
FIGS. 24A and 24B illustrate example PIR sensor(s) and an example mount of the PIR assembly of FIGS. 22A-22D, according to examples of the present disclosure.
Figure 24B:
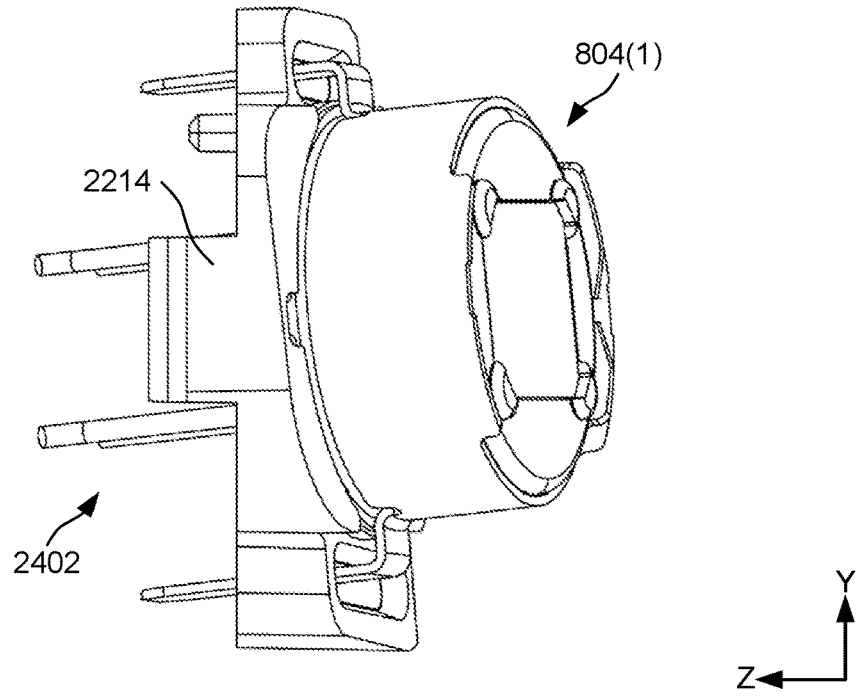

FIGS. 24A and 24B illustrate the PIR sensor(s) 804 coupled to the PIR mount 2214, according to examples of the present disclosure. FIG. 24A illustrates a top view with the PIR sensor(s) 804 coupled to the PIR mount 2214, while FIG. 24B illustrates a side view with the PIR sensor(s) 804 coupled to the PIR mount 2214.

The first PIR sensor 804(1) is shown including first prongs 2400 that are disposed through the PIR mount 2214 for communicatively coupling to the PCBA 810, and the second PIR sensor 804(2) is shown including second prongs 2402 that are disposed through the PIR mount 2214 for communicatively coupling to the PCBA 810. As discussed herein, the PIR mount 2214 may orient the first PIR sensor 804(1) at the angle α and the second PIR sensor 804(2) at the angle θ. The PIR mount 2214 may also orient the first PIR sensor 804(1) and/or the second PIR sensor 804(2) at the angle β.

Figure 25A:
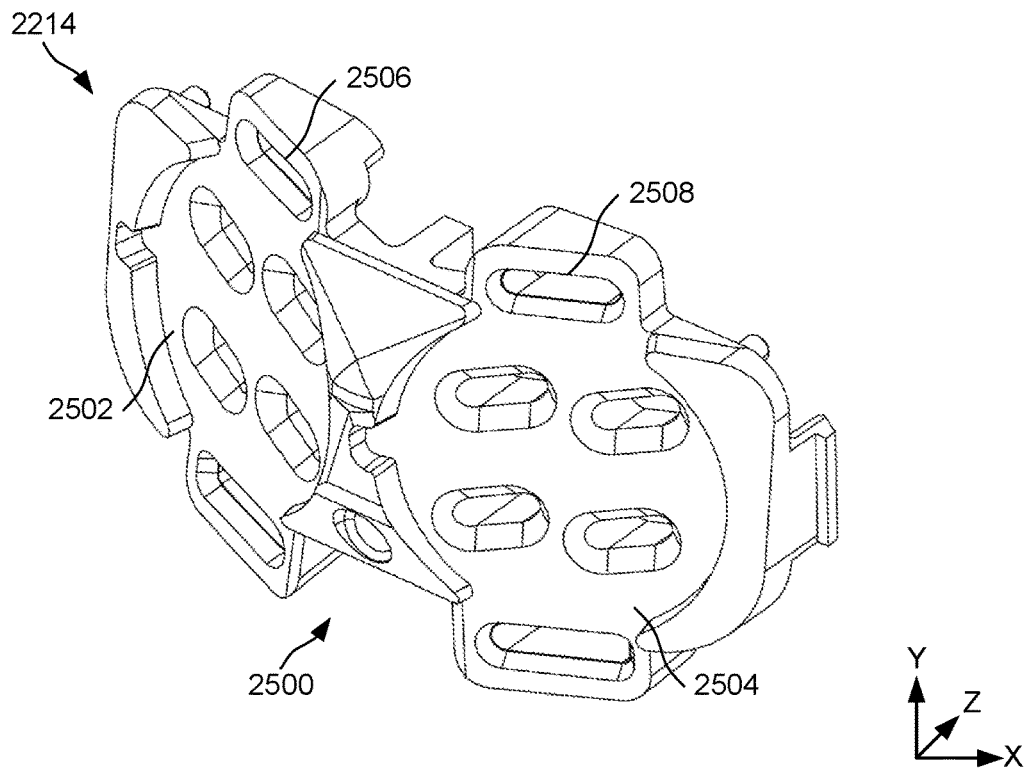
FIGS. 25A and 25B illustrate the mount of FIGS. 24A and 24B for receiving the PIR sensor(s), according to examples of the present disclosure.
Figure 25B:
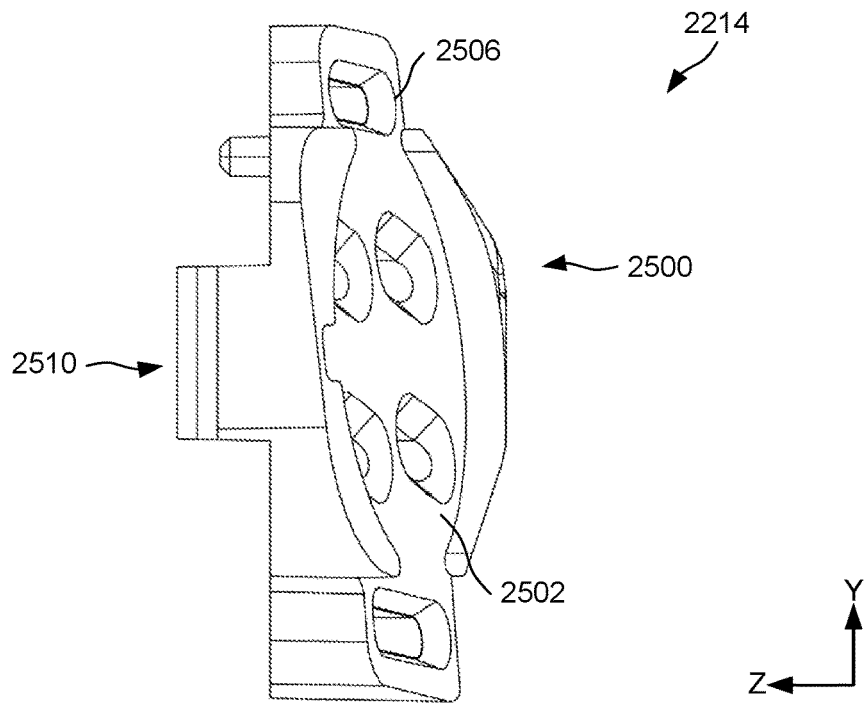

FIGS. 25A and 25B illustrate the PIR mount 2214, according to examples of the present disclosure. FIG. 25A illustrates a front perspective view with the PIR mount 2214, while FIG. 25B illustrates a side view of the PIR mount 2214.

The PIR mount 2214 may include a front 2500 having a first portion 2502 and a second portion 2504. The first portion 2502 may receive the first PIR sensor 804(1), such as a back of the first PIR sensor 804(1), while the second portion 2504 may receive the second PIR sensor 804(2), such as a back of the second PIR sensor 804(2). The first portion 2502 is shown including first channels 2506 through which the first prongs 2400 may be at least partially disposed through. The second portion 2504 is shown including second channels 2508 through which the second prongs 2402 may be at least partially disposed through.

In some instances, the first portion 2502 and/or the second portion 2504 may be recessed from the front 2500 (e.g., in the Z-direction) within an exterior surface such that the first PIR sensor 804(1) and the second PIR sensor 804(2) may be at least partially encapsulated by the PIR mount 2214. For example, the first portion 2502 and/or the second portion 2504 may resemble pockets that receive the PIR sensor(s) 804, respectively. As shown, the first portion 2502 and the second portion 2504 (or more generally the PIR mount 2214) may be configured to orient the first PIR sensor 804(1) and the second PIR sensor 804(2) as described herein. The PIR mount 2214 may also include hooks 2510 that couple the PIR mount 2214 to the PIR frame 2200 or the PCBA assembly 1900.

Figure 26A:
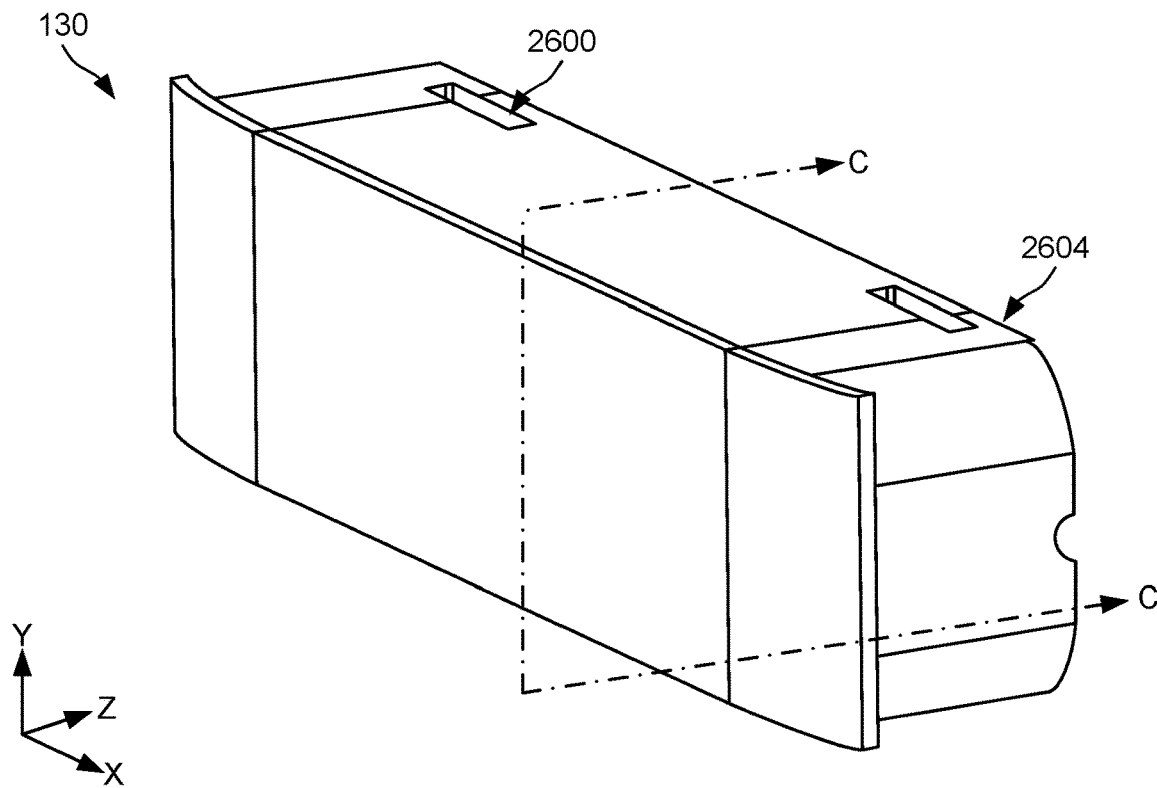
FIGS. 26A and 26B illustrate an example lens through which the PIR assembly of FIGS. 22A-22D is configured to sense an environment, according to examples of the present disclosure.
Figure 26B:
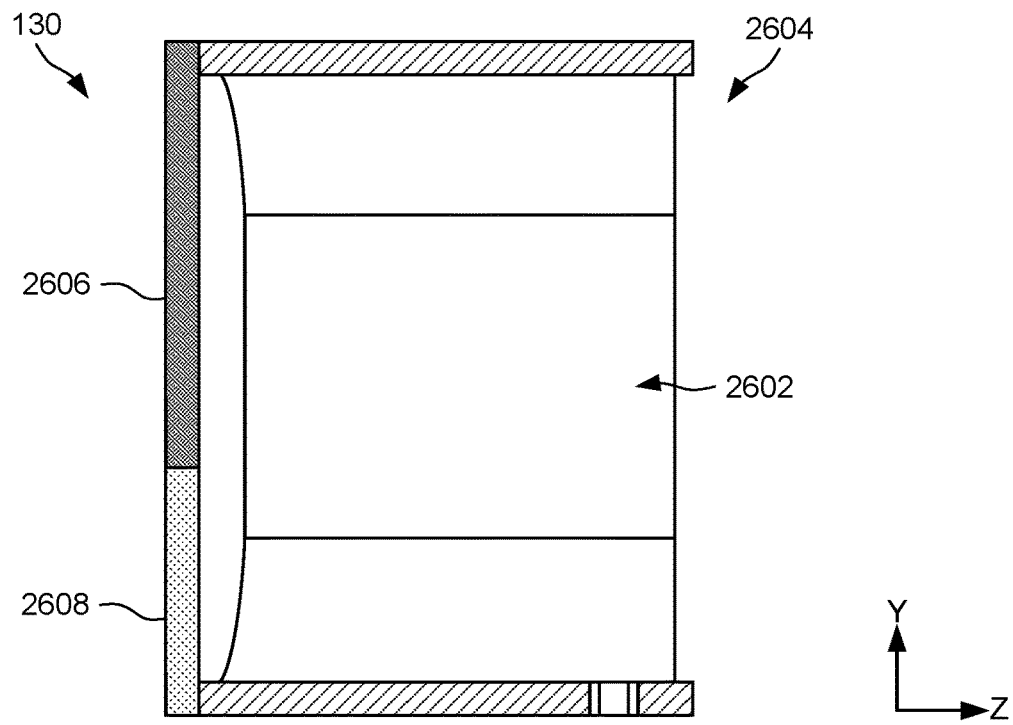

FIGS. 26A and 26B illustrate the second lens 130 that is configured to be disposed over the PIR sensor(s) 804 of the security camera device 100, according to examples of the present disclosure. FIG. 26A illustrates a front perspective view of the second lens 130, and FIG. 26B illustrates a cross-sectional view of the second lens 130, taken through line C-C of FIG. 26A.

The second lens 130 may include channels 2600 for engaging with features disposed on the exterior surface 2312 of the PIR frame 2200. In some instances, the PIR frame 2200 is configured to reside at least partially within a cavity 2602 of the second lens 130. For example, the PIR frame 2200 (and components coupled to the PIR frame 2200), may be disposed through a rear 2604 of the second lens 130 so as to be disposed within the cavity 2602.

In some instances, the second lens 130 may include different ranks (e.g., focal length, aperture, etc.). For example a first portion 2606 of the second lens 130 may include a first rank, while a second portion 2608 of the second lens 130 may include a second rank. In some instances, the first rank and the second rank may be different. Additionally, in some instances, the first portion 2606 may represent a greater portion of the second lens 130, as compared to the second portion 2608 of the second lens. For example, the first portion 2606 may be eleven mm in height, while the second portion 2608 may be three mm in height (Y-direction).

Figure 27:
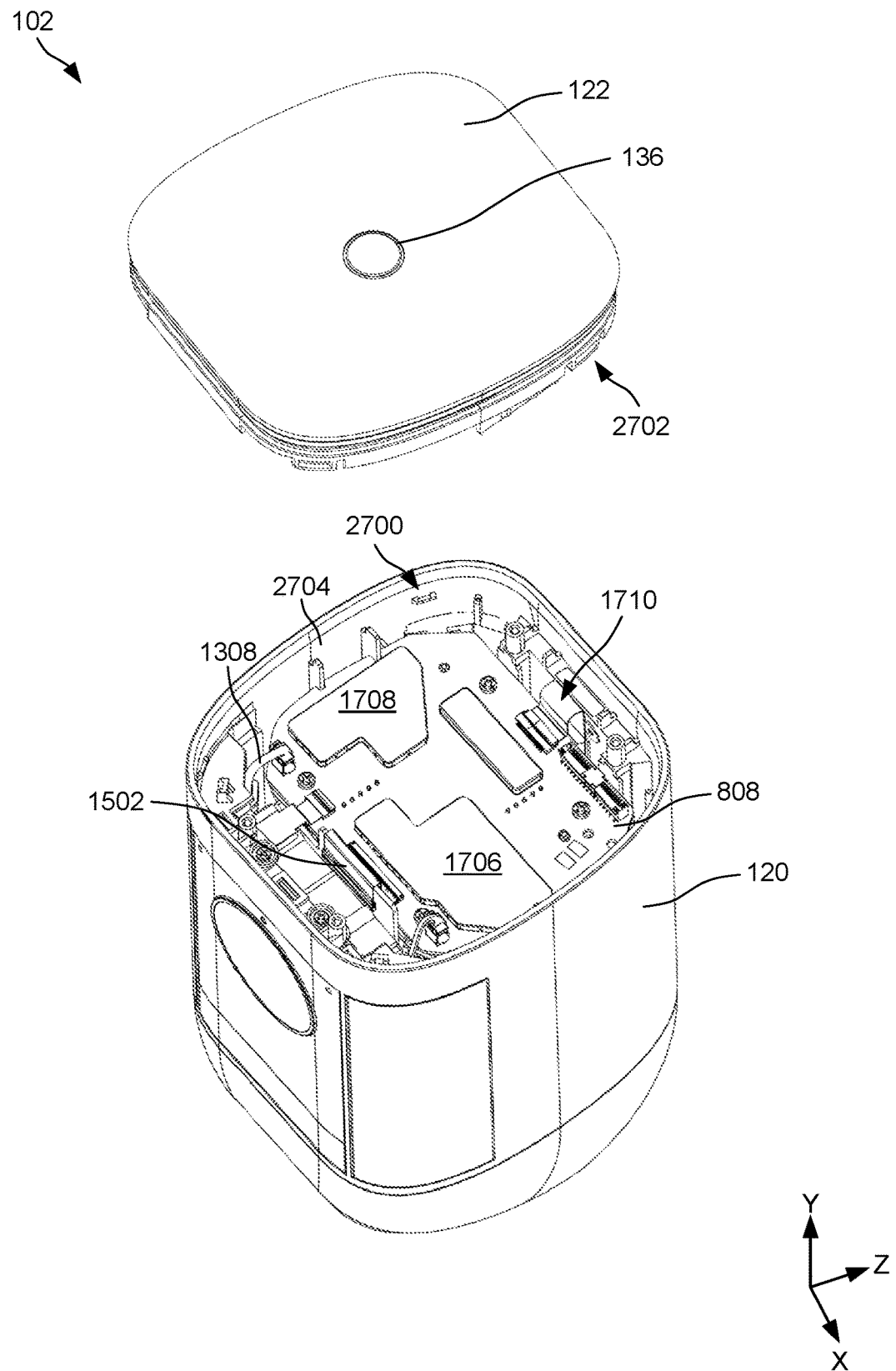
FIG. 27 illustrates a partially exploded view of the security camera device of FIG. 1, showing an example cap configured to couple to the top housing of FIG. 9, according to examples of the present disclosure.

FIG. 27 illustrates a partially exploded view of the first housing 102, showing the cap 122 being disposed above the first cover 120. The cap 122 may be removed from a top of the first housing 102 to expose an interior 2700 of the first housing 102. Within the interior 2700, components of the security camera device 100 reside. In some instances, the cap 122 and the first housing 102 may couple together via complementary latching mechanisms (e.g., keyways, slots, tabs, hooks, etc.). For example, the cap 122 may include latching mechanisms 2702 disposed around a perimeter (e.g., periphery) of the cap 122 that engage with second latching mechanisms disposed around a perimeter of an interior surface 2704 of the first cover 120.

Removing the cap 122 exposes the PCB 808, including the Wi-Fi module 1706 and the LORA module 1708. However, various other components may be mounted to, or communicatively coupled to the PCB 808. The flex circuit 1406 is also shown extending from the PCB 808 for routing to and coupling with the PCBA 810. The flex circuit 1502 extends from the PCB 808 for routing to and coupling with the port 208. Additionally, the first wire 1308 and the second wire 1310 communicatively couple the PCB 808 with the first LED PCB 1104 and the second LED PCB 1106, respectively.

The cap 122 is also shown including the button 136, which may engage with components of the PCB 808 such that presses (or actuation) of the button 136 are sensed.

Figure 28A:
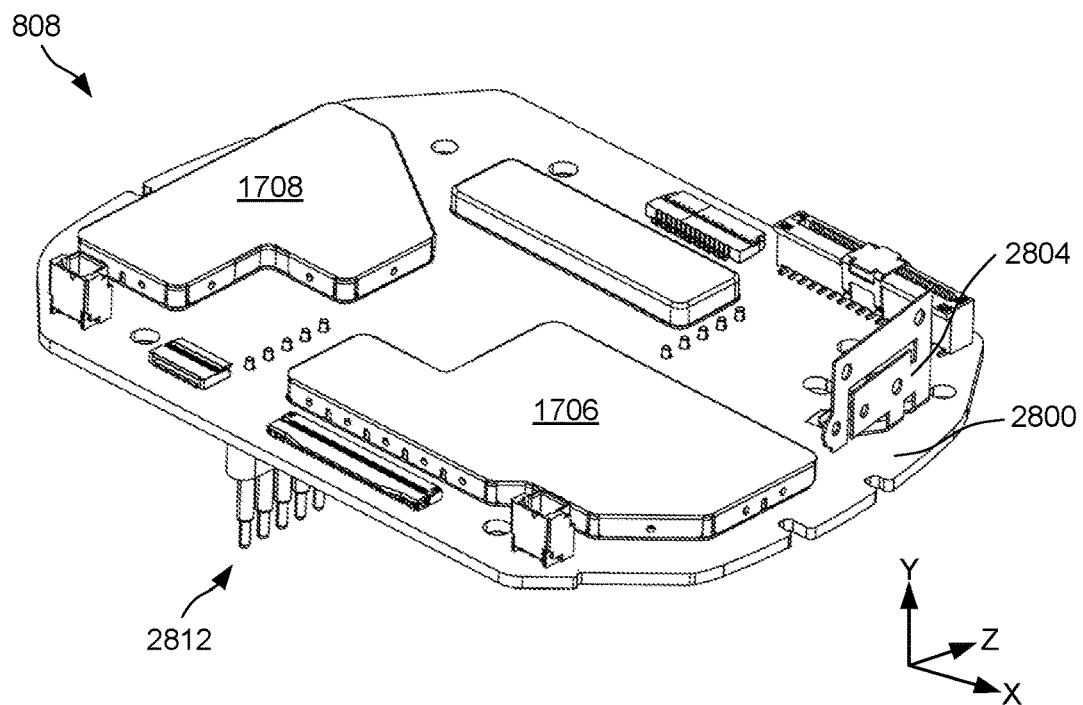
FIGS. 28A and 28B illustrate an example printed circuit board (PCB) disposed within the top housing of FIG. 9, according to examples of the present disclosure.
Figure 28B:
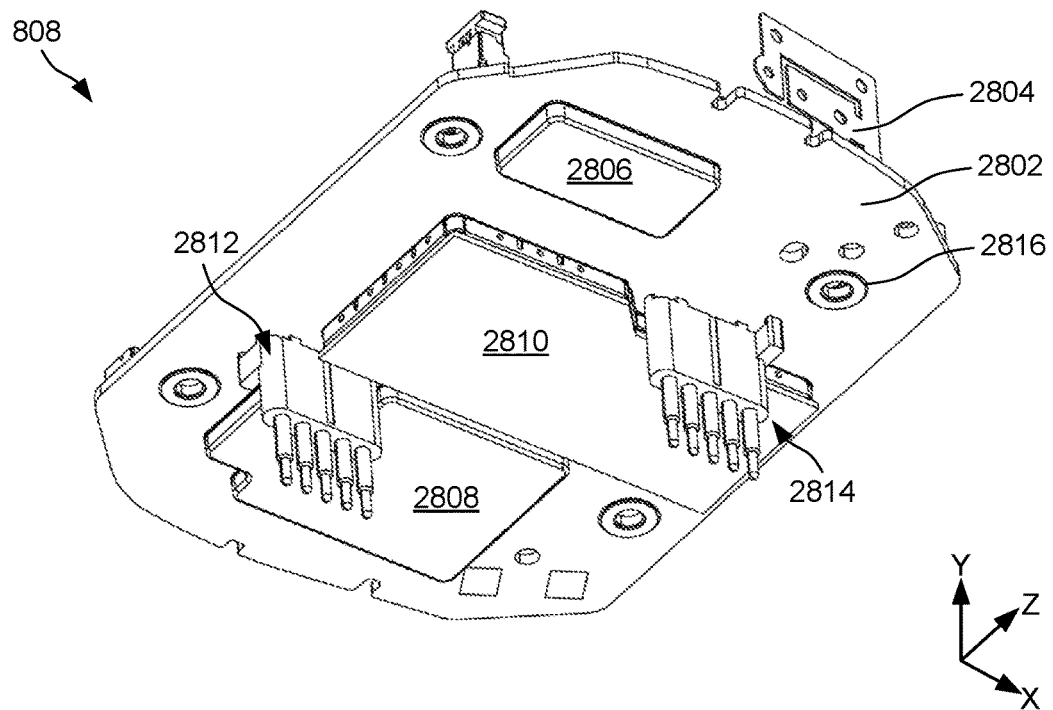

FIGS. 28A and 28B illustrate the PCB 808, according to examples of the present disclosure. The PCB 808 may include a first side 2800 and a second side 2802. The first side 2800 may be oriented towards the cap 122, or the top 112 of the security camera device 100, while the second side 2802 may be oriented towards the top end 1700 of the battery housing 800 or the bottom 114 of the security camera device 100.

The PCB 808 includes the Wi-Fi module 1706 and the LORA module 1708. The Wi-Fi module 1706 may communicatively couple to a Wi-Fi antenna 2804 disposed on the first side 2800 of the PCB 808. The Wi-Fi antenna 2804 may extend from the first side 2800 of the PCB 808 and be oriented towards the interior surface 2704 of the first cover 120 when the security camera device 100 is assembled. The LORA module 1708 may communicatively couple to the antenna 1500. The first side 2800 may also include various connectors for receiving the flex circuit 1502, the flex circuit 2710, the first wire 1308, and the second wire 1310.

The second side 2802 of the PCB 808 may include a Wi-Fi driver 2806, which in some instances, is communicatively coupled to the Wi-Fi module 1706 disposed on the first side 2800. A DC-DC converter 2808 may also be disposed on the second side 2802. The second side 2802 may additionally include a shielding plate 2810 disposed over component circuitry (e.g., processor(s), memory, capacitors, resistors, etc.). In some instances, the shielding plate 2810 is shown being located between the Wi-Fi driver 2806 and the DC-DC converter 2808.

The PCB 808 includes first prongs 2812 and second prongs 2814 corresponding to charging contacts of the security camera device 100. The first prongs 2812 and the second prongs 2814 may engage with contacts (e.g., pads) on the top end 1700 of the battery housing 800 for transferring power from the batteries to the PCB 808 (and to additional computing components of the security camera device 100). In some instances, the first prongs 2812 receive power from a first battery within the battery housing 800, while the second prongs 2814 receive power from a second battery within the battery housing 800.

The PCB 808 may also include alignment orifices 2816 that align the PCB 808 with the battery housing 800. For example, the posts 1702 may extend at least partially through the alignment orifices 2816 for aligning the PCB 808 on the battery housing 800. The alignment orifices 2816 may extend through the PCB 808, between the first side 2800 and the second side 2802.

Figure 29:
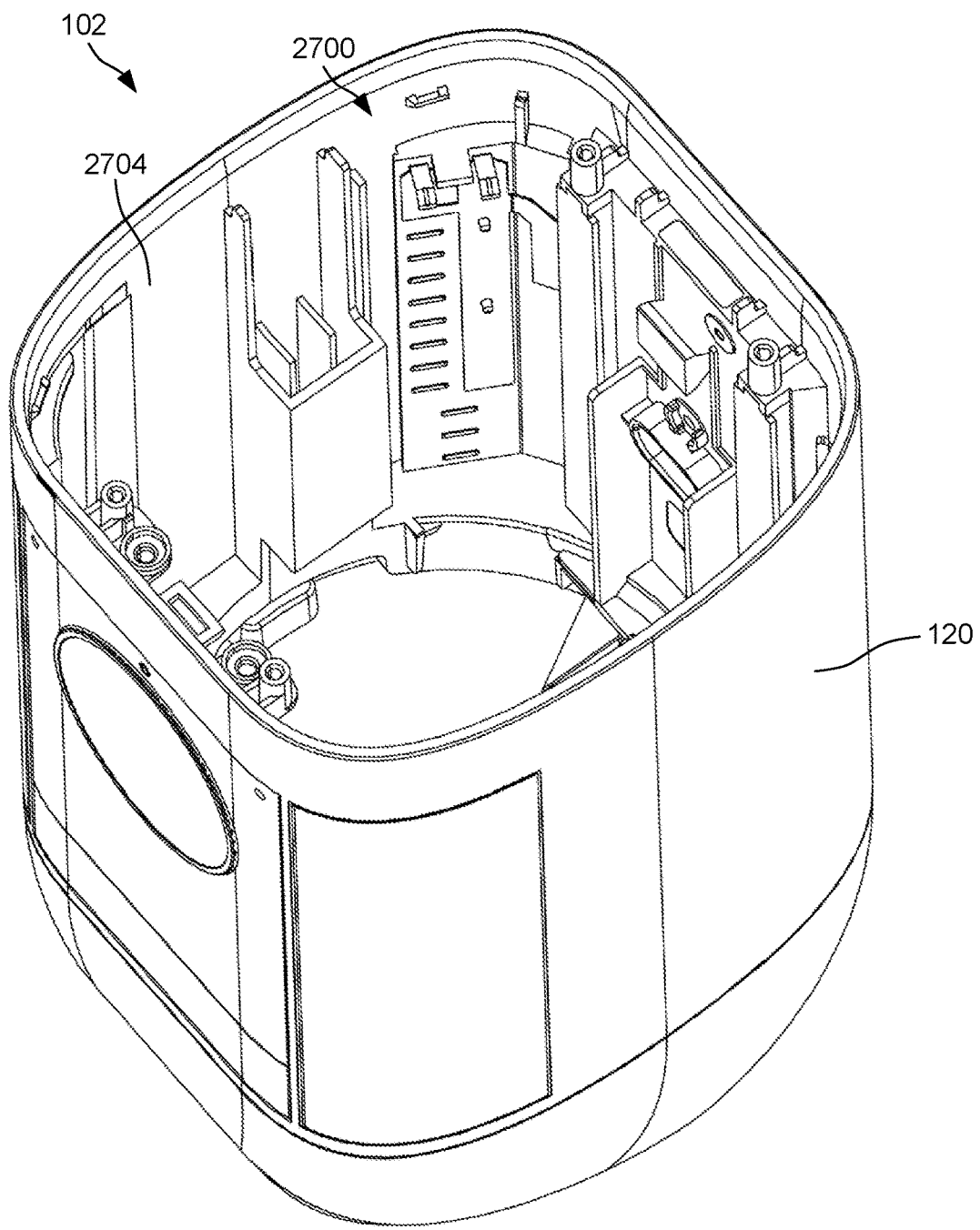
FIG. 29 illustrates an example interior of the security camera device of FIG. 1, according to examples of the present disclosure.

FIG. 29 illustrates the interior 2700 of the first housing 102, showing components of the first housing 102 being removed, according to examples of the present disclosure. The interior surface 2704 of the first cover 120 includes various gussets, tabs, flanges, and so forth for receiving components that reside within the interior surface 2704. For example, the various components that reside within the first housing 102 may couple to, rest on, or otherwise engage with the gussets, tabs, flanges, and so forth for aligning the components within the first housing 102.

FIGS. 30A and 30B illustrate bottom views of the first housing 102, according to examples of the present disclosure. The first cover 120 forms the first attachment mechanisms 900 that engage with the second attachment mechanisms 902 of the frame 904 of the second housing 104. The first attachment mechanisms 900 are shown being disposed around the perimeter 908 of the first cover 120.

The security camera device 100 includes batter(ies) 3000, such as a first battery 3000(1) and a second battery 3000(2), for power components of the security camera device 100. The batter(ies) 3000 are insertable into the battery housing 800 via the bottom end 1704. The battery housing 800 may define a first battery receptacle 3002 and a second battery receptacle 3004 for receiving the first battery 3000(1) and the second battery 3000(2), respectively. A first tab 3006 and a second tab 3008 may engage with the first battery 3000(1) and the second battery 3000(2) (e.g., ends thereof), respectively. For example, the first tab 3006 and the second tab 3008 may engage with the first battery 3000(1) and the second battery 3000(2) to secure the first battery 3000(1) and the second battery 3000(2) within the first receptacle 2002 and the second receptacle 2004, respectively. Pressing the first tab 3006 and the second tab 3008 (e.g., in the X-direction and towards a center of the security camera device 100) may permit the first battery 3000(1) and the second battery 3000(2) to be pulled out of the first battery receptacle 3002 and the second battery receptacle 3004, respectively. Although two battery receptacles are shown, the battery housing 800 may include more than or less than two battery receptacles. Additionally, the security camera device 100 may not include two batteries, but in some instances, may operate via a single battery. In some instances, the batter(ies) 3000 are arranged more proximate to the back 110 of the security camera device 100 than the front 108 given the placement of the PCBA assembly 1900 in front of the batter(ies) 3000.

The first housing 102 includes a first contact 3010 and a second contact 3012 for engaging with corresponding contacts of the second housing 104. When the first housing 102 and the second housing 104 are coupled together, the first contact 3010 and the second contact 3012 engage with corresponding contacts of the second housing 104 for communicatively coupling computing components in the first housing 102 with computing components in the second housing 104. Such communicative coupling may transfer power, signals, data, and so forth. In some instances, the first contact 3010 and the second contact 3012 are coupled to an amplifier within the first housing 102 that drives the loudspeaker 814 in the second housing. As shown, the first contact 3010 and the second contact 3012 may be arranged proximate to the front 108 of the security camera device 100, however, the first contact 3010 and the second contact 3012 may be located elsewhere on the first housing 102. The use of the contacts to communicatively couple the first housing 102 and the second housing 104 may eliminate the need for wires extending between the first housing 102 and the second housing 104. This may enable the first housing 102 and the second housing 104 to be conveniently decoupled, for example, during a replacement of the batter(ies) 3000.

As shown, the first contact 3010 and the second contact 3012 may represent circuit traces having a length for receiving contacts of the second housing 104. In some instances, the first contact 3010 and the second contact 3012 include a curvature given the rotatable nature for coupling the first housing 102 and the second housing 104. For example, during a twisting of the second housing 104 the contacts of the second housing 104 may translate along the first contact 3010 and the second contact 3012. In some instances, the first contact 3010 and/or the second contact 3012 are disposed on or within the bottom end 1704 of the battery housing 800. The first contact 3010 and the second contact 3012, although not shown, may communicatively couple to the PCB 808 and/or the PCBA 810 (as well as other components of the first housing 102). In some instances, the first contact 3010 and the second contact 3012 include the same length, size, and/or shape.

Figure 31A:
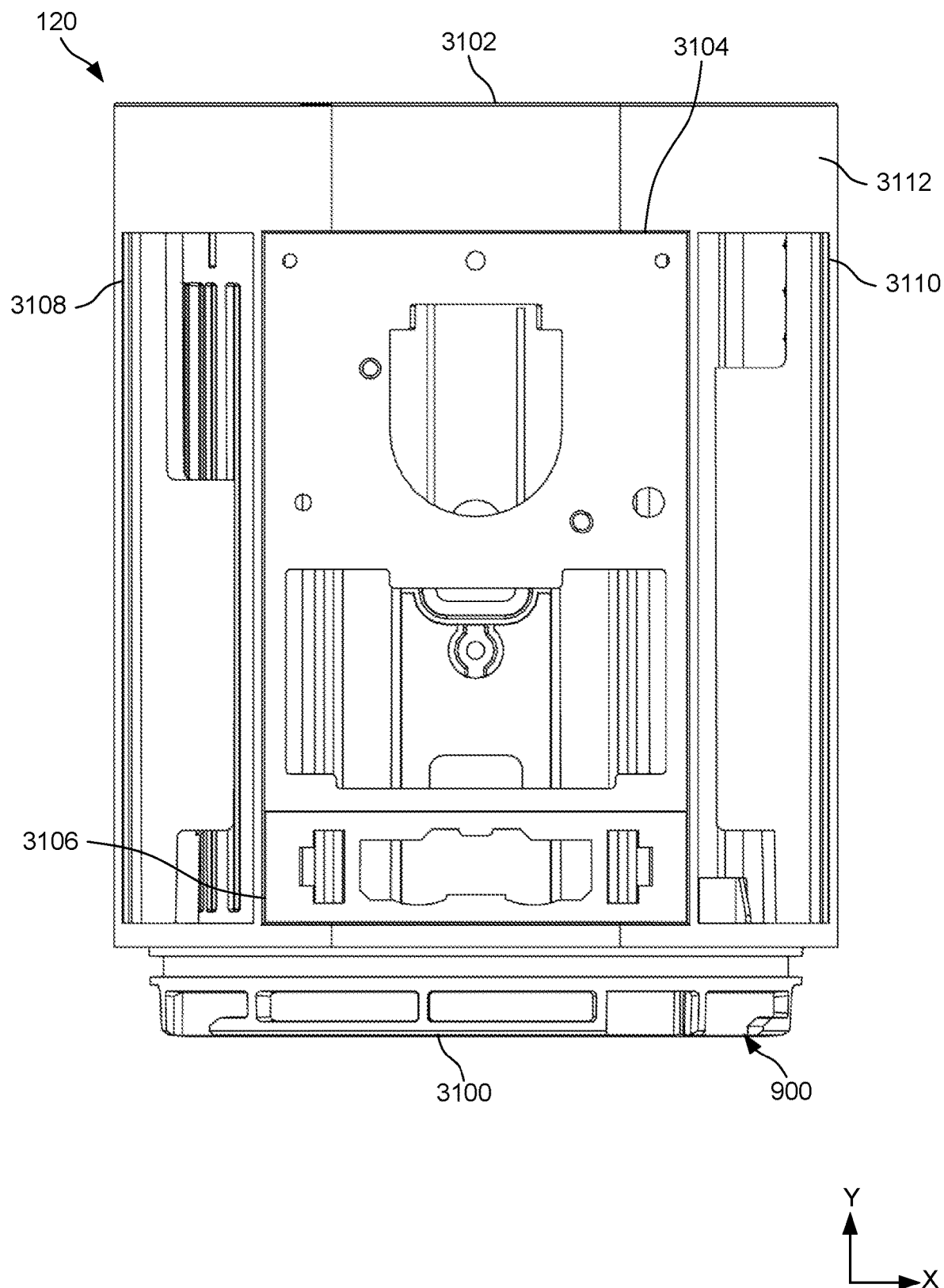
FIGS. 31A-31C illustrate an example cover of the top housing of FIG. 9, according to examples of the present disclosure.
Figure 31C:
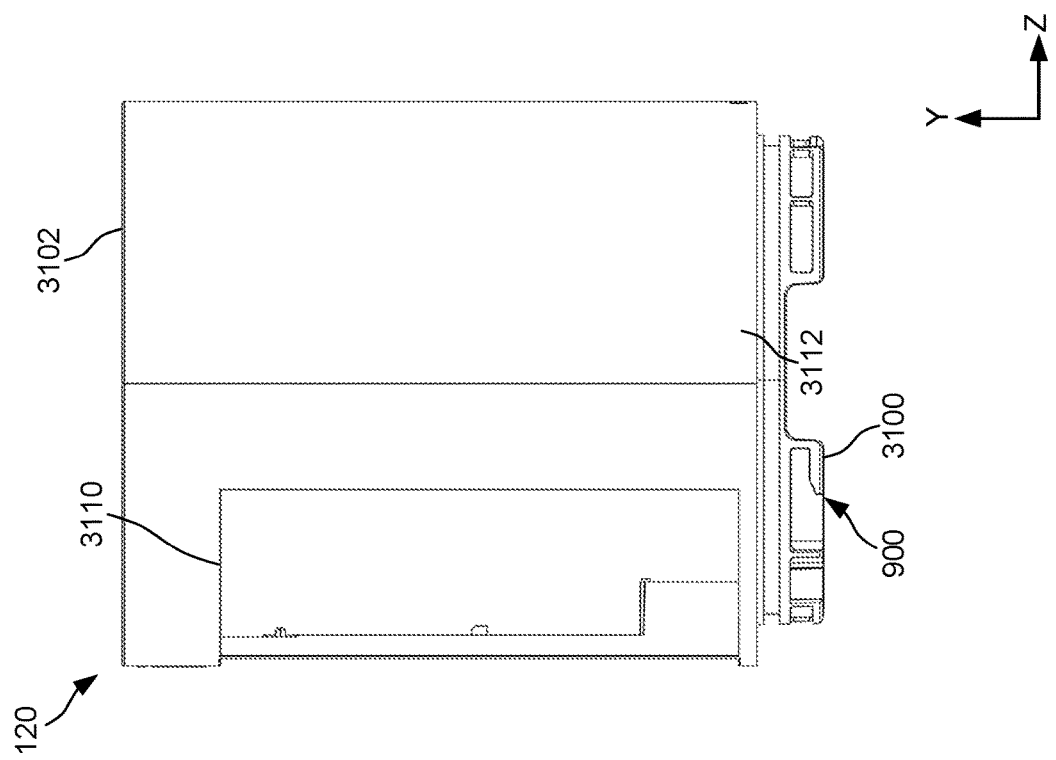
Figure 31B:
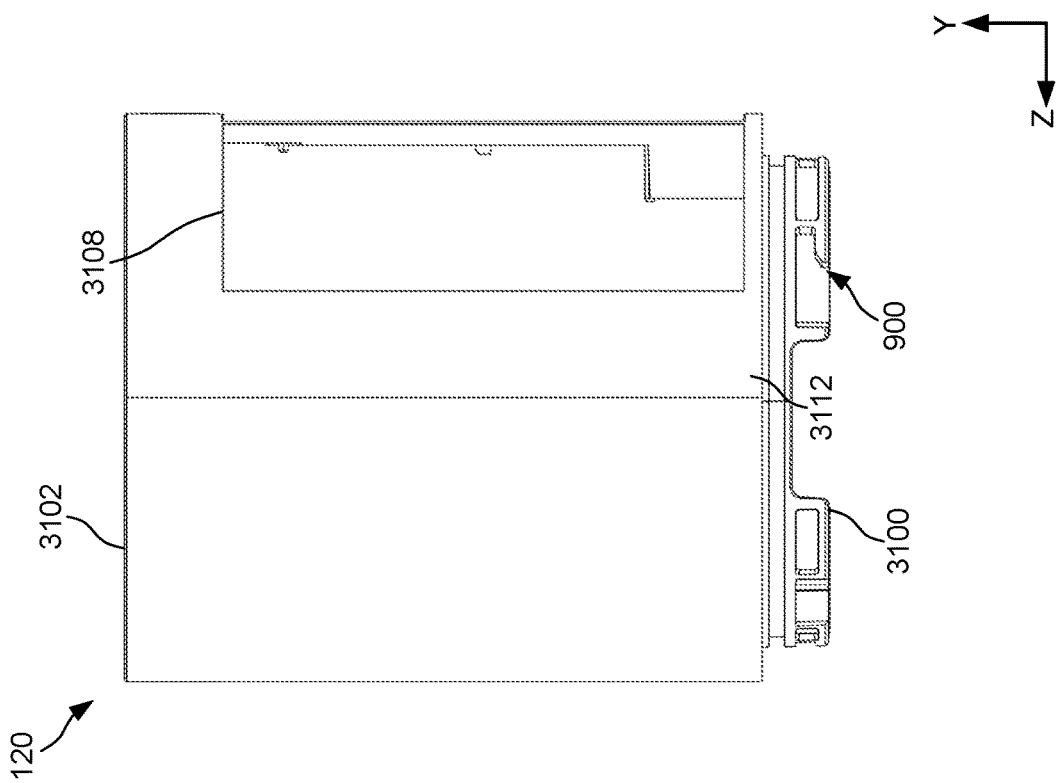

FIGS. 31A-31C illustrate the first cover 120, according to examples of the present disclosure. FIG. 31A illustrates a front planar view of the first cover 120, FIG. 31B illustrates a first side planar view of the first cover 120, and FIG. 31C illustrates a second side planar view of the first cover 120.

The first cover 120 defines the first attachment mechanisms 900 arranged at a bottom end 3100 of the first cover 120. A top end 3102, opposite the bottom end 3100, is open to receive the cap 122. In some instances, the first cover 120 is formed via a unitary body, or may be multiple bodies (e.g., halves) coupled together.

The first cover 120 also defines various receptacles for receiving the lenses of the first housing 102. For example, a first receptacle 3104 may receive the first lens 128, a second receptacle 3106 may receive the second lens 130, a third receptacle 3108 may receive the third lens 132, and a fourth receptacle 3110 may receive the fourth lens 134. The receptacles are sized and configured to receive the lenses, respectively. The first cover 120 may also define various keyways, slots, and so forth into which or within which the lenses engage. For example, the lenses may couple to the first cover 120 via press and fit mechanisms, adhesives, and so forth. Such keyways and slots may also align the lenses on the first cover 120. The first receptacle 3104 and the second receptacle 3106 may be located on a front of the first cover 120, while the third receptacle 3108 and the fourth receptacle 3110 may be located on the front and/or sides of the first cover 120.

The receptacles may represent cutouts within an exterior surface 3112 of the first cover 120 such that when the lenses couple to the first cover 120, a smooth or continuous surface is formed. For example, the receptacles may include a depth that substantially corresponds to a thickness of the lenses. Once the lenses couple to the first cover 120, the lenses may align with the exterior surface 3112.

Figure 32A:
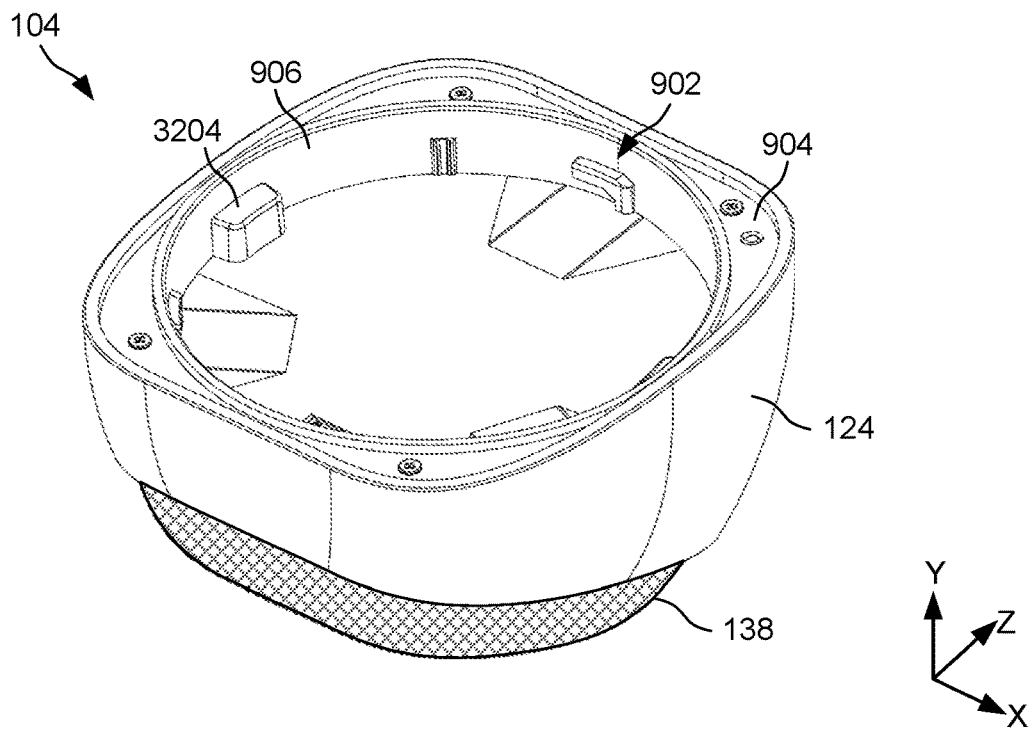
FIGS. 32A-32C illustrate the bottom housing of FIG. 9, according to examples of the present disclosure.
Figure 32B:
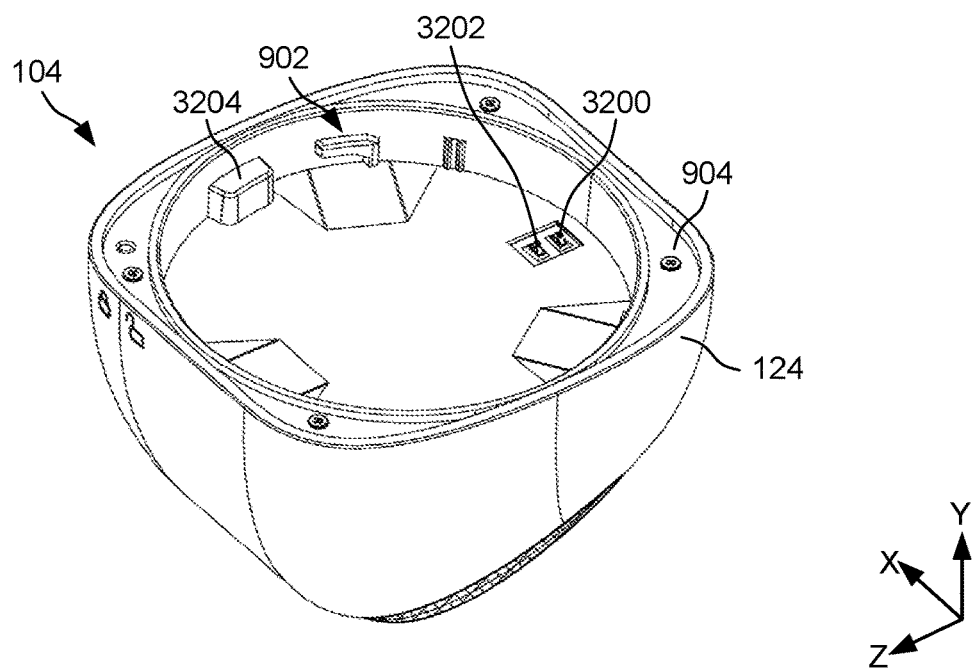
Figure 32C:
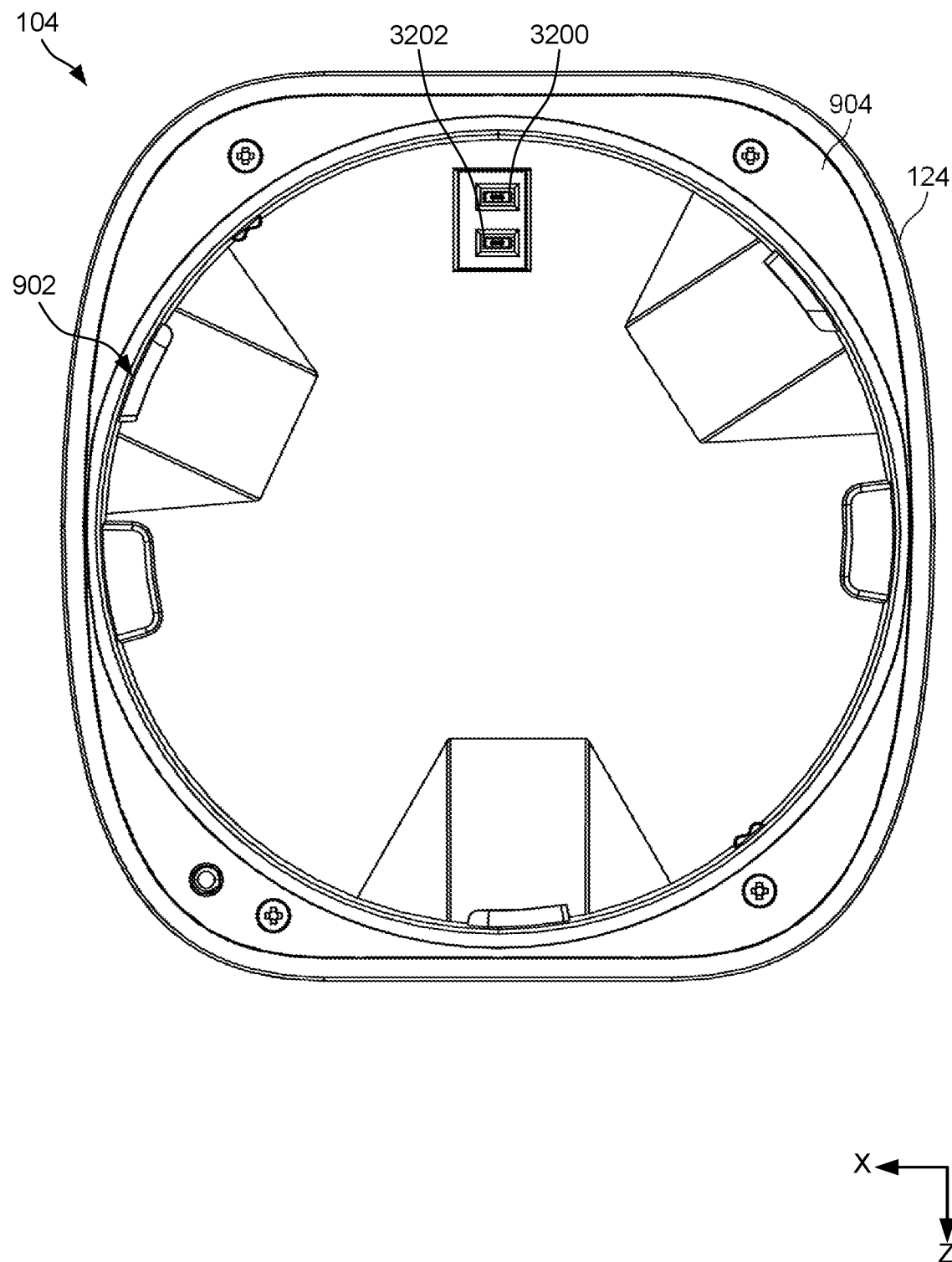

FIGS. 32A-32C illustrate various views of the second housing 104, according to examples of the present disclosure. FIG. 32A illustrates a front perspective view of the second housing 104, FIG. 32B illustrates a rear perspective view of the second housing 104, and FIG. 32C illustrates a top planar view of the second housing 104.

As introduced above, the second housing 104 includes the frame 904, the second cover 124, and the loudspeaker grill 138. In some instances, the second cover 124 couples to the frame 904 via fasteners or other mechanisms (e.g., press-fit), and/or the loudspeaker grill 138 couples to the second cover 124 via press-fit mechanisms. The second attachment mechanisms 902 may be defined by or within the annulus 906 of the frame 904.

The second housing 104 includes contacts for engaging with the first contact 3010 and the second contact 3012 of the first housing 102. For example, the second housing 104 may include a first contact 3200 and a second contact 3202 that engage with the first contact 3010 and the second contact 3012, respectively. In some instances, the first contact 3010 and the second contact 3012 may represent prongs, pins, and the like that engage with the traces of the first contact 3010 and the second contact 3012, respectively. However, although the first contact 3010 and the second contact 3012 are described as being traces, and the first contact 3200 and the second contact 3202 are described as being prongs, in some instances, the first contact 3010 and the second contact 3012 may represent prongs and the first contact 3200 and the second contact 3202 may represent traces. In accordance with one or more preferred implementations, the first contact 3200 and the second contact 3202 may have a shape and be constructed from a material allowing the first contact 3200 and the second contact 3202 to act as a spring, as illustrated for example in FIGS. 33B and 33C (in which some elements are omitted from the illustrations for clarity).

The first contact 3200 and the second contact 3202 may be biased to engage with the first contact 3010 and the second contact 3012 (e.g., in the Y-direction). For example, springs may bias the first contact 3200 and the second contact 3202 in a direction towards the first contact 3010 and the second contact 3012 in order to engage with the first contact 3010 and the second contact 3012, respectively. The first contact 3200 and the second contact 3202 may be disposed through a portion of the frame 904. For example, when the bottom end 3100 of the first cover 120 (or a bottom of the first housing 102) is inserted into the annulus 906 of the frame 904, the first contact 3010 and the second contact 3012 may engage with the first contact 3200 and the second contact 3202, respectively. In some instances, the first contact 3010 and the second contact 3012 may engage with the first contact 3200 and the second contact 3202 during rotation of the first housing 102 and/or the second housing 104.

The second housing 104 may include alignment tabs 3204 that engage with features of the first housing 102. The alignment tabs 3204 may serve to align the first housing 102 and the second housing 104 such that the first attachment mechanisms 900 and the second attachment mechanisms 902 may engage with one another.

Figure 33A:
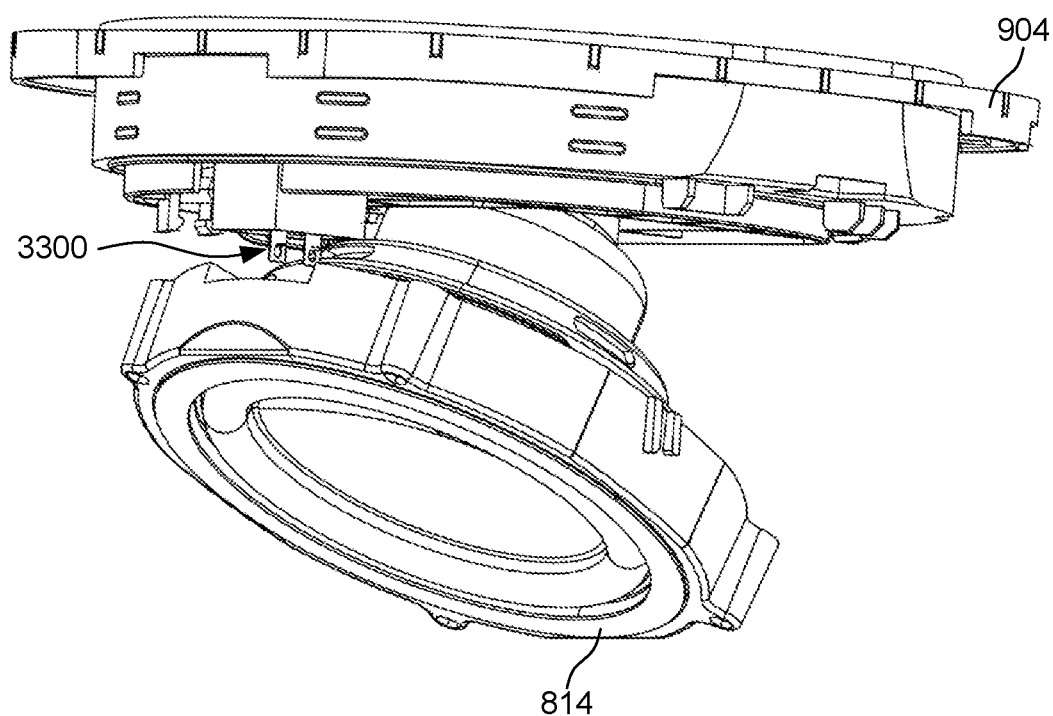
FIGS. 33A-33C illustrate an example loudspeaker of the bottom housing of FIG. 9, and coupling between the top housing and the bottom housing, according to examples of the present disclosure.
Figure 33B:
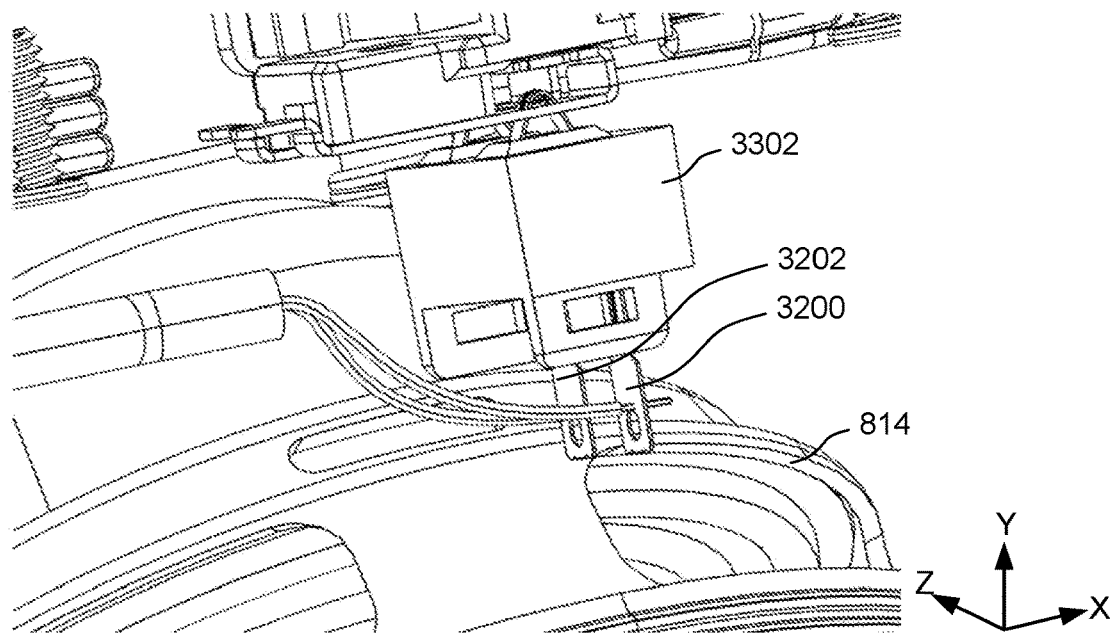
Figure 33C:
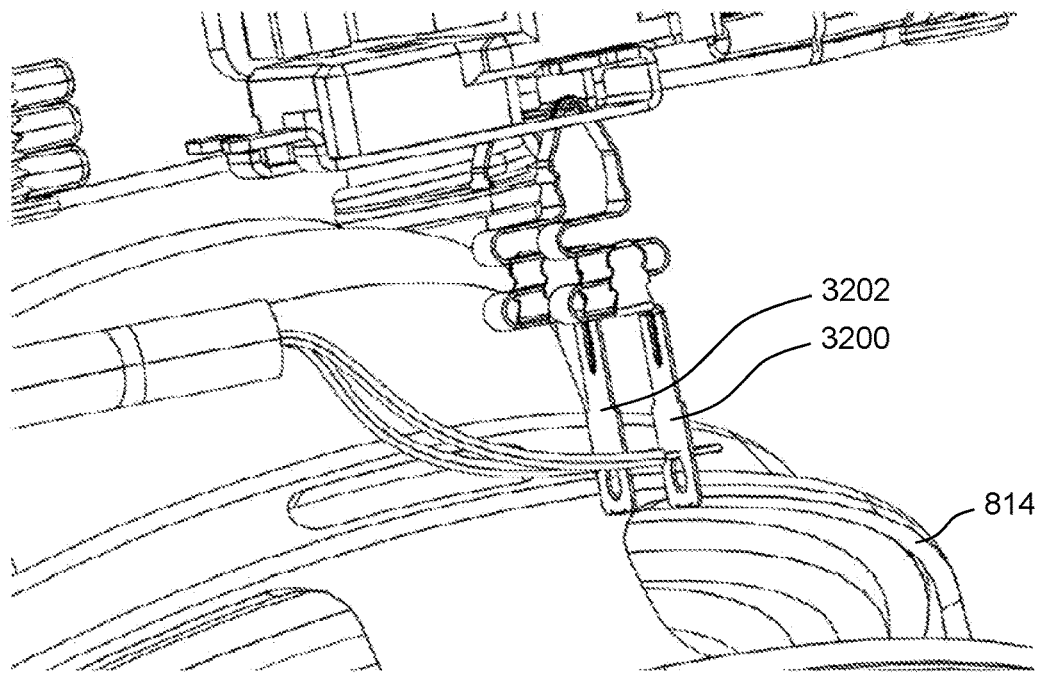

FIGS. 33A-33C illustrates the loudspeaker 814 of the security camera device 100, according to examples of the present disclosure. The loudspeaker 814 couples to the frame 904 of the second housing 104 for orienting the loudspeaker 814 to fire in a direction towards the front 108 of the security camera device 100. As shown, the loudspeaker 814 may couple to a bottom of the frame 904, opposite a top that receives the first housing 102. Terminal ends 3300 of the first contact 3200 and the second contact 3202 are shown being disposed through the frame 904. Wires, connectors, and so forth may extend from the terminal ends 3300 to the loudspeaker 814, as well as other components with the second housing 104.

In some instances, portions of the first contact 3200 and the second contact 3202 are disposed within a housing 3202, between the terminal ends 3300 and within the frame 904. Wires may route between the terminal ends 3200 and the loudspeaker 814.

Figure 34A:
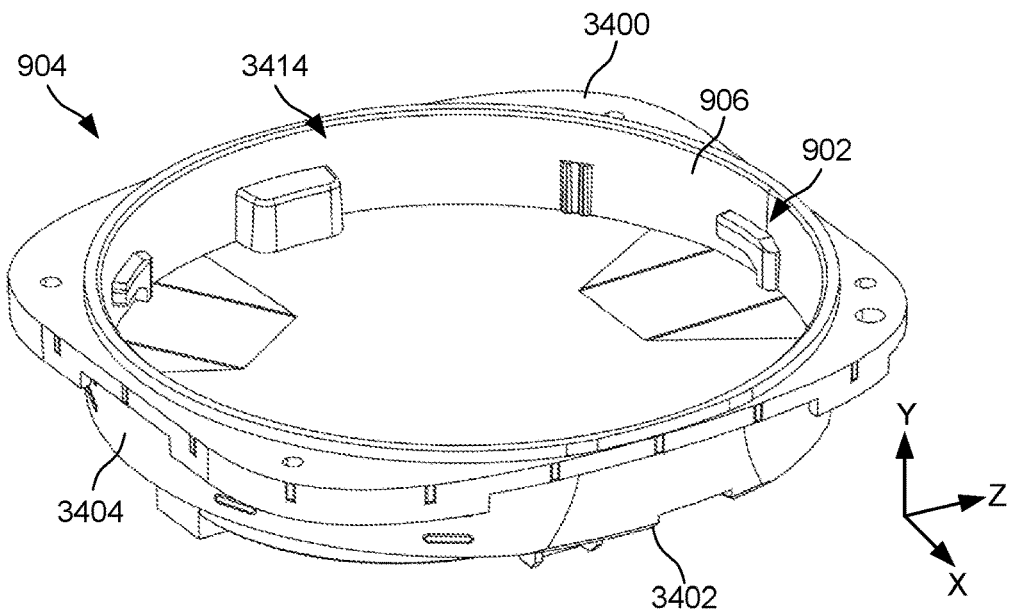
FIGS. 34A-34D illustrate an example frame of the bottom housing of FIG. 9, according to examples of the present disclosure.
Figure 34B:
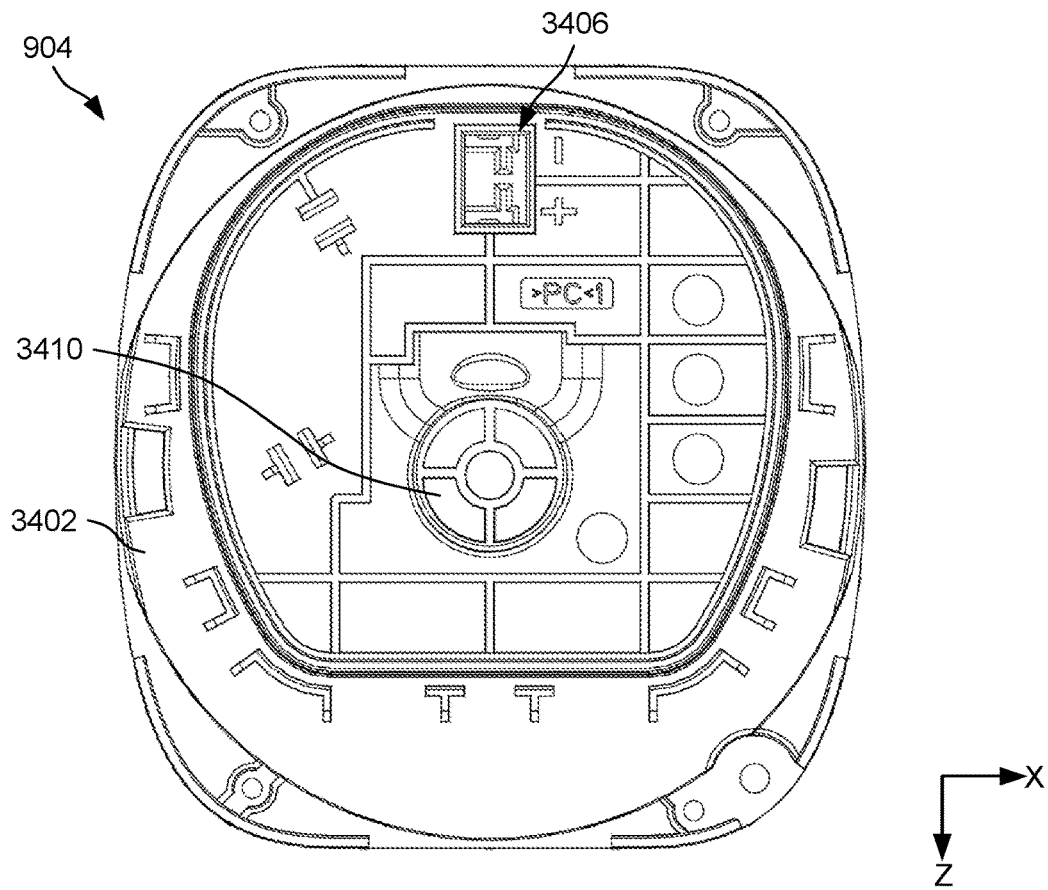
Figure 34C:
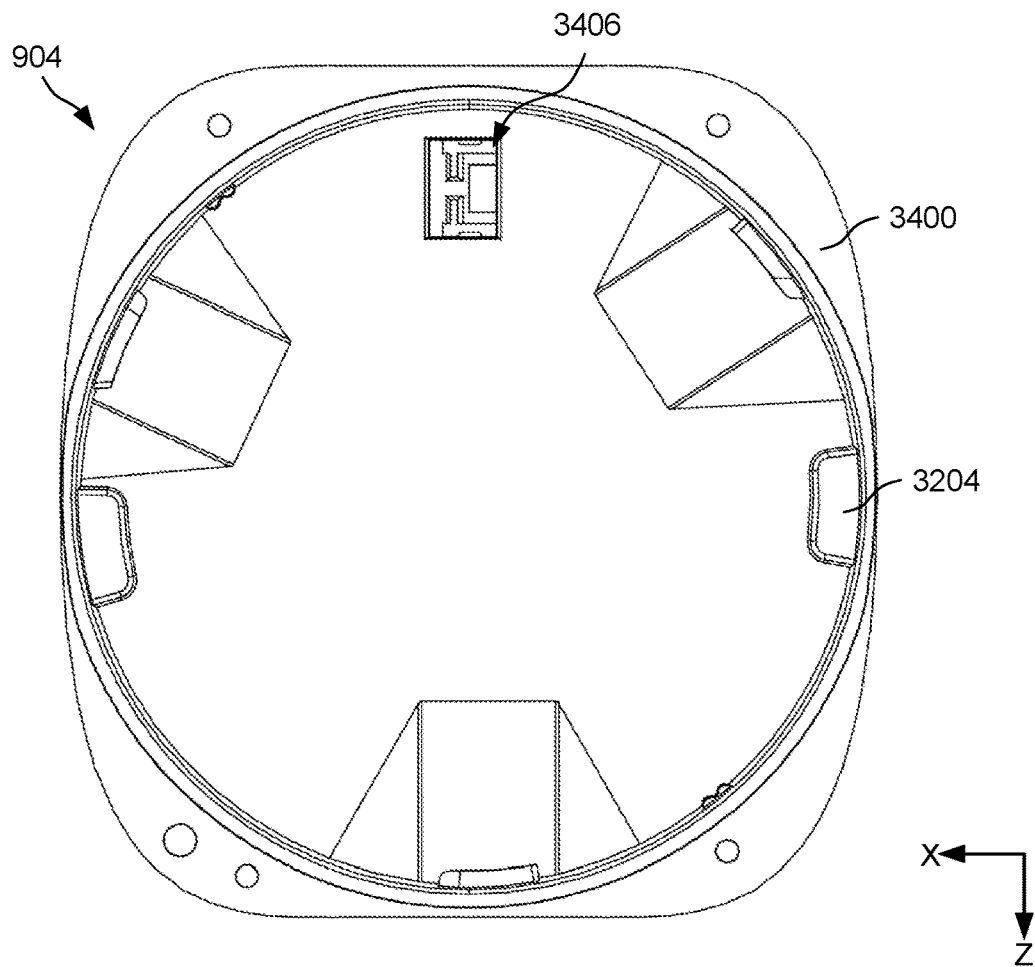

FIGS. 34A-34D illustrate the frame 904 of the second housing 104, according to examples of the present disclosure. FIG. 34A may illustrate a front perspective view of the frame 904, FIG. 34B may illustrate a bottom planar view of the frame 904, FIG. 34C may illustrate a top planar view of the frame 904, and FIG. 34D may illustrate a side view of the frame 904.

The frame 904 may include a top 3400 and a bottom 3402 opposite the top 3400. When the security camera device 100 is assembled, the top 3400 may be oriented towards the first housing 102 (or the top 112 of the security camera device 100), while the bottom 3402 may be oriented towards the bottom 114 of the security camera device 100. The top 3400 may define a receptacle 3414 into which at least a portion of the first housing 102 is received. The receptacle 3414 also includes the annulus 906 that has the second attachment mechanisms 902. The second cover 124 is configured to reside over at least a portion of an exterior surface 3404 of the frame 904. For example, the second cover 124 may couple to sides of the frame 904. The sides of the frame 904 may include various tabs, keyways, features, and so forth for receiving and/or otherwise aligning the second cover 124 onto the frame 904.

Figure 34D:
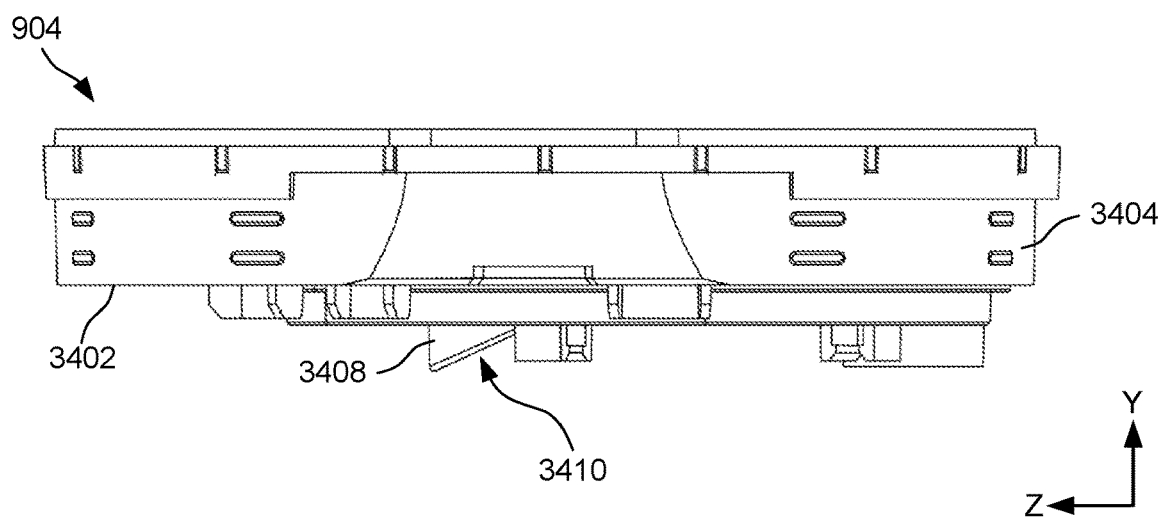

A channel 3406 extends through the frame 904, between the top 3400 and the bottom 3402. The first contact 3200 and the second contact 3202 (e.g., the terminal ends 33000) may be at least partially disposed within the channel 3406, and route power, signals, and so forth to and from the loudspeaker 814, for example. The bottom 3402 may also include a mount 3408 for receiving the loudspeaker 814. As shown in FIG. 34D, the mount 3408 may include a mounting surface 3410 for disposing the loudspeaker 814 at the orientation described herein. That is, when an end of the loudspeaker 814 couples to the mounting surface 3410, the loudspeaker 814 may be oriented such that the loudspeaker 814 emits sounds outward and away from the security camera device 100 (e.g., in front of and to the sides of the security camera device 100). The frame 904 may further define the alignment tabs 3204.

Figure 35A:
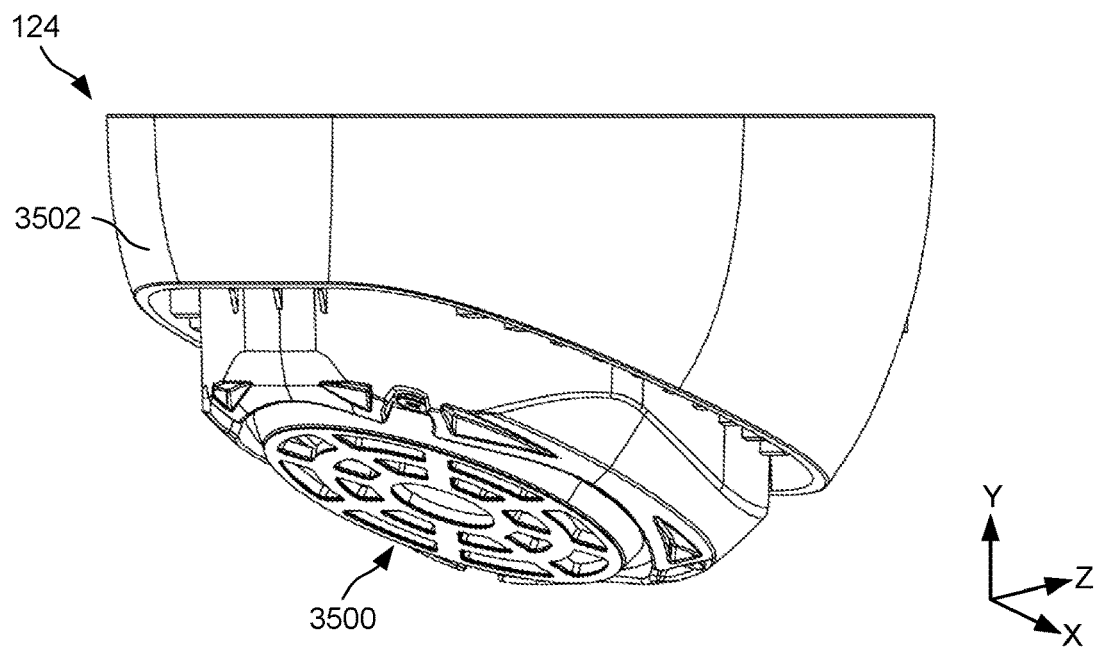
Figure 35B:
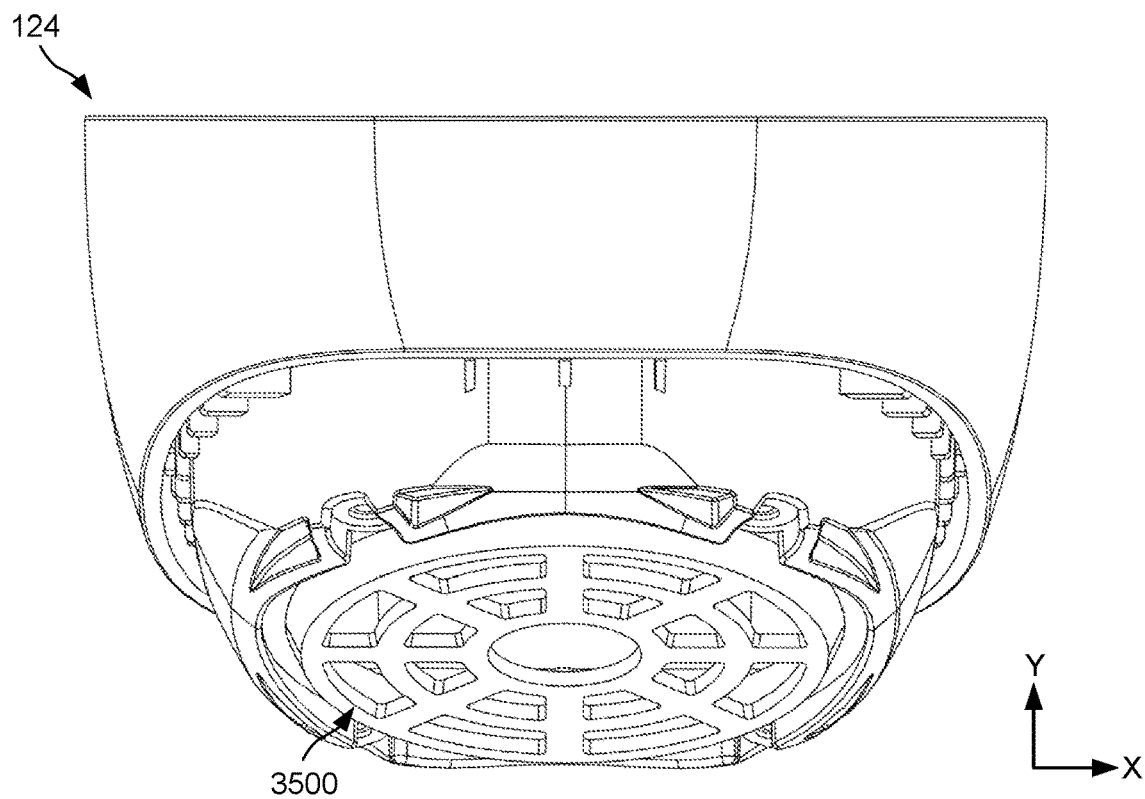

FIGS. 35A-35C illustrate the second cover 124 of the second housing 104, according to examples of the present disclosure. FIG. 35A may illustrate a front perspective view of the second cover 124, FIG. 35B may illustrate a front planar view of the second cover 124, and FIG. 35C may illustrate a side view of the second cover 124.

The second cover 124 is configured to couple to the frame 904, over the loudspeaker 814. For example, the second cover 124 may be disposed at least partially over the exterior surface 3404 of the frame 904. When coupled to the frame 904, the loudspeaker 814 is configured to reside within a cavity of the second cover 124. The second cover 124 is shown including orifices 3500 that permit sound generated by the loudspeaker 814 to exit the interior of the security camera device 100. The second cover 124 also includes various features for receiving the loudspeaker grill 138. The second cover 124 includes an exterior surface 3502 that corresponds to an exterior surface of the security camera device 100.

The second housing 104 is shaped to accommodate the orientation of the loudspeaker 814. For example, a front of the second cover 124, which may correspond to the front 108 of the security camera device 100, may include a first height 3504, while a back of the second cover 124, which may correspond to the back 110 of the security camera device 100, may include a second height 3506. The second height 3506 may be greater than the first height 3504 such that the loudspeaker 814 is permitted to mount to the mounting surface 3410 and oriented accordingly.

FIG. 36 illustrates a perspective view of the loudspeaker grill 138, according to examples of the present disclosure. The loudspeaker grill 138 is configured to couple to the frame 904 or at the bottom of the security camera device 100. The loudspeaker grill 138 may substantially prevent the permeation of liquid, debris, and so forth into the security camera device 100, but may permit sound to travel outward from the security camera device 100. The loudspeaker grill 138 includes an interior surface 3600 that resides over a portion of the second cover 124. When coupled to the second cover 124, an exterior surface 3602 of the loudspeaker grill 138 may align (e.g., flush) with the exterior surface 3502 of the second cover 124. The loudspeaker grill 138 is further shown including attachment mechanisms 3604 for coupling the loudspeaker grill 138 the frame 904 and/or the second housing 104.

In some instances, the loudspeaker grill 138 may conceal the loudspeaker 814, as well as other components of the second housing 104, such as the orifices 3500, such that no internal structure or components can be seen through the loudspeaker grill 138.

In accordance with one or more preferred implementations, the first contact 3010 and the second contact 3012 of the first housing 102 couple with the first contact 3200 and the second contact 3202 of the second housing 104 to provide a signal over the contacts to the loudspeaker 814. In accordance with one or more preferred implementations, an amplifier is disposed within the first housing 102, and the signal provided to the loudspeaker 814 is an amplified signal generated using the amplifier that controls audio output of the loudspeaker 814.

In accordance with one or more preferred implementations, the first housing 102 and the second housing 104 may include more or less contacts, and power may be provided to components of the second housing 102 via coupling of one or more contacts of the first housing 102 to one or more contacts of the second housing 104. In accordance with one or more preferred implementations, data or an audio signal may be provided to components of the second housing 104 via coupling of one or more contacts of the first housing 102 to one or more contacts of the second housing 104. In accordance with one or more preferred implementations, an amplifier is disposed within the second housing 104.

Figure 37:
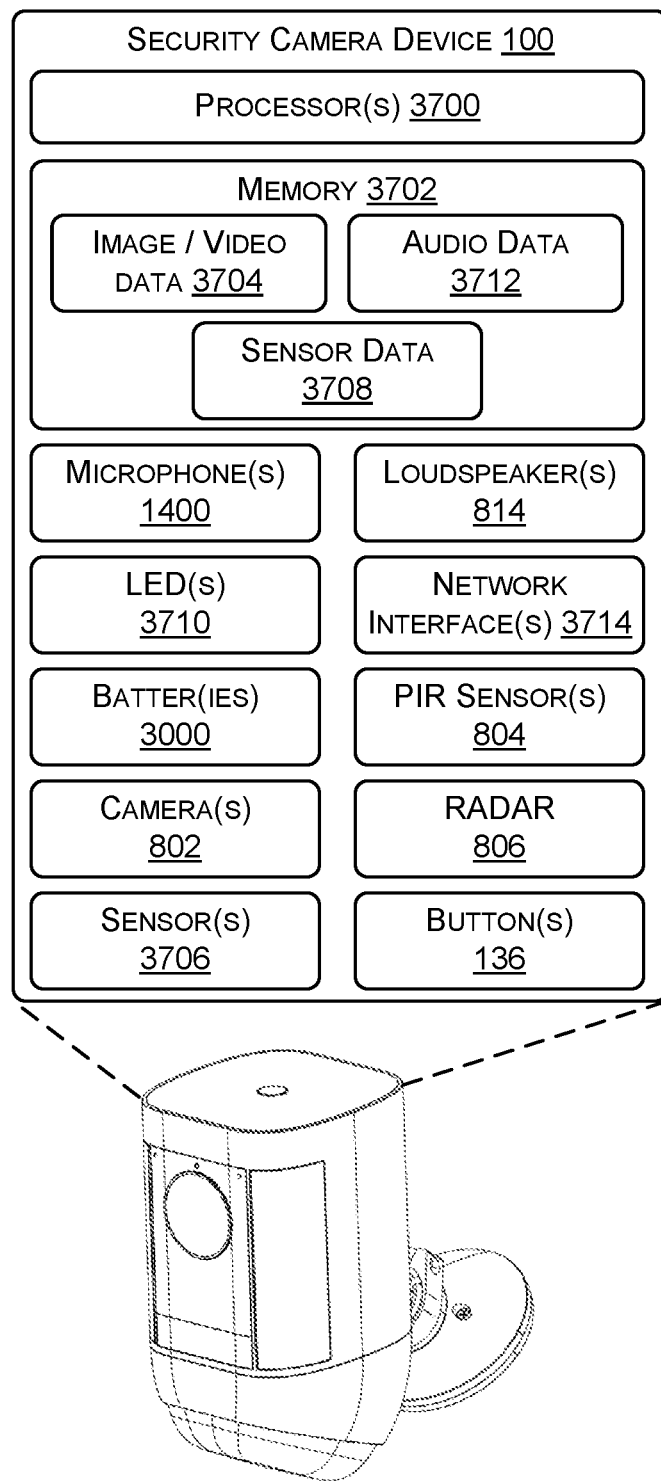
FIG. 37 illustrates example computing components of the security camera device of FIG. 1, according to examples of the present disclosure.

FIG. 37 illustrates select components of the security camera device 100, according to examples of the present disclosure. The security camera device 100 is shown including processor(s) 3700 and memory 3702, where the processor(s) 3700 may perform various functions associated with controlling an operation of the security camera device 100, and the memory 3702 may store instructions executable by the processor(s) 3700 to perform the operations described herein.

The security camera device 100 includes camera(s) 802 for capturing image/video data 3704 within an environment of the security camera device. In some instances, the camera(s) 802 may include red, green, blue, depth (RGBD) camera(s) and/or three-dimensional (3D) sensors. Additionally, the security camera device 100 may include any other sensor(s) 3706 (e.g., ambient light sensor) that generates sensor data 3708. Further, the security camera device 100 may include the PIR sensor(s) 804 and the RADAR sensor 806 that generates the sensor data 3708. In some instances, the PIR sensor(s) 804 act as motion sensors for detecting movement within a field of view. The PIR sensor(s) 804 may be secured on or within a PIR frame that may reside behind a lens (e.g., a Fresnel lens) of the security camera device 100. In such examples, the PIR sensor(s) 804 may detect IR radiation in a field of view of the PIR sensor(s) 804, and produce an output signal (e.g., voltage) that changes as the amount of IR radiation in the field of view changes. The amount of voltage in the output signal may be compared, by the processor(s) 3700, for example, to one or more threshold voltage values to determine if the amount of voltage in the output signal is indicative of motion, and/or if the amount of voltage in the output signal is indicative of motion of an entity that is to be recorded by the camera(s) 802. In some instances, the PIR sensor(s) 804 may detect the motion for activating the camera(s) 802 and/or a microphone(s) 1400 to begin capturing image data and/or audio data, respectively.

In some instances, the PIR sensor(s) 804 is/are used to detection motion within an environment of the security camera device 100. However, in some instances, the camera(s) 802 and/or the RADAR sensor 806, in addition to or alternative from the PIR sensor(s) 804, may be used to detect motion. For example, computer vision techniques may be used to detect objects of interest. In some instances, the camera(s) 802 may include a CMOS image sensor, and a digital processor that may perform embedded processing within the low-power CVM itself, such that the low-power CVM may output post-processed computer vision metadata to the processor(s) 3700. The metadata may include information such as the presence of a particular type of entity (e.g., person, animal, vehicle, parcel, etc.), a direction of movement of the entity, a distance of the entity from the security camera device 100, etc. As a result of including the computer vision, the security camera device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image.

The security camera device 100 also includes LED(s) 3710, such as IR LEDs and/or white LEDs, for illuminating and/or emitting light within the environment of the security camera device 100. Any number of IR LEDs and/or white LEDs may be included, and the IR LEDs and the white LEDs may be arranged about various sides of the security camera device 100 (e.g., front, sides, etc.). In some instances, in response to the PIR sensor(s) 804, the camera(s) 802, and/or the RADAR sensor 806 detecting motion, the LED(s) 3710 may receive an output signal from the processor(s) 3700 that causes the LED(s) 3710 to activate the one or more lights. The IR LEDs may also be used to detect motion and/or record image/video data 3704 in low-light conditions.

The security camera device 100 includes the microphone(s) 1400 that generate audio data 3712. The microphone(s) 1400 may include an array of microphone for beamforming audio signals within the environment of the security camera device 100. Loudspeaker(s) 814 may output sound in a direction away from the security camera device 100. The sound output by the Loudspeaker(s) 814 may include the audio data 3712, which may be received from one or more communicatively coupled devices, or other audio (e.g., siren, alarm, etc.).

Network interface(s) 3714 permit the security camera device 100 to communicate over one or more networks. Example network interface(s) 3714 include, without limitation, Wi-Fi, Bluetooth, ZigBee, Bluetooth Low Energy (BLE), LTE, and so forth. The network interface(s) 3714 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data from may be routed through the network interface(s) 3714 before being directed to the processor(s) 3700, and outbound data from the processor(s) 3700 may be routed through the network interface(s) 3714. The network interface(s) 3714 may therefore receive inputs, such as data, from the processor(s) 3700, the camera(s) 802, the PIR sensor(s) 804, the RADAR sensor 806, the button(s) 136, and so forth. For example, when button(s) 136 receive touch input, the network interface(s) 3714 may perform one or more functions, such as to transmit a signal over a wireless connection and/or a wired connection. As another example, the network interface(s) 3714 may be configured to transmit data to and/or receive data from one or more network devices. The network interface(s) 3714 may act as a conduit for data communicated between various components and the processor(s) 3700.

The security camera device 100 may include the button(s) 136 for controlling an operation of the security camera device 100, such as power button, a wireless connectivity button, a mute button, volume buttons, sync buttons, or any other type of button or control. The button(s) 136, may in some instances, be multi-function buttons. The button(s) 136 may be mechanical (e.g., having physically movable components) and/or electronic (e.g., capacitive sensors, optical sensors, touch screen, or the like).

Batter(ies) 3000 may power the components of the security camera device 100. Any number of batter(ies) 3000 may be included, and the batter(ies) 3000 may be rechargeable/replaceable. Additionally, the security camera device 100 may be powered using a source of external AC (alternating-current) power, such as mains power. When the batter(ies) 3000 are depleted, the batter(ies) 3000 may be recharged by connecting a power source to the batter(ies) 3000 (e.g., using a USB connector).

Although certain components of the security camera device 100 are illustrated, it is to be understood that the security camera device 100 may include additional or alternative components. For example, the security camera device 100 may include other input/output devices (e.g., display screen), heat dissipating elements, computing components (e.g., PCBs), antennas, ports (e.g., USB), and so forth).

As used herein, a processor, such as the processor(s) 3700 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 3702 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium that which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium that can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device, comprising:
a first housing having a first end and a second end, the first housing including: a microphone disposed proximate the first end of the first housing,
a camera disposed further from the first end of the first housing than the microphone,
a radar sensor disposed further from the first end of the first housing than the microphone,
a first frame having a first side and a second side opposite the first side,
a printed circuit board assembly (PCBA) disposed on the first side of the first frame,
a passive infrared (PIR) assembly disposed further from the first end of the first housing than then radar sensor, the PIR assembly having:
a second frame disposed on the second side of the first frame, the second frame defining at least a first cavity and a second cavity,
a mount coupled to the PCBA,
a mirror coupled to the second frame at a location within the first cavity and the second cavity,
a first PIR sensor coupled to the mount and oriented towards the first cavity, and
a second PIR sensor coupled to the mount and oriented towards the second cavity;
a second housing coupled to the second end of the first housing, the second housing including a speaker; and
a mount coupled to the first housing for disposing the electronic device on a surface.

2. The electronic device of claim 1, wherein:
the second frame includes a central horizontal plane and a central vertical plane; the first PIR sensor is oriented in a first direction that is angled away from the central horizontal plane and the central vertical plane; and
the second PIR sensor is oriented in a second direction that is angled away from the central horizontal plane and the central vertical plane.

3. The electronic device of claim 1, wherein:
the second frame includes a wall disposed between the first cavity and the second
the first cavity includes a first top and a first bottom opposite the first top;
the second cavity includes a second top and a second bottom opposite the second the location within the first cavity and the second cavity that the mirror couples to includes the first top and the second top;
the first PIR sensor is oriented in a first direction angled away from the first bottom; and
the second PIR sensor is oriented in a second direction angled away from the second bottom.

4. A device, comprising:
a microphone arranged proximate a first end of the device;
a speaker arranged proximate a second end of the device;
a camera arranged between the microphone and the speaker;
a radar sensor arranged between the microphone and the speaker;
a passive infrared (PIR) sensor assembly arranged between the speaker and the radar sensor, the PIR sensor assembly comprising:
a first PIR sensor,
a first reflective surface arranged proximate the first PIR sensor, and a second PIR sensor; and
a midframe having a first side and a second side, and a printed circuit board assembly (PCBA) disposed on the first side of the midframe and wherein:
the first PIR sensor and the second PIR sensor are coupled to the PCBA; and
a frame of the PIR sensor assembly is disposed on the second side of the midframe.

5. The device of claim 4, wherein the PIR sensor assembly comprises a frame having:
a first cavity,
a second cavity, and
a wall disposed between the first cavity and the second cavity.

6. The device of claim 5, wherein:
the first cavity includes a first top and a first bottom opposite the first top;
the second cavity includes a second top and a second bottom opposite the second the first reflective surface couples to at least a portion of the first top and a second reflective surface couples to at least a portion of the second top;
the first PIR sensor is oriented in a first direction away from the first bottom; and
the second PIR sensor is oriented in a second direction away from the second bottom.

7. The device of claim 6, wherein:
the first direction is angled away from the wall; and
the second direction is angled away from the wall.

8. The device of claim 5, wherein:
the PIR sensor assembly includes a mount having a first pocket and a second pocket; the first PIR sensor includes:
a first front at least partially disposed in the first cavity, and a first back disposed within the first pocket; and the second PIR sensor includes:
a second front at least partially disposed in the second cavity, and a second back disposed within the second pocket.

9. The device of claim 8, wherein:
the mount includes a third front and a third back opposite the third front, the third front being transverse to the third back;
the third front includes the first pocket and the second pocket; and
the third back is substantially planar.

10. The device of claim 4, wherein the device further includes a second reflective surface arranged proximate the second PIR sensor.

11. The device of claim 10, wherein the first reflective surface and the second reflective surface are surfaces of a first mirror.

12. The device of claim 10, wherein the first reflective surface is a surface of a first mirror and the second reflective surface is a surface of a second mirror.

13. The device of claim 4, further comprising a first housing and a second housing, wherein:
the first housing includes first contacts; and
the second housing includes second contacts, the second contacts engaging with the first contacts to at least provide a connection between an electronic component disposed within the first housing and the speaker disposed in the second housing.

14. The device of claim 4, further comprising a printed circuit board (PCB), wherein:
the PIR assembly includes:
a frame having one or more cavities through which the first PIR sensor and the second PIR sensor receive infrared light, and
a mount disposed between the frame and the PCB; and
the first PIR sensor and the second PIR sensor are disposed on the mount and are communicatively coupled to the PCB.

15. The device of claim 4, further comprising a housing, wherein the microphone, the speaker, the camera, the radar sensor, and the PIR assembly are disposed within the housing.

16. A device, comprising:
a first end;
a second end;
a printed circuit board assembly (PCBA); a camera coupled to the PCBA;
a speaker located closer to the second end than the first end; and
a passive infrared (PIR) sensor assembly located farther from the second end than the speaker and farther from the first end than the camera, the PIR sensor assembly comprising:
a lens,
a frame including a divider,
a first PIR sensor coupled to the PCBA, the first PIR sensor being oriented in a first direction away from the divider and towards the first end of the device,
a second PIR sensor coupled to the PCBA, the sensor PIR sensor being oriented in a second direction away from the divider and towards the first end of the device,
a first reflective surface coupled to the frame, the first reflective surface arranged to reflect at least some infrared light that passes through the lens towards the first PIR sensor, and a second reflective surface coupled to the frame, the second reflective surface arranged to reflect at least some infrared light that passes through the lens towards the second PIR sensor.

17. The device of claim 16, wherein the first reflective surface and the second reflective surface are surfaces of a first mirror.

18. The device of claim 16, wherein the first reflective surface is a surface of a first mirror and the second reflective surface is a surface of a second mirror.

19. The device of claim 16, wherein: the frame includes: a first cavity, and a second cavity;
the first PIR sensor is oriented towards the first cavity; and
the second PIR sensor is oriented towards the second cavity.

20. The device of claim 19, wherein:
the first reflective surface and the second reflective surface couple to the frame at a location at least partially within the first cavity and at least partially within the second cavity; and
the frame includes a wall disposed between the first cavity and the second cavity.

21. The device of claim 16, wherein:
the device includes:
a first housing, and
a second housing configured to couple to the first housing;
the first housing includes:
the PCBA, the camera,
the first reflective surface, the second reflective surface, the first PIR sensor, and the second PIR sensor; and
the second housing includes the speaker.

22. The device of claim 16, wherein at least one of:
the first PIR sensor is arranged substantially parallel to the first reflective surface; or
the second PIR sensor is arranged substantially parallel to the second reflective surface.

* * * * *